(12) United States Patent
Steyn et al.

(10) Patent No.: US 8,526,096 B2
(45) Date of Patent: Sep. 3, 2013

(54) MECHANICAL LIGHT MODULATORS WITH STRESSED BEAMS

(75) Inventors: Jasper Lodewyk Steyn, Winchester, MA (US); Timothy J. Brosnihan, Natick, MA (US); Joyce H. Wu, Somerville, MA (US); Mark B. Andersson, Boston, MA (US); Richard S. Payne, Andover, MA (US); John J. Fijol, Shrewsbury, MA (US); Roger W. Barton, Grand Marais, MN (US); Nesbitt W. Hagood, Wellesley, MA (US)

(73) Assignee: Pixtronix, Inc., Andover, MA (US)

( * ) Notice: Subject to any disclaimer, the term of this patent is extended or adjusted under 35 U.S.C. 154(b) by 0 days.

(21) Appl. No.: 12/370,471

(22) Filed: Feb. 12, 2009

(65) Prior Publication Data

US 2009/0195855 A1 Aug. 6, 2009

Related U.S. Application Data

(63) Continuation-in-part of application No. 12/045,518, filed on Mar. 10, 2008, now abandoned, which is a continuation of application No. 11/361,785, filed on Feb. 23, 2006, now Pat. No. 7,405,852.

(60) Provisional application No. 61/028,137, filed on Feb. 12, 2008, provisional application No. 61/108,783, filed on Oct. 27, 2008, provisional application No. 61/109,045, filed on Oct. 28, 2008.

(51) Int. Cl.
*G02B 26/00* (2006.01)
*G02B 26/02* (2006.01)

(52) U.S. Cl.
USPC .......................................... 359/290; 359/233

(58) Field of Classification Search
USPC ................ 359/198.1, 224.1, 224.2, 233, 290, 359/291, 292
See application file for complete search history.

(56) References Cited

U.S. PATENT DOCUMENTS

| | | |
|---|---|---|
| 4,067,043 A | 1/1978 | Perry |
| 4,074,253 A | 2/1978 | Nadir |

(Continued)

FOREIGN PATENT DOCUMENTS

| | | |
|---|---|---|
| CN | 1309782 A | 8/2001 |
| CN | 1390045 A | 1/2003 |

(Continued)

OTHER PUBLICATIONS

Judy, et al, "Self-Adjusting Microstructures(SAMS)," Proceedings of the Workshop on Micro Electro Mechanical Systems, New York, Jan. 30, 1991, vol. Workshop 4, pp. 51-56.

(Continued)

*Primary Examiner* — William Choi
(74) *Attorney, Agent, or Firm* — Ropes & Gray LLP

(57) ABSTRACT

The invention relates to a spatial light modulator including a substrate having a surface and a modulation assembly coupled to the substrate including a modulation element and a compliant beam. The modulation assembly is configured to limit the bending of the compliant beam towards an opposing surface that would otherwise be caused by inherent stresses within the compliant beam. The invention also relates to a method of manufacturing a spatial light modulator including the steps of forming and releasing a modulation assembly that has a modulation element and a compliant beam formed in a pre-release position to have an intended inherent stress state. As a result of the stress state in the compliant beam, upon release of the compliant beam, the compliant beam bends into a rest position which is different than the pre-release position, where the rest position is based in part on the intended inherent stress state.

48 Claims, 31 Drawing Sheets

(56) References Cited

U.S. PATENT DOCUMENTS

| | | |
|---|---|---|
| 4,421,381 A | 12/1983 | Ueda et al. |
| 4,559,535 A | 12/1985 | Watkins et al. |
| 4,563,836 A | 1/1986 | Woodruff et al. |
| 4,564,836 A | 1/1986 | Vuilleumier et al. |
| 4,582,396 A | 4/1986 | Bos et al. |
| 4,673,253 A | 6/1987 | Tanabe et al. |
| 4,728,936 A | 3/1988 | Guscott et al. |
| 4,744,640 A | 5/1988 | Phillips |
| 4,889,603 A | 12/1989 | DiSanto et al. |
| 4,958,911 A | 9/1990 | Beiswenger et al. |
| 4,991,941 A | 2/1991 | Kalmanash |
| 5,005,108 A | 4/1991 | Pristash et al. |
| 5,025,346 A | 6/1991 | Tang et al. |
| 5,025,356 A | 6/1991 | Gawad |
| 5,042,900 A | 8/1991 | Parker |
| 5,044,734 A | 9/1991 | Sperl et al. |
| 5,050,946 A | 9/1991 | Hathaway et al. |
| 5,061,049 A | 10/1991 | Hornbeck |
| 5,062,689 A | 11/1991 | Koehler |
| 5,078,479 A | 1/1992 | Vuilleumier |
| 5,093,652 A | 3/1992 | Bull et al. |
| 5,096,279 A | 3/1992 | Hornbeck et al. |
| 5,128,787 A | 7/1992 | Blonder |
| 5,136,480 A | 8/1992 | Pristash et al. |
| 5,136,751 A | 8/1992 | Coyne et al. |
| 5,142,405 A | 8/1992 | Hornbeck |
| 5,184,248 A | 2/1993 | De Vaan et al. |
| 5,184,428 A | 2/1993 | Feldt et al. |
| 5,198,730 A | 3/1993 | Vancil |
| 5,202,950 A | 4/1993 | Arego et al. |
| 5,233,385 A | 8/1993 | Sampsell |
| 5,233,459 A | 8/1993 | Bozler et al. |
| 5,245,454 A | 9/1993 | Blonder |
| 5,266,612 A | 11/1993 | Kim et al. |
| 5,278,652 A | 1/1994 | Urbanus et al. |
| 5,280,277 A | 1/1994 | Hornbeck |
| 5,319,061 A | 6/1994 | Ramaswamy |
| 5,319,491 A | 6/1994 | Selbrede |
| 5,339,116 A | 8/1994 | Urbanus et al. |
| 5,339,179 A | 8/1994 | Rudisill et al. |
| 5,359,345 A | 10/1994 | Hunter |
| 5,379,135 A | 1/1995 | Nakagaki et al. |
| 5,396,350 A | 3/1995 | Beeson et al. |
| 5,416,631 A | 5/1995 | Yagi |
| 5,440,197 A | 8/1995 | Gleckman |
| 5,452,024 A | 9/1995 | Sampsell |
| 5,461,411 A | 10/1995 | Florence et al. |
| 5,465,175 A | 11/1995 | Woodgate et al. |
| 5,467,104 A | 11/1995 | Furness, III et al. |
| 5,477,086 A | 12/1995 | Rostoker et al. |
| 5,479,279 A | 12/1995 | Barbier et al. |
| 5,491,347 A | 2/1996 | Allen et al. |
| 5,493,439 A | 2/1996 | Engle |
| 5,497,172 A | 3/1996 | Doherty et al. |
| 5,497,258 A | 3/1996 | Ju et al. |
| 5,499,127 A | 3/1996 | Tsubota et al. |
| 5,504,389 A | 4/1996 | Dickey |
| 5,504,614 A * | 4/1996 | Webb et al. ................ 359/223.1 |
| 5,510,824 A | 4/1996 | Nelson |
| 5,517,341 A | 5/1996 | Kim et al. |
| 5,517,347 A | 5/1996 | Sampsell |
| 5,519,565 A | 5/1996 | Kalt et al. |
| 5,523,803 A | 6/1996 | Urbanus et al. |
| 5,526,051 A | 6/1996 | Gove et al. |
| 5,528,262 A | 6/1996 | McDowall et al. |
| 5,548,301 A | 8/1996 | Kornher et al. |
| 5,548,670 A | 8/1996 | Koike |
| 5,552,925 A | 9/1996 | Worley |
| 5,559,389 A | 9/1996 | Spindt et al. |
| 5,568,964 A | 10/1996 | Parker et al. |
| 5,578,185 A | 11/1996 | Bergeron et al. |
| 5,579,035 A | 11/1996 | Beiswenger |
| 5,579,240 A | 11/1996 | Buus |
| 5,591,049 A | 1/1997 | Dohnishi |
| 5,596,339 A | 1/1997 | Furness, III et al. |
| 5,596,369 A | 1/1997 | Chau |
| 5,613,751 A | 3/1997 | Parker et al. |
| 5,618,096 A | 4/1997 | Parker et al. |
| 5,619,266 A | 4/1997 | Tomita et al. |
| 5,622,612 A | 4/1997 | Mihara et al. |
| 5,629,784 A | 5/1997 | Abileah et al. |
| 5,629,787 A | 5/1997 | Tsubota et al. |
| 5,655,832 A | 8/1997 | Pelka et al. |
| 5,655,838 A | 8/1997 | Ridley et al. |
| 5,659,327 A | 8/1997 | Furness, III et al. |
| 5,663,917 A | 9/1997 | Oka et al. |
| 5,666,226 A | 9/1997 | Ezra et al. |
| 5,677,749 A | 10/1997 | Tsubota et al. |
| 5,684,354 A | 11/1997 | Gleckman |
| 5,687,465 A | 11/1997 | Hinata et al. |
| 5,691,695 A | 11/1997 | Lahiff |
| 5,694,227 A | 12/1997 | Starkweather |
| 5,724,062 A | 3/1998 | Hunter |
| 5,731,802 A | 3/1998 | Aras et al. |
| 5,745,193 A | 4/1998 | Urbanus et al. |
| 5,745,203 A | 4/1998 | Valliath et al. |
| 5,745,281 A | 4/1998 | Yi et al. |
| 5,745,284 A | 4/1998 | Goldberg et al. |
| 5,771,321 A | 6/1998 | Stern |
| 5,781,331 A | 7/1998 | Carr et al. |
| 5,781,333 A | 7/1998 | Lanzillotta et al. |
| 5,784,189 A | 7/1998 | Bozler et al. |
| 5,794,761 A | 8/1998 | Renaud et al. |
| 5,801,792 A | 9/1998 | Smith et al. |
| 5,808,800 A | 9/1998 | Handschy et al. |
| 5,810,469 A | 9/1998 | Weinreich |
| 5,835,255 A | 11/1998 | Miles |
| 5,835,256 A | 11/1998 | Huibers |
| 5,854,872 A | 12/1998 | Tai |
| 5,867,302 A * | 2/1999 | Fleming ........................ 359/291 |
| 5,876,107 A | 3/1999 | Parker et al. |
| 5,884,872 A | 3/1999 | Greenhalgh |
| 5,889,625 A | 3/1999 | Chen et al. |
| 5,894,686 A | 4/1999 | Parker et al. |
| 5,895,115 A | 4/1999 | Parker et al. |
| 5,917,692 A | 6/1999 | Schmitz et al. |
| 5,921,652 A | 7/1999 | Parker et al. |
| 5,936,596 A | 8/1999 | Yoshida et al. |
| 5,943,223 A | 8/1999 | Pond |
| 5,953,469 A | 9/1999 | Zhou |
| 5,975,711 A | 11/1999 | Parker et al. |
| 5,986,628 A | 11/1999 | Tuenge et al. |
| 5,986,796 A | 11/1999 | Miles |
| 5,986,828 A | 11/1999 | Wood et al. |
| 5,990,990 A | 11/1999 | Crabtree |
| 5,995,688 A | 11/1999 | Aksyuk et al. |
| 6,008,781 A | 12/1999 | Furness, III et al. |
| 6,008,929 A | 12/1999 | Akimoto et al. |
| 6,028,656 A | 2/2000 | Buhrer et al. |
| 6,030,089 A | 2/2000 | Parker et al. |
| 6,034,807 A | 3/2000 | Little et al. |
| 6,040,796 A | 3/2000 | Matsugatani et al. |
| 6,040,937 A | 3/2000 | Miles |
| 6,046,840 A | 4/2000 | Huibers |
| 6,049,317 A | 4/2000 | Thompson et al. |
| 6,055,090 A | 4/2000 | Miles |
| 6,069,676 A | 5/2000 | Yuyama |
| 6,079,838 A | 6/2000 | Parker et al. |
| 6,111,560 A | 8/2000 | May |
| 6,130,735 A | 10/2000 | Hatanaka et al. |
| 6,137,313 A | 10/2000 | Wong et al. |
| 6,154,586 A | 11/2000 | MacDonald et al. |
| 6,158,867 A | 12/2000 | Parker et al. |
| 6,162,657 A | 12/2000 | Schiele et al. |
| 6,168,395 B1 | 1/2001 | Quenzer et al. |
| 6,172,657 B1 | 1/2001 | Kamakura et al. |
| 6,172,797 B1 | 1/2001 | Huibers |
| 6,174,064 B1 | 1/2001 | Kalantar et al. |
| 6,195,196 B1 | 2/2001 | Kimura et al. |
| 6,201,633 B1 | 3/2001 | Peeters et al. |
| 6,201,664 B1 | 3/2001 | Le et al. |
| 6,206,550 B1 | 3/2001 | Fukushima et al. |
| 6,219,119 B1 | 4/2001 | Nakai |
| 6,225,991 B1 | 5/2001 | McKnight |

| Patent | Date | Name |
|---|---|---|
| 6,227,677 B1 | 5/2001 | Willis |
| 6,249,169 B1 | 6/2001 | Okada |
| 6,249,269 B1 | 6/2001 | Blalock et al. |
| 6,249,370 B1 | 6/2001 | Takeuchi et al. |
| 6,266,240 B1 | 7/2001 | Urban et al. |
| 6,282,951 B1 | 9/2001 | Loga et al. |
| 6,285,270 B1 | 9/2001 | Lane et al. |
| 6,288,824 B1 | 9/2001 | Kastalsky |
| 6,288,829 B1 | 9/2001 | Kimura et al. |
| 6,295,054 B1 | 9/2001 | McKnight |
| 6,296,383 B1 | 10/2001 | Henningsen |
| 6,296,838 B1 | 10/2001 | Bindra et al. |
| 6,300,154 B2 | 10/2001 | Clark et al. |
| 6,300,294 B1 | 10/2001 | Robbins et al. |
| 6,317,103 B1 | 11/2001 | Furness, III et al. |
| 6,323,834 B1 | 11/2001 | Colgan et al. |
| 6,329,967 B1 | 12/2001 | Little et al. |
| 6,329,974 B1 | 12/2001 | Walker et al. |
| 6,367,940 B1 | 4/2002 | Parker et al. |
| 6,388,661 B1 | 5/2002 | Richards |
| 6,392,736 B1 | 5/2002 | Furukawa et al. |
| 6,402,335 B1 | 6/2002 | Kalantar et al. |
| 6,402,355 B1 | 6/2002 | Kinouchi |
| 6,404,942 B1 | 6/2002 | Edwards et al. |
| 6,407,851 B1 | 6/2002 | Islam et al. |
| 6,411,423 B2 | 6/2002 | Ham et al. |
| 6,424,329 B1 | 7/2002 | Okita |
| 6,429,625 B1 | 8/2002 | LeFevre et al. |
| 6,429,628 B2 | 8/2002 | Nakagawa |
| 6,459,467 B1 | 10/2002 | Hashimoto et al. |
| 6,471,879 B2 | 10/2002 | Hanson et al. |
| 6,473,220 B1 | 10/2002 | Clikeman et al. |
| 6,476,886 B2 | 11/2002 | Krusius et al. |
| 6,483,613 B1 | 11/2002 | Woodgate et al. |
| 6,498,685 B1 | 12/2002 | Johnson |
| 6,504,985 B2 | 1/2003 | Parker et al. |
| 6,507,138 B1 | 1/2003 | Rodgers et al. |
| 6,508,563 B2 | 1/2003 | Parker et al. |
| 6,514,111 B2 | 2/2003 | Ebihara et al. |
| 6,523,961 B2 | 2/2003 | Ilkov et al. |
| 6,529,250 B1 | 3/2003 | Murakami et al. |
| 6,529,265 B1 | 3/2003 | Henningsen |
| 6,531,329 B2 | 3/2003 | Asakura et al. |
| 6,531,947 B1 | 3/2003 | Weaver et al. |
| 6,532,044 B1 | 3/2003 | Conner et al. |
| 6,535,256 B1 | 3/2003 | Ishihara et al. |
| 6,535,311 B1 | 3/2003 | Lindquist |
| 6,556,258 B1 | 4/2003 | Yoshida et al. |
| 6,556,261 B1 | 4/2003 | Krusius et al. |
| 6,559,827 B1 | 5/2003 | Mangerson |
| 6,567,063 B1 | 5/2003 | Okita |
| 6,567,138 B1 | 5/2003 | Krusius et al. |
| 6,574,033 B1 | 6/2003 | Chui et al. |
| 6,576,887 B2 | 6/2003 | Watson et al. |
| 6,582,095 B1 | 6/2003 | Toyoda et al. |
| 6,583,915 B1 | 6/2003 | Hong et al. |
| 6,589,625 B1 | 7/2003 | Kothari et al. |
| 6,591,049 B2 | 7/2003 | Williams et al. |
| 6,593,677 B2 | 7/2003 | Behin et al. |
| 6,600,474 B1 | 7/2003 | Heines et al. |
| 6,626,540 B2 | 9/2003 | Ouchi et al. |
| 6,633,301 B1 | 10/2003 | Dallas et al. |
| 6,639,570 B2 | 10/2003 | Furness, III et al. |
| 6,639,572 B1 | 10/2003 | Little et al. |
| 6,650,455 B2 | 11/2003 | Miles |
| 6,650,822 B1 | 11/2003 | Zhou |
| 6,664,779 B2 | 12/2003 | Lopes et al. |
| 6,666,561 B1 | 12/2003 | Blakley |
| 6,671,078 B2 | 12/2003 | Flanders et al. |
| 6,674,562 B1 | 1/2004 | Miles |
| 6,677,709 B1 | 1/2004 | Ma et al. |
| 6,677,936 B2 | 1/2004 | Jacobsen et al. |
| 6,678,029 B2 | 1/2004 | Suzuki et al. |
| 6,680,792 B2 | 1/2004 | Miles |
| 6,687,896 B1 | 2/2004 | Royce et al. |
| 6,690,422 B1 | 2/2004 | Daly et al. |
| 6,697,035 B2 | 2/2004 | Sugahara et al. |
| 6,698,348 B1 | 3/2004 | Bloss |
| 6,698,349 B2 | 3/2004 | Komata |
| 6,701,039 B2 | 3/2004 | Bourgeois et al. |
| 6,707,176 B1 | 3/2004 | Rodgers |
| 6,710,008 B2 | 3/2004 | Chang et al. |
| 6,710,538 B1 | 3/2004 | Ahn et al. |
| 6,710,908 B2 | 3/2004 | Miles et al. |
| 6,710,920 B1 | 3/2004 | Mashitani et al. |
| 6,712,071 B1 | 3/2004 | Parker |
| 6,712,481 B2 | 3/2004 | Parker et al. |
| 6,731,355 B2 | 5/2004 | Miyashita |
| 6,731,492 B2 | 5/2004 | Goodwin-Johansson |
| 6,733,354 B1 | 5/2004 | Cathey et al. |
| 6,738,177 B1 | 5/2004 | Gutierrez et al. |
| 6,741,377 B2 | 5/2004 | Miles |
| 6,746,886 B2 | 6/2004 | Duncan et al. |
| 6,749,312 B2 | 6/2004 | Parker et al. |
| 6,750,930 B2 | 6/2004 | Yoshii et al. |
| 6,752,505 B2 | 6/2004 | Parker et al. |
| 6,755,534 B2 | 6/2004 | Veligdan et al. |
| 6,755,547 B2 | 6/2004 | Parker |
| 6,760,505 B1 | 7/2004 | Street et al. |
| 6,762,743 B2 | 7/2004 | Yoshihara et al. |
| 6,762,868 B2 | 7/2004 | Liu et al. |
| 6,764,796 B2 | 7/2004 | Fries |
| 6,774,964 B2 | 8/2004 | Funamoto et al. |
| 6,775,048 B1 | 8/2004 | Starkweather et al. |
| 6,778,228 B2 | 8/2004 | Murakami et al. |
| 6,778,248 B1 | 8/2004 | Ootaguro et al. |
| 6,785,454 B2 | 8/2004 | Abe |
| 6,787,969 B2 | 9/2004 | Grade et al. |
| 6,788,371 B2 | 9/2004 | Tanada et al. |
| 6,794,119 B2 | 9/2004 | Miles |
| 6,795,064 B2 | 9/2004 | Walker et al. |
| 6,796,668 B2 | 9/2004 | Parker et al. |
| 6,798,935 B2 | 9/2004 | Bourgeois et al. |
| 6,800,996 B2 | 10/2004 | Nagai et al. |
| 6,809,851 B1 | 10/2004 | Gurcan |
| 6,819,386 B2 | 11/2004 | Roosendaal et al. |
| 6,819,465 B2 | 11/2004 | Clikeman et al. |
| 6,822,734 B1 | 11/2004 | Eidelman et al. |
| 6,825,470 B1 | 11/2004 | Bawolek et al. |
| 6,825,499 B2 | 11/2004 | Nakajima et al. |
| 6,827,456 B2 | 12/2004 | Parker et al. |
| 6,831,678 B1 | 12/2004 | Travis |
| 6,832,511 B2 | 12/2004 | Samoto et al. |
| 6,835,111 B2 | 12/2004 | Ahn et al. |
| 6,844,959 B2 | 1/2005 | Huibers et al. |
| 6,846,082 B2 | 1/2005 | Glent-Madsen et al. |
| 6,846,089 B2 | 1/2005 | Stevenson et al. |
| 6,847,425 B2 | 1/2005 | Tanada et al. |
| 6,847,428 B1 | 1/2005 | Sekiguchi et al. |
| 6,852,095 B1 | 2/2005 | Ray |
| 6,857,751 B2 | 2/2005 | Penn et al. |
| 6,859,625 B2 | 2/2005 | Sawada |
| 6,862,072 B2 | 3/2005 | Liu et al. |
| 6,863,219 B1 | 3/2005 | Jacobsen et al. |
| 6,864,618 B2 | 3/2005 | Miller et al. |
| 6,867,192 B1 | 3/2005 | Armour et al. |
| 6,867,896 B2 | 3/2005 | Miles |
| 6,873,311 B2 | 3/2005 | Yoshihara et al. |
| 6,879,307 B1 | 4/2005 | Stern |
| 6,886,956 B2 | 5/2005 | Parker et al. |
| 6,887,202 B2 | 5/2005 | Currie et al. |
| 6,888,678 B2 | 5/2005 | Nishiyama et al. |
| 6,889,565 B2 | 5/2005 | DeConde et al. |
| 6,893,677 B2 | 5/2005 | Yamada et al. |
| 6,897,164 B2 | 5/2005 | Baude et al. |
| 6,897,843 B2 | 5/2005 | Ayres et al. |
| 6,900,072 B2 | 5/2005 | Patel et al. |
| 6,906,847 B2 | 6/2005 | Huibers et al. |
| 6,911,891 B2 | 6/2005 | Qiu et al. |
| 6,911,964 B2 | 6/2005 | Lee et al. |
| 6,912,082 B1 | 6/2005 | Lu et al. |
| 6,919,981 B2 | 7/2005 | Clikeman et al. |
| 6,934,080 B2 | 8/2005 | Saccomanno et al. |
| 6,936,013 B2 | 8/2005 | Pevoto |
| 6,936,968 B2 | 8/2005 | Cross et al. |
| 6,939,013 B2 | 9/2005 | Asao |
| 6,940,631 B2 | 9/2005 | Ishikawa |
| 6,943,495 B2 | 9/2005 | Ma et al. |

| Patent/Publication | Date | Inventor |
|---|---|---|
| 6,947,107 B2 | 9/2005 | Yoshii et al. |
| 6,947,195 B2 | 9/2005 | Ohtaka et al. |
| 6,950,240 B2 | 9/2005 | Matsuo |
| 6,952,301 B2 | 10/2005 | Huibers |
| 6,953,375 B2 | 10/2005 | Ahn et al. |
| 6,961,167 B2 | 11/2005 | Prins et al. |
| 6,962,418 B2 | 11/2005 | Utsumi et al. |
| 6,962,419 B2 | 11/2005 | Huibers |
| 6,963,330 B2 | 11/2005 | Sugahara et al. |
| 6,965,375 B1 | 11/2005 | Gettemy et al. |
| 6,967,698 B2 | 11/2005 | Tanoue et al. |
| 6,967,763 B2 | 11/2005 | Fujii et al. |
| 6,969,635 B2 | 11/2005 | Patel et al. |
| 6,970,227 B2 | 11/2005 | Kida et al. |
| 6,977,710 B2 | 12/2005 | Akiyama et al. |
| 6,980,349 B1 | 12/2005 | Huibers et al. |
| 6,985,205 B2 | 1/2006 | Chol et al. |
| 6,992,375 B2 | 1/2006 | Robbins et al. |
| 6,996,306 B2 | 2/2006 | Chen et al. |
| 7,004,610 B2 | 2/2006 | Yamashita et al. |
| 7,004,611 B2 | 2/2006 | Parker et al. |
| 7,012,726 B1 | 3/2006 | Miles |
| 7,012,732 B2 | 3/2006 | Miles |
| 7,014,349 B2 | 3/2006 | Shinohara et al. |
| 7,019,809 B2 | 3/2006 | Sekiguchi |
| 7,026,821 B2 | 4/2006 | Martin et al. |
| 7,038,758 B2 | 5/2006 | Suzuki |
| 7,042,618 B2 | 5/2006 | Selbrede et al. |
| 7,042,643 B2 | 5/2006 | Miles |
| 7,046,221 B2 | 5/2006 | Malzbender |
| 7,046,905 B1 | 5/2006 | Gardiner et al. |
| 7,048,905 B2 | 5/2006 | Paparatto et al. |
| 7,050,035 B2 | 5/2006 | Iisaka et al. |
| 7,050,141 B2 | 5/2006 | Yokoue |
| 7,050,219 B2 | 5/2006 | Kimura et al. |
| 7,050,790 B2 | 5/2006 | Yamaga |
| 7,057,790 B2 | 6/2006 | Selbrede |
| 7,060,895 B2 | 6/2006 | Kothari et al. |
| 7,071,611 B2 | 7/2006 | Yonekubo et al. |
| 7,072,096 B2 | 7/2006 | Holman et al. |
| 7,075,702 B2 | 7/2006 | Huibers et al. |
| 7,092,142 B2 | 8/2006 | Selebrede et al. |
| 7,110,158 B2 | 9/2006 | Miles |
| 7,116,464 B2 | 10/2006 | Osawa et al. |
| 7,119,944 B2 | 10/2006 | Patel et al. |
| 7,123,216 B1 | 10/2006 | Miles |
| 7,123,796 B2 | 10/2006 | Steckl et al. |
| 7,126,738 B2 | 10/2006 | Miles |
| 7,140,751 B2 | 11/2006 | Lin |
| 7,156,548 B2 | 1/2007 | Teng et al. |
| 7,161,094 B2 | 1/2007 | Kothari et al. |
| 7,164,250 B2 | 1/2007 | Boscolo et al. |
| 7,184,202 B2 | 2/2007 | Miles et al. |
| 7,196,837 B2 | 3/2007 | Sampsell et al. |
| 7,198,982 B2 | 4/2007 | Patel et al. |
| 7,199,916 B2 | 4/2007 | Faase et al. |
| 7,215,459 B2 | 5/2007 | Huibers et al. |
| 7,217,588 B2 | 5/2007 | Hartzell et al. |
| 7,227,677 B2 | 6/2007 | Ravnkilde et al. |
| 7,271,945 B2 | 9/2007 | Hagood et al. |
| 7,274,416 B2 | 9/2007 | Feenstra et al. |
| 7,291,363 B2 | 11/2007 | Miller |
| 7,292,235 B2 | 11/2007 | Nose |
| 7,298,448 B2 | 11/2007 | Wu |
| 7,304,785 B2 | 12/2007 | Hagood et al. |
| 7,304,786 B2 | 12/2007 | Hagood et al. |
| 7,315,294 B2 | 1/2008 | Richards |
| 7,365,897 B2 | 4/2008 | Hagood et al. |
| 7,374,328 B2 | 5/2008 | Kuroda et al. |
| 7,391,493 B2 | 6/2008 | Kim |
| 7,391,552 B2 | 6/2008 | Barton et al. |
| 7,405,852 B2 | 7/2008 | Hagood et al. |
| 7,417,735 B2 | 8/2008 | Cummings et al. |
| 7,417,782 B2 | 8/2008 | Hagood et al. |
| 7,460,290 B2 | 12/2008 | Hagood et al. |
| 7,463,227 B2 | 12/2008 | Van Gorkom |
| 7,502,159 B2 | 3/2009 | Hagood et al. |
| 7,529,012 B2 | 5/2009 | Hayes et al. |
| 7,573,547 B2 | 8/2009 | Palmateer et al. |
| 7,666,049 B2 | 2/2010 | Saito et al. |
| 7,715,080 B2 | 5/2010 | Natarajan et al. |
| 7,742,215 B2 | 6/2010 | Hagood, IV |
| 7,746,529 B2 | 6/2010 | Hagood et al. |
| 7,826,127 B2 | 11/2010 | Khonsari et al. |
| 7,920,317 B2 | 4/2011 | Lee et al. |
| 7,975,665 B2 | 7/2011 | Mori |
| 7,999,994 B2 | 8/2011 | Hagood, IV et al. |
| 8,169,679 B2 | 5/2012 | Wu et al. |
| 8,310,442 B2 | 11/2012 | Hagood et al. |
| 2001/0001260 A1 | 5/2001 | Parker et al. |
| 2001/0028993 A1 | 10/2001 | Sanford |
| 2001/0040538 A1 | 11/2001 | Quanrud |
| 2001/0043177 A1 | 11/2001 | Huston et al. |
| 2001/0043208 A1 | 11/2001 | Furness et al. |
| 2001/0048265 A1 | 12/2001 | Miller et al. |
| 2001/0048431 A1 | 12/2001 | Laffargue et al. |
| 2001/0053075 A1 | 12/2001 | Parker et al. |
| 2002/0000959 A1 | 1/2002 | Colgan et al. |
| 2002/0001051 A1 | 1/2002 | Krusius et al. |
| 2002/0009275 A1 | 1/2002 | Williams et al. |
| 2002/0015215 A1 | 2/2002 | Miles |
| 2002/0024641 A1 | 2/2002 | Ilkov et al. |
| 2002/0024711 A1 | 2/2002 | Miles |
| 2002/0030566 A1 | 3/2002 | Bozler et al. |
| 2002/0047172 A1 | 4/2002 | Reid |
| 2002/0054424 A1 | 5/2002 | Miles |
| 2002/0054487 A1 | 5/2002 | Parker et al. |
| 2002/0056900 A1 | 5/2002 | Liu et al. |
| 2002/0063218 A1 | 5/2002 | Maydanich et al. |
| 2002/0063661 A1 | 5/2002 | Comiskey et al. |
| 2002/0070931 A1 | 6/2002 | Ishikawa |
| 2002/0075555 A1 | 6/2002 | Miles |
| 2002/0080598 A1 | 6/2002 | Parker et al. |
| 2002/0093722 A1 | 7/2002 | Chan et al. |
| 2002/0109903 A1 | 8/2002 | Kaeriyama |
| 2002/0113281 A1 | 8/2002 | Cunningham et al. |
| 2002/0126364 A1 | 9/2002 | Miles |
| 2002/0126387 A1 | 9/2002 | Ishikawa et al. |
| 2002/0132389 A1 | 9/2002 | Patel et al. |
| 2002/0141174 A1 | 10/2002 | Parker et al. |
| 2002/0149828 A1 | 10/2002 | Miles et al. |
| 2002/0150698 A1 | 10/2002 | Kawabata |
| 2002/0163482 A1 | 11/2002 | Sullivan |
| 2002/0163484 A1 | 11/2002 | Furness et al. |
| 2002/0163709 A1 | 11/2002 | Mirza |
| 2002/0171327 A1 | 11/2002 | Miller et al. |
| 2002/0181597 A1 | 12/2002 | Okada |
| 2002/0185699 A1 | 12/2002 | Reid |
| 2002/0191267 A1 | 12/2002 | Flanders et al. |
| 2002/0195423 A1 | 12/2002 | Patel et al. |
| 2002/0196522 A1 | 12/2002 | Little et al. |
| 2003/0001815 A1 | 1/2003 | Cui |
| 2003/0007344 A1 | 1/2003 | Parker |
| 2003/0009898 A1 | 1/2003 | Slocum et al. |
| 2003/0023110 A1 | 1/2003 | Tam et al. |
| 2003/0029705 A1 | 2/2003 | Qiu et al. |
| 2003/0036215 A1 | 2/2003 | Reid |
| 2003/0043157 A1 | 3/2003 | Miles |
| 2003/0043337 A1 | 3/2003 | Takabayashi |
| 2003/0048036 A1 | 3/2003 | Lemkin |
| 2003/0058543 A1 | 3/2003 | Sheedy et al. |
| 2003/0063233 A1 | 4/2003 | Takagi |
| 2003/0063234 A1 | 4/2003 | Oda et al. |
| 2003/0068118 A1 | 4/2003 | Bourgeois et al. |
| 2003/0071686 A1 | 4/2003 | Lemkin |
| 2003/0072070 A1 | 4/2003 | Miles |
| 2003/0076649 A1 | 4/2003 | Speakman |
| 2003/0081315 A1 | 5/2003 | Kobayashi |
| 2003/0081402 A1 | 5/2003 | Jeon et al. |
| 2003/0085650 A1 | 5/2003 | Cathey et al. |
| 2003/0085867 A1 | 5/2003 | Grabert |
| 2003/0095081 A1 | 5/2003 | Furness et al. |
| 2003/0095398 A1 | 5/2003 | Parker et al. |
| 2003/0102810 A1 | 6/2003 | Cross et al. |
| 2003/0123245 A1 | 7/2003 | Parker et al. |
| 2003/0123246 A1 | 7/2003 | Parker |
| 2003/0123247 A1 | 7/2003 | Parker et al. |
| 2003/0128218 A1 | 7/2003 | Struyk |

| | | | | | | |
|---|---|---|---|---|---|---|
| 2003/0133284 A1 | 7/2003 | Chipchase et al. | 2005/0094240 A1 | 5/2005 | Huibers et al. | |
| 2003/0137499 A1 | 7/2003 | Iisaka | 2005/0094418 A1 | 5/2005 | Parker | |
| 2003/0152872 A1 | 8/2003 | Miles | 2005/0104804 A1 | 5/2005 | Feenstra et al. | |
| 2003/0156422 A1 | 8/2003 | Tatewaki et al. | 2005/0111238 A1 | 5/2005 | Parker | |
| 2003/0164814 A1 | 9/2003 | Starkweather et al. | 2005/0111241 A1 | 5/2005 | Parker | |
| 2003/0174422 A1 | 9/2003 | Miller et al. | 2005/0116798 A1 | 6/2005 | Bintoro et al. | |
| 2003/0174931 A1 | 9/2003 | Rodgers et al. | 2005/0122560 A1 | 6/2005 | Sampsell et al. | |
| 2003/0183008 A1 | 10/2003 | Bang et al. | 2005/0122591 A1 | 6/2005 | Parker et al. | |
| 2003/0184189 A1 | 10/2003 | Sinclair | 2005/0123243 A1 | 6/2005 | Steckl et al. | |
| 2003/0190535 A1 | 10/2003 | Fries | 2005/0123249 A1 | 6/2005 | Yun et al. | |
| 2003/0190536 A1 | 10/2003 | Fries | 2005/0123349 A1 | 6/2005 | Koch | |
| 2003/0196590 A1 | 10/2003 | Hartzell | 2005/0128370 A1 | 6/2005 | Moon | |
| 2003/0202338 A1 | 10/2003 | Parker | 2005/0134805 A1 | 6/2005 | Conner et al. | |
| 2003/0210811 A1 | 11/2003 | Dubowsky et al. | 2005/0140636 A1 | 6/2005 | Chung et al. | |
| 2003/0231160 A1 | 12/2003 | Yoshihara et al. | 2005/0141076 A1 | 6/2005 | Bausenwein et al. | |
| 2004/0001033 A1 | 1/2004 | Goodwin-Johansson et al. | 2005/0151940 A1 | 7/2005 | Asao | |
| 2004/0012946 A1 | 1/2004 | Parker et al. | 2005/0157365 A1 | 7/2005 | Ravnkilde et al. | |
| 2004/0027636 A1 | 2/2004 | Miles | 2005/0157376 A1 | 7/2005 | Huibers et al. | |
| 2004/0051929 A1 | 3/2004 | Sampsell et al. | 2005/0168431 A1 | 8/2005 | Chui | |
| 2004/0058532 A1 | 3/2004 | Miles et al. | 2005/0168789 A1 | 8/2005 | Glent-Madsen | |
| 2004/0076008 A1 | 4/2004 | Ikeda | 2005/0171408 A1 | 8/2005 | Parker | |
| 2004/0080240 A1 | 4/2004 | Miller et al. | 2005/0172625 A1 | 8/2005 | Starkweather et al. | |
| 2004/0080484 A1 | 4/2004 | Heines et al. | 2005/0179977 A1 | 8/2005 | Chui et al. | |
| 2004/0080927 A1 | 4/2004 | Parker et al. | 2005/0195467 A1 | 9/2005 | Kothari et al. | |
| 2004/0085749 A1 | 5/2004 | Parker et al. | 2005/0195468 A1 | 9/2005 | Sampsell | |
| 2004/0088629 A1 | 5/2004 | Ott | 2005/0206991 A1 | 9/2005 | Chui et al. | |
| 2004/0090144 A1 | 5/2004 | Miller et al. | 2005/0207154 A1 | 9/2005 | Parker | |
| 2004/0095739 A1 | 5/2004 | Parker et al. | 2005/0207178 A1 | 9/2005 | Parker | |
| 2004/0100677 A1 | 5/2004 | Huibers et al. | 2005/0212734 A1 | 9/2005 | Kimura | |
| 2004/0113903 A1 | 6/2004 | Mikami et al. | 2005/0212738 A1 | 9/2005 | Gally | |
| 2004/0114346 A1 | 6/2004 | Parker et al. | 2005/0213183 A9 | 9/2005 | Miles | |
| 2004/0122328 A1 | 6/2004 | Wang et al. | 2005/0213322 A1 | 9/2005 | Parker | |
| 2004/0125062 A1 | 7/2004 | Yamamoto et al. | 2005/0213323 A1 | 9/2005 | Parker | |
| 2004/0125346 A1 | 7/2004 | Huibers | 2005/0213349 A1 | 9/2005 | Parker | |
| 2004/0135273 A1 | 7/2004 | Parker et al. | 2005/0219679 A1 | 10/2005 | Ishikawa | |
| 2004/0135951 A1 | 7/2004 | Stumbo et al. | 2005/0219680 A1 | 10/2005 | Ishikawa | |
| 2004/0136204 A1 | 7/2004 | Asao | 2005/0225501 A1 | 10/2005 | Srinivasan et al. | |
| 2004/0136680 A1 | 7/2004 | Medina et al. | 2005/0225519 A1 | 10/2005 | Naugler | |
| 2004/0145580 A1 | 7/2004 | Perlman | 2005/0225732 A1 | 10/2005 | Conner et al. | |
| 2004/0145854 A1 | 7/2004 | Tamura | 2005/0225827 A1 | 10/2005 | Kastalsky | |
| 2004/0156246 A1 | 8/2004 | Nakamura | 2005/0231790 A1 | 10/2005 | Miles | |
| 2004/0157664 A1 | 8/2004 | Link | 2005/0231791 A1 | 10/2005 | Sampsell et al. | |
| 2004/0165372 A1 | 8/2004 | Parker | 2005/0237596 A1 | 10/2005 | Selbrede | |
| 2004/0171206 A1 | 9/2004 | Rodgers | 2005/0242710 A1 | 11/2005 | Yamazaki et al. | |
| 2004/0173872 A1 | 9/2004 | Park et al. | 2005/0243023 A1 | 11/2005 | Reddy et al. | |
| 2004/0179146 A1 | 9/2004 | Nilsson | 2005/0244099 A1 | 11/2005 | Pasch et al. | |
| 2004/0196215 A1 | 10/2004 | Duthaler et al. | 2005/0244949 A1 | 11/2005 | Miles | |
| 2004/0196525 A1 | 10/2004 | Fujii et al. | 2005/0245313 A1 | 11/2005 | Yoshino et al. | |
| 2004/0207768 A1 | 10/2004 | Liu | 2005/0247477 A1 | 11/2005 | Kothari et al. | |
| 2004/0207815 A1 | 10/2004 | Allen et al. | 2005/0249966 A1 | 11/2005 | Tung et al. | |
| 2004/0212759 A1 | 10/2004 | Hayashi | 2005/0253779 A1 | 11/2005 | Feenstra et al. | |
| 2004/0218149 A1 | 11/2004 | Huibers | 2005/0254115 A1 | 11/2005 | Palmateer et al. | |
| 2004/0218154 A1 | 11/2004 | Huibers | 2005/0258571 A1 | 11/2005 | Dumond et al. | |
| 2004/0218292 A1 | 11/2004 | Huibers | 2005/0259198 A1 | 11/2005 | Lubart et al. | |
| 2004/0218293 A1 | 11/2004 | Huibers | 2005/0263866 A1 | 12/2005 | Wan | |
| 2004/0223088 A1 | 11/2004 | Huibers | 2005/0265029 A1 | 12/2005 | Epstein et al. | |
| 2004/0223240 A1 | 11/2004 | Huibers | 2005/0275072 A1 | 12/2005 | Haluzak et al. | |
| 2004/0227428 A1 | 11/2004 | Sinclair | 2005/0285816 A1 | 12/2005 | Glass | |
| 2004/0233392 A1 | 11/2004 | Huibers | 2005/0286113 A1 | 12/2005 | Miles | |
| 2004/0233498 A1 | 11/2004 | Starkweather et al. | 2005/0286114 A1 | 12/2005 | Miles | |
| 2004/0240032 A1 | 12/2004 | Miles | 2006/0001942 A1 | 1/2006 | Chui et al. | |
| 2004/0240138 A1 | 12/2004 | Martin et al. | 2006/0003676 A1 | 1/2006 | Bernard et al. | |
| 2004/0246275 A1 | 12/2004 | Yoshihara et al. | 2006/0004928 A1 | 1/2006 | Hess et al. | |
| 2004/0263076 A1 | 12/2004 | De Zwart et al. | 2006/0007514 A1* | 1/2006 | Desai ........................... 359/224 | |
| 2004/0263502 A1 | 12/2004 | Dallas et al. | 2006/0007701 A1 | 1/2006 | Schoellmann et al. | |
| 2004/0263944 A1 | 12/2004 | Miles et al. | 2006/0012781 A1 | 1/2006 | Fradkin et al. | |
| 2005/0002082 A1 | 1/2005 | Miles | 2006/0023287 A1 | 2/2006 | Przybyla et al. | |
| 2005/0002086 A1 | 1/2005 | Starkweather et al. | 2006/0028708 A1 | 2/2006 | Miles | |
| 2005/0007759 A1 | 1/2005 | Parker | 2006/0028811 A1 | 2/2006 | Ross et al. | |
| 2005/0012197 A1 | 1/2005 | Smith et al. | 2006/0028817 A1 | 2/2006 | Parker | |
| 2005/0024849 A1 | 2/2005 | Parker et al. | 2006/0028840 A1 | 2/2006 | Parker | |
| 2005/0052681 A1 | 3/2005 | Kogi | 2006/0028841 A1 | 2/2006 | Parker | |
| 2005/0059184 A1 | 3/2005 | Sniegowski et al. | 2006/0028843 A1 | 2/2006 | Parker | |
| 2005/0062708 A1 | 3/2005 | Yoshihara et al. | 2006/0028844 A1 | 2/2006 | Parker | |
| 2005/0063037 A1 | 3/2005 | Selebrede et al. | 2006/0033676 A1 | 2/2006 | Faase et al. | |
| 2005/0072032 A1 | 4/2005 | McCollum et al. | 2006/0033975 A1 | 2/2006 | Miles | |
| 2005/0073471 A1 | 4/2005 | Selbrede | 2006/0038766 A1 | 2/2006 | Morita | |
| 2005/0088404 A1 | 4/2005 | Heines et al. | 2006/0038768 A1 | 2/2006 | Sagawa et al. | |
| 2005/0093465 A1 | 5/2005 | Yonekubo et al. | 2006/0044246 A1 | 3/2006 | Mignard | |

| | | | | | | |
|---|---|---|---|---|---|---|
| 2006/0044298 A1 | 3/2006 | Mignard et al. | | 2008/0158636 A1 | 7/2008 | Hagood et al. |
| 2006/0044508 A1 | 3/2006 | Mochizuki | | 2008/0165122 A1 | 7/2008 | Duthaler et al. |
| 2006/0044928 A1 | 3/2006 | Chui et al. | | 2008/0174532 A1 | 7/2008 | Lewis |
| 2006/0061559 A1 | 3/2006 | King | | 2008/0278798 A1 | 11/2008 | Hagood et al. |
| 2006/0066540 A1 | 3/2006 | Hewlett et al. | | 2008/0279727 A1 | 11/2008 | Haushalter |
| 2006/0066560 A1 | 3/2006 | Gally et al. | | 2008/0283175 A1 | 11/2008 | Hagood et al. |
| 2006/0066598 A1 | 3/2006 | Floyd | | 2008/0297880 A1 | 12/2008 | Steckl et al. |
| 2006/0066934 A1 | 3/2006 | Selbrede | | 2009/0034052 A1 | 2/2009 | Hagood et al. |
| 2006/0066937 A1 | 3/2006 | Chui | | 2009/0103164 A1 | 4/2009 | Fijol et al. |
| 2006/0077125 A1 | 4/2006 | Floyd | | 2009/0103281 A1 | 4/2009 | Koh |
| 2006/0077153 A1 | 4/2006 | Cummings et al. | | 2009/0141335 A1 | 6/2009 | Feenstra et al. |
| 2006/0077533 A1 | 4/2006 | Miles et al. | | 2009/0195855 A1 | 8/2009 | Steyn et al. |
| 2006/0092490 A1 | 5/2006 | McCollum et al. | | 2009/0284824 A1 | 11/2009 | Feenstra |
| 2006/0104061 A1 | 5/2006 | Lerner et al. | | 2011/0122474 A1 | 5/2011 | Payne et al. |
| 2006/0132383 A1 | 6/2006 | Gally et al. | | 2011/0148948 A1 | 6/2011 | Gandhi et al. |
| 2006/0132404 A1 | 6/2006 | Hayes et al. | | 2011/0164067 A1 | 7/2011 | Lewis et al. |
| 2006/0139734 A1 | 6/2006 | Selebrede et al. | | 2011/0205259 A1 | 8/2011 | Hagood, IV |
| 2006/0146389 A1 | 7/2006 | Selbrede | | 2011/0255146 A1 | 10/2011 | Brosnihan et al. |
| 2006/0152476 A1 | 7/2006 | Van Gorkom et al. | | 2011/0267668 A1 | 11/2011 | Hagood, IV et al. |
| 2006/0154078 A1 | 7/2006 | Watanabe et al. | | 2012/0133006 A1 | 5/2012 | Hasselbach et al. |
| 2006/0172745 A1 | 8/2006 | Knowles | | 2012/0169795 A1 | 7/2012 | Hagood et al. |
| 2006/0187190 A1 | 8/2006 | Hagood et al. | | 2012/0200906 A1 | 8/2012 | Wu et al. |
| 2006/0187191 A1 | 8/2006 | Hagood et al. | | 2012/0229226 A1 | 9/2012 | Oja et al. |
| 2006/0187290 A1 | 8/2006 | Nakashima | | 2012/0280971 A1 | 11/2012 | Hagood et al. |
| 2006/0187528 A1 | 8/2006 | Hagood et al. | | 2012/0320111 A1 | 12/2012 | Hagood, IV et al. |
| 2006/0209000 A1 | 9/2006 | Sumiyoshi et al. | | 2012/0320112 A1 | 12/2012 | Hagood, IV et al. |
| 2006/0209012 A1 | 9/2006 | Hagood | | 2012/0320113 A1 | 12/2012 | Hagood, IV et al. |
| 2006/0238443 A1 | 10/2006 | Derichs | | 2013/0010341 A1 | 1/2013 | Hagood et al. |
| 2006/0250325 A1 | 11/2006 | Hagood et al. | | 2013/0010342 A1 | 1/2013 | Hagood, IV et al. |
| 2006/0250676 A1 | 11/2006 | Hagood | | 2013/0010344 A1 | 1/2013 | Hagood et al. |
| 2006/0256039 A1 | 11/2006 | Hagood et al. | | | | |
| 2006/0262060 A1 | 11/2006 | Amundson | | FOREIGN PATENT DOCUMENTS | | |
| 2006/0262380 A1 | 11/2006 | Miles | | CN | 1402033 A | 3/2003 |
| 2006/0268386 A1 | 11/2006 | Selbrede et al. | | CN | 1542499 A | 11/2004 |
| 2006/0268568 A1 | 11/2006 | Oku et al. | | CN | 1555472 | 12/2004 |
| 2006/0270179 A1 | 11/2006 | Yang | | CN | 1555472 A | 12/2004 |
| 2006/0280319 A1 | 12/2006 | Wang et al. | | DE | 10332647 A1 | 2/2005 |
| 2006/0291034 A1 | 12/2006 | Patry et al. | | EP | 0 359 450 A2 | 3/1990 |
| 2006/0291771 A1 | 12/2006 | Braunisch et al. | | EP | 0366847 A2 | 5/1990 |
| 2006/0291774 A1 | 12/2006 | Schoellmann et al. | | EP | 0 415 625 A2 | 3/1991 |
| 2007/0002156 A1 | 1/2007 | Hagood et al. | | EP | 0438614 A1 | 7/1991 |
| 2007/0002413 A1 | 1/2007 | Psaltis et al. | | EP | 0 495 273 A1 | 7/1992 |
| 2007/0003055 A1 | 1/2007 | Bark et al. | | EP | 0 751 340 A2 | 1/1997 |
| 2007/0007889 A1 | 1/2007 | Bongaerts et al. | | EP | 0 786 679 A2 | 7/1997 |
| 2007/0024701 A1 | 2/2007 | Prechtl et al. | | EP | 0 884 525 A2 | 12/1998 |
| 2007/0030555 A1 | 2/2007 | Barton et al. | | EP | 0889458 A2 | 1/1999 |
| 2007/0031097 A1 | 2/2007 | Heikenfeld et al. | | EP | 1 091 342 A2 | 4/2001 |
| 2007/0035808 A1 | 2/2007 | Amundson et al. | | EP | 1091343 A2 | 4/2001 |
| 2007/0040982 A1 | 2/2007 | Nakano et al. | | EP | 1091842 A1 | 4/2001 |
| 2007/0047051 A1 | 3/2007 | Selbrede et al. | | EP | 1093142 A2 | 4/2001 |
| 2007/0047887 A1 | 3/2007 | Selbrede | | EP | 1 202 096 | 5/2002 |
| 2007/0052660 A1 | 3/2007 | Montbach et al. | | EP | 1202244 A1 | 5/2002 |
| 2007/0053652 A1 | 3/2007 | Mignard et al. | | EP | 1 426 190 | 6/2004 |
| 2007/0086078 A1 | 4/2007 | Hagood et al. | | EP | 1429310 A2 | 6/2004 |
| 2007/0091011 A1 | 4/2007 | Selbrede | | EP | 1471495 A2 | 10/2004 |
| 2007/0091038 A1 | 4/2007 | Hagood et al. | | EP | 1533853 A2 | 5/2005 |
| 2007/0103209 A1 | 5/2007 | Lee | | EP | 1551002 A2 | 7/2005 |
| 2007/0150813 A1 | 6/2007 | Selebrede et al. | | EP | 1674893 | 6/2006 |
| 2007/0159679 A1 | 7/2007 | Hagood et al. | | EP | 1734502 A1 | 12/2006 |
| 2007/0172171 A1 | 7/2007 | Van Ostrand et al. | | EP | 1 757 958 A1 | 2/2007 |
| 2007/0190265 A1 | 8/2007 | Aoki et al. | | EP | 2263968 | 12/2010 |
| 2007/0195026 A1 | 8/2007 | Hagood et al. | | EP | 1858796 | 1/2011 |
| 2007/0205969 A1 | 9/2007 | Hagood et al. | | EP | 2287110 | 2/2011 |
| 2007/0216987 A1 | 9/2007 | Hagood et al. | | EP | 1640770 | 4/2012 |
| 2007/0217108 A1 | 9/2007 | Ozawa et al. | | FR | 2 726 135 | 10/1994 |
| 2007/0223080 A1 | 9/2007 | Hagood et al. | | GB | 2343980 A | 5/2000 |
| 2007/0247401 A1 | 10/2007 | Sasagawa et al. | | JP | 57062028 A | 4/1982 |
| 2007/0279727 A1 | 12/2007 | Gandhi et al. | | JP | 57127264 U | 8/1982 |
| 2007/0297747 A1 | 12/2007 | Biernath et al. | | JP | 03-142409 | 6/1991 |
| 2008/0014557 A1 | 1/2008 | Kuhn et al. | | JP | 04-249203 | 9/1992 |
| 2008/0026066 A1 | 1/2008 | Roser | | JP | 5045648 A | 2/1993 |
| 2008/0030827 A1 | 2/2008 | Hagood et al. | | JP | 6194649 A | 7/1994 |
| 2008/0037104 A1 | 2/2008 | Hagood et al. | | JP | 8334752 A | 12/1996 |
| 2008/0062500 A1 | 3/2008 | Hagood | | JP | 9080386 | 3/1997 |
| 2008/0094853 A1 | 4/2008 | Kim et al. | | JP | 9080386 A | 3/1997 |
| 2008/0123175 A1 | 5/2008 | Hagood et al. | | JP | 09-198906 | 7/1997 |
| 2008/0129681 A1 | 6/2008 | Gandhi et al. | | JP | 09189869 A | 7/1997 |
| 2008/0145527 A1 | 6/2008 | Hagood et al. | | JP | 10282474 A | 10/1998 |
| 2008/0158635 A1 | 7/2008 | Hagood et al. | | JP | 11-015393 | 1/1999 |

| | | |
|---|---|---|
| JP | 11024038 A | 1/1999 |
| JP | 2000105547 A | 4/2000 |
| JP | 2000121970 A | 4/2000 |
| JP | 2000172219 A | 6/2000 |
| JP | 2000214831 A | 8/2000 |
| JP | 2001125014 A | 5/2001 |
| JP | 2001154642 A | 6/2001 |
| JP | 2001175216 A | 6/2001 |
| JP | 2001201698 A | 7/2001 |
| JP | 2001201767 A | 7/2001 |
| JP | 2001281563 A | 10/2001 |
| JP | 2001356327 A | 12/2001 |
| JP | 2002214543 A | 7/2002 |
| JP | 2002528763 A | 9/2002 |
| JP | 2002318564 A | 10/2002 |
| JP | 2002365650 A | 12/2002 |
| JP | 2003036057 A | 2/2003 |
| JP | 2003-162904 | 6/2003 |
| JP | 2003248463 A | 9/2003 |
| JP | 2004191736 A | 7/2004 |
| JP | 2004287215 A | 10/2004 |
| JP | 2004317785 A | 11/2004 |
| JP | 2004534280 A | 11/2004 |
| JP | 2004347982 A | 12/2004 |
| JP | 2005512119 A | 4/2005 |
| JP | 2006522360 A | 9/2006 |
| WO | WO-9401716 A1 | 1/1994 |
| WO | 9528035 A1 | 10/1995 |
| WO | WO9704436 A1 | 2/1997 |
| WO | WO-9804950 A1 | 2/1998 |
| WO | WO-9901696 A1 | 1/1999 |
| WO | WO-0050807 A1 | 8/2000 |
| WO | WO0052674 A1 | 9/2000 |
| WO | WO0055916 A1 | 9/2000 |
| WO | WO0169584 A1 | 9/2001 |
| WO | WO0207482 A2 | 1/2002 |
| WO | WO03004836 A1 | 1/2003 |
| WO | WO03007049 A1 | 1/2003 |
| WO | WO-03008860 A1 | 1/2003 |
| WO | WO03040802 A2 | 5/2003 |
| WO | 03048836 | 6/2003 |
| WO | WO03048836 A2 | 6/2003 |
| WO | WO-03050448 A1 | 6/2003 |
| WO | WO-03061329 A2 | 7/2003 |
| WO | WO03069593 A2 | 8/2003 |
| WO | WO-03081315 A1 | 10/2003 |
| WO | WO2004008629 A1 | 1/2004 |
| WO | WO-2004019120 A1 | 3/2004 |
| WO | WO-2004034136 A1 | 4/2004 |
| WO | WO-2004/088629 | 10/2004 |
| WO | WO-2004086098 A2 | 10/2004 |
| WO | 2004097506 A2 | 11/2004 |
| WO | WO-2005001892 A2 | 1/2005 |
| WO | WO-2005062908 A2 | 7/2005 |
| WO | WO2005073950 | 8/2005 |
| WO | WO2005082908 A1 | 9/2005 |
| WO | WO-2006/017129 | 2/2006 |
| WO | WO-2006023077 A2 | 3/2006 |
| WO | WO-2006039315 A2 | 4/2006 |
| WO | WO-2006052755 A2 | 5/2006 |
| WO | 2006091738 A1 | 8/2006 |
| WO | 2006091904 | 8/2006 |
| WO | WO-2006091791 A2 | 8/2006 |
| WO | WO2007075832 | 7/2007 |
| WO | WO-2007123173 A1 | 11/2007 |
| WO | WO-2007145973 | 12/2007 |
| WO | WO2008026066 A1 | 3/2008 |
| WO | 2010062647 A2 | 6/2010 |

OTHER PUBLICATIONS

International Search Report and Written Opinion dated Jun. 29, 2009 in International Application No. PCT/US2009/000922.
International Preliminary Report on Patentability and Written Opinion dated Oct. 28, 2010 in International Application No. PCT/US2009/002288.
European Patent Office Examination Report dated Sep. 7, 2009 in European Patent Application No. 06847859.3.
European Search Opinion for EP Patent Application No. EP08005944, European Patent Office, Munich filed on Dec. 4, 2012.
European Search Opinion for EP Patent Application No. EP08005973, European Patent Office, Munich filed on Oct. 4, 2012.
European Search Opinion for EP Patent Application No. EP10175901, European Patent Office, Munich filed on Feb. 5, 2012.
European Search Report—EP10177217—Search Authority—Munich—Mar. 13, 2012.
European Search Report—EP10176478—Search Authority—Munich—May 4, 2012.
Extended European Search Report—EP10177223 dated Mar. 6, 2012.
European Search Opinion for EP Patent Application No. EP10175920, European Patent Office, Munich filed on Sep. 5, 2012.
Joaquirn, M., "Polyphenyl Ether Lubricants" Synthetic Lubricants and High-performance Functional Fluids, R. L. Rudnick and R. L. Shubkin, Eds., p. 239, Marcel Dekker, Inc., NY, 1999.
Markandey, V., et al., "Video Processing for DLP Display Systems," Texas Instruments Corporation, 2666: 21-32 (Mar. 13, 1996).
Notice of Allowance and Fee(s) Due, mailed Jan. 31, 2008 (U.S. Appl. No. 11/361,785).
Office Action dated Jul. 13, 2010 in Japanese Patent Application No. 2007-556428.
"BLU," Heesung Precision Ltd., http://www.hspr.co.kr/eng/product/blu.asp Retrieved on Aug. 3, 2006.
"Electronic Display Lighting Tutorials," 3M Corporation, file?//D:/Optical\Vikuiti Tutorial.htm. retrieved on Aug. 10, 2006.
"MicroLens™—Re-Inventing LCD Backlighting," Global Lighting Technologies Inc., http://www.glthome.com/tech.htm, 1-2, (2006).
"Microprism Technology for Luminaires," Reflexite Display Optics, (2004).
"Nano™ Su-8 2000 Negative Tone Photoresist Formulations 2002-2025," Micro Chem, (2002).
"Optical Design Tools for Backlight Displays," Optical Research Associates, 1-8, (2003).
"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378D0HGJgl/theme_us_vikuiti_3_0/command_AbcPageHandler/output_html Retrieved on Aug. 3, 2006.
"Prism Sheet," Mitsubishi Rayon America Inc., http://www.mrany.com/data/HTML/29.htm Retrieved on Aug. 4, 2006.
"Two Proprietary Technologies Supporting OMRON Backlight," OMRON Electronics Corporation, OMRON Electronics Components Web, www.omron.co.jp/ecb/products/bklight/english/genri/index.html, (2006).
Akimoto et al, "15.1: A 0.9-in UXGA/HDTV FLC Microdisplay," SID 00 Digest, 194-197(2000).
Alt et al, "A Gray-Scale Addressing Technique for Thin-Film-Transistor/Liquid Crystal Displays," IBM J. Res. Develop., 36(1):11-22(Jan. 1992).
AZ Displays, Inc. Complete LCD Solutions, ATM3224C-NC-FTH, (2003).
Bergquist et. al. "Field Sequential Colour Display with Adaptive Gamut", Society for Information Display, Digest of Technical Papers 2006, p. 1594.
Birch et al, "31.1: SXGA Resolution FLC Microdisplays," SID 02 Digest, 954-957(2002).
Blackstone, "Making MEMS Reliable," SPIE's OEMagazine, 32-34(Sep. 2002).
Boeuf, "Plasma display panels: physics, recent developments and key issues," J. Phys. D: Appl, Phys., 36:R53-R79(2003).
Bozler et al, "Arrays of gated field-emitter cones having 0.32 mm tip-to-tip spacing," J. Vec. Sci. Technol. B, 12(2):629-632(Mar./Apr. 1994).
Bryan-Brown, "Ultra Low Poer Bistable LCDs," SID 00, 76-79(2000).
Chino et. al. "Development of Wide-Color-Gamut Mobile Displays with Four-Primary-Color LCDs", Society of Information Display, Digest of Technical Papers 2006, p. 1221.
Clark et al, "FLC Microdisplays," Ferroelectrics, 246:97-110(2000).
Davis, "Light Emitting Diode Source Modeling for Optical Design," Reflexite Display Optics(Oct. 2004).

Davis, "Microstructured Optics for LED Applications," Reflexite Display Optics, (2002).

Doane, et al, "Display Technologies in Russia, Ukraine, and Belarus," World Technology Evaluation Center Panel Report (Dec. 1994).

Doherty, D. et. al. "Pulse Width Modulation Control of DLP Projectors", TI Technical Journal 1998, No. 3, p. 115.

Feenstra et. al. "A Reflective Display Based on Electrowetting: Principle and Properties", International Display Research Conference Proceedings 2003, p. 322.

Feng et al, "Novel integrated light-guide plates for liquid crystal display backlight," J. Opt. A: Pure Appl. Opt., 7:111-117(2005).

Feng, "High Quality Light Guide Plates that Can Control the Illumination Angle Based on Microprism Structures," Applied Physics Letters, 85(24):6016-6018(Dec. 2004).

Final Office Action dated May 18, 2007, U.S. Appl. No. 11/218,690.

Final Office Action dated Sep. 21, 2007, U.S. Appl. No. 11/546,937.

Final Office ActionDated Oct. 3, 2007, U.S. Appl. No. 11/218,690.

Foley, "NE04-21: Microstructured Plastic Optics for Display, Lighting, and Telecommunications Applications," Fresnel Optics(2001).

Funamoto et al, "Diffusive-sheetless Backlight System for Mobile Phone," IDW/AD, 1277-1280(2005).

Funamoto et. al. "LED Backlight System with Double-Prism Pattern", Journal of the Society for Information Display v. 14, p. 1045 (2006).

Goddhue et al, "Bright-field analysis of field-emission cones using high-resolution tranmission electron microscopy and the effect of structural properties on current stability," J. Vac. Sci. Technol. B, 12(2):693-696(Mar.Apr. 1994).

Hartman, "4.1: Invited paper: Two-Terminal Devices Technologies for AMLCDs," SID 95 Digest, 7-10(1995).

Heikenfeld et al., "Contrast Enhancement in Black Dielectric Electroluminescent Devices", IEEE Transactions on Electron Devices, v. 49, p. 1348 (2002).

Hewlett et al, "DLP Cinema™ projection: A hybrid frame-rate technique for flicker-free performance," Journ of the SID 9/3, 221-226(2001).

Hornbeck, "Digital Light Processing™: A New MEMS-Based Display Technology," Texas Instruments, (1996).

International Preliminary Report on Patentability dated Aug. 26, 2010, in International Application No. PCT/US2009/000922.

International Search Report (Partial) dated May 11, 2011 in International Application No. PCT/US2011/023387.

International Search Report and Written Opinion dated Jul. 21, 2009 in International Application No. PCT/US2009/002288.

Jepsen et al, "4.11: 0.9 SXGA Liquid Crystal on Silicon Panel with 450 Hz. Field Rate", MicroDisplay Coropration, 106-109, (2001).

Johnstone et al, "Theoretical limits on the freestanding length of cantilevers produced by surface micromachining technology," J. Micromech. Microeng. 12:855-861(2002).

Jones et al, "29-1: Addressing tVmin Ferroelectric Liquid Crystal Displays," (1998).

Kalantar et al, "Optical Micro Deflector Based Functional Light-Guide Plate for Backlight Unit," SID 00 Digest, 1029-1031(2000).

Kalantar, "Modulation of viewing angle on an LCD surface through backlight optics," Journal of the SID, 11(4):647-652(2003).

Kalantar, K., et al., "Backlight Unit with Dboule Surface Light Emission Using a Single Micro-structured Light-Guide Plate," p. 1182, Society for Information Display Digest (2004).

Koden et al, "Ferroelectric Liquid Crystal Display," (Sep. 17, 1997).

Kuang et al, "Dynamic Characteristics of shaped micro-actuators solved using the differential quadrature method," J. Micromech. Microeng. 14:647-655(2004).

Kunzman and G. Pettitt, "White Enhancement for Color Sequential DLP" Society for Information Display, Digest of Technical Papers 1998.

Lee et al, "P-25: A LCOS Microdisplay Driver with Frame Buffering Pixels," SID 02 Digest, 292-295(2002).

Lee et. al. "Integrated Amorphous Silicon Color Sensor on LCD Panel for LED Backlight Feedback Control System", Society for Information Display, Digest of Technical Papers 2005, p. 1376.

Liang et al, "Observation of electric field gradients near field-emission cathode arrays," Appl Phys. Lett., 66(9):1147-1149(Feb. 1995).

Liu et al, "Scaling Laws of Microactuators and Potential Applications of Electroactive Polymers in MEMS," SPIE, 3669:345-354(Mar. 1999).

Low-Temperature Polysilicon TFT Reflective Color LCD by Techno World, (1999).

Maboudian et al, "Stiction reduction processes for surface micromachines," Tribology Letters, 3:215-221(1997).

Mastrangelo et al, "Mechanical Stability and Adhesion of Microstructures Under Capillary Forces—Part I: Basic Theory," Journal of Microelectromechanical Systems, 2(1):33-43(Mar. 1993).

Mastrangelo et al, "Mechanical Stability and Adhesion of Microstructures Under Capillary Forces—Part II: Experiments," Journal of Microelectromechanical Systems, 2(1):44-55(Mar. 1993).

McLaughlin, "Progress in Projection and Large-Area Displays," Proceedings of the IEEE, 90(4):521-532(Apr. 2002).

Non Final Office Action Dated Mar. 22, 2007, U.S. Appl. No. 11/546,937.

Non Final Office Action dated Nov. 1, 2006, U.S. Appl. No. 11/218,690.

Okumura et al, "Highly-efficient backlight for liquid crystal display having no optical films," Applied Physics Letters, 83(13):2515-2517(Sep. 2003).

Pasricha et. al. "Dynamic Backlight Adaptation for Low Power Handheld Devices" IEEE Design and Test v. 21, p. 398 (2004).

Perregaux et al, "Arrays of Addressable High-Speed Optical Microshutters," IEEE, 232-235, (2001).

Qiu et al, "A Curved-Beam Bistable Mechanism," Journal of Microelectromechanical Systems, 13(2):137-145(Apr. 2004).

Qui et al, "A High-Current Electrothermal Bistable MEMS Relay," (2003).

Roosendaal et al, "25.2: A Wide Gamut, High Aperture Mobile Spectrum Sequential Liquid Crystal Display," SID 05 Digest, 1116-1119(2005).

Saeedi, et. al. "Molten-Alloy Driven Self-Assembly for Nano and Micro Scale System Integration" Fluid Dynamics and Materials Processing v. 2, p. 221 (2006).

Sato, "Research on Flexible Display Systems," Broadcast Technology, 21:10-15(2005).

Sharp Specification No. LCP-03015 for Mobile Liquid Crystal Display Group, Sharp Corporation, Jun. 13, 2003.

Shibaura Mechatronics Corporation, product brochure for panel processing, (2006).

Shikida et al, "Fabrication fo an S-shaped Microactuator," Journal of Microelectromechanical Systems, 6(1):18-24(Mar. 1997).

Sony ACX705AKM, 6.92cm Diagonal Reflective Color LCD Module, (2004).

Steyn, Lodewyck, "Electroquasistatic Zipper Actuators: A Technology Review", Dec. 2004.

Tagaya et al, "Thin Liquid-Crystal Display Backlight System with Highly Scattering Optical Transmission Polymers," Applied Optics, 40(34):6274-6280(Dec. 2001).

Takatori et al, "6.3: Field-Sequential Smectic LCD with TFT Pixel Amplifier," SID 01 Digest, 48-51(2001).

Tan and Y.C. Lee, "Soldering Technology for Optoelectronics Packaging", 1996 Electronic Components and Technology Conference, p. 26.

Teijido, J.M., "Conception and Design of Illumination Light Pipes," Thesis No. 1498 for University of Neuchatel, http://www.unige.ch/cyberdocuments/unine/theses2000/TeijidoJM/these_front.htm I:1-99 Retrieved on Aug. 3, 2006.

Tien et al, "MEMS Actuators for Silicon Micro-Optical Elements," Proc. of SPIE, 4178:256-269, (2000).

Underwood, "A review of microdisplay technologies," SID@EID, (Nov. 21 to 23, 2000).

Underwood, "LCoS through the looking glass," SID(2001).

van de Biggelaar, T. et. al. "Passive and Active Matrix Addressed Polymer Light-emitting Diode Displays", Proc. SPIE vol. 4295, p. 134 (2001).

Vangbo et al, "A lateral symmetrically bistable buckled beam," J. Micromech. Microeng., 8:29-32(1998).

Yamada et al, "52.2: Invited Paper:Color Sequential LCD Based on OCB with an LED Backlight," SID 00 Digest, 1180-1183(2000).

Yasumura et al, "Fluid Damping of an Electrostatic Actuator for Optical Switching Applications," Transducers Research Foundation (2002).

Boucinha, M., et al., "Air-gap amorphous silicon thin film transistors," Applied Physics Letters, 73(4):502-4 (1998).

Conde, J.P., et al., "Low-temperature Thin-film Silicon MEMS", Thin Solid Films 427:181-186 (2003).

Conde, J.P., et. al., "Amorphous and microcrystalline silicon deposited by hot-wire chemical vapor deposition at low substrate temperatures: application to devices and thin-film microelectromechanical systems," Thin Solid Films 395:105-111 (2001).

den Boer, W., "Active Matrix Liquid Crystal Displays," Elsevier Science & Technology Books, ISBN #0750678135, Aug. 2005.

Feenstra et al, "Electrowetting Displays," Liquavista BV, http://www.liquavista.com/documents/electrowetting_displays_whitepaper.pdf, Retrieved on Aug. 17, 2006.

Judy, M.W., "Micromechanisms Using Sidewall Beams," Dissertation 1994.

Kim, C.W., et al., "Manufacturing Technologies for the Next Generation a-Si TFT-LCD," Proceedings of the Int'l. Display Mfg. Cnf. Seoul, Korea (2000).

Legtenberg, et al., "Electrostatic Curved Electrode Actuators," Journal of Microelectromechanical Systems, 6(3):257-265 (1997).

Li, J., et al., "DRIE-Fabricated Curved-Electrode Zipping Actuators with Low Pull-In Voltage," 12th International Conference on Solid State Sensors, Actuators and Microsystems, IEE, 480-483 (2003).

Park, Y.I., et al., "Active Matrix OLED Displays Using Simple Poly-Si TFT Process," Society of Information Display, Digest, pp. 487-489 (2003).

Ravnkilde, J.T., et al, "Fabrication of Nickel Microshutter Arrays for Spatial Light Modulation," Meso 2002, also on their web site: http://www2.mic.dtu.dk/research/mems/publications/Papers/Dicon_Meso2002.pdf.

Wang, K., et al., "Highly Space-Efficient Electrostatic Zigzag Transmissive Micro-Optic Switches for an Integrated MEMS Optical Display System," Transducers 03 Conference, or on UW website, (2003).

Office Action dated Dec. 5, 2011 in Japanese Patent Application No. 2008-058190.

Office Action dated Jul. 15, 2010 in Japanese Patent Application No. 2007-556428.

Office Action dated Mar. 28, 2012 in European Patent Office Application No. 07795777.7.

Office Action dated Oct. 12, 2010 in Japanese Patent Application No. 2008-058190.

Office Action dated Sep. 16, 2011 in Japanese Patent Application No. 2007-556428.

* cited by examiner

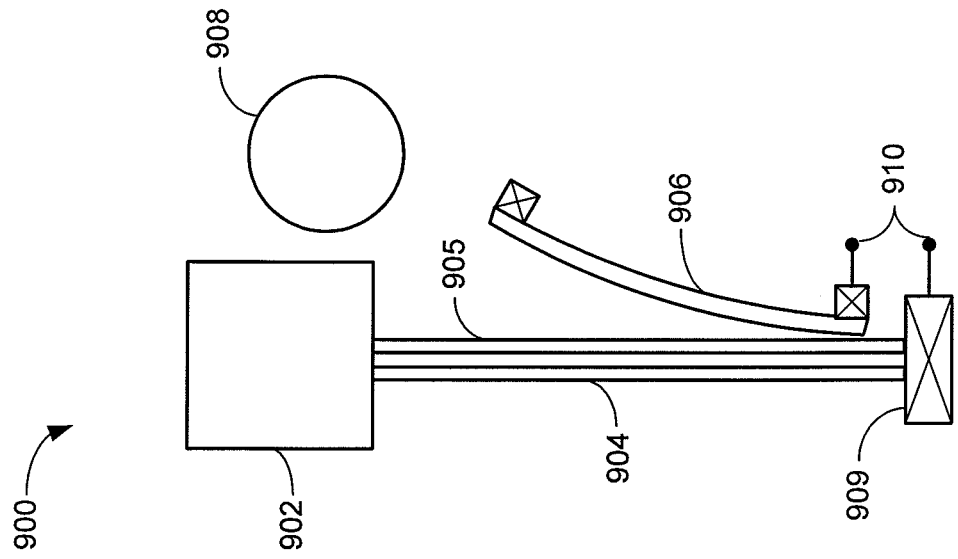

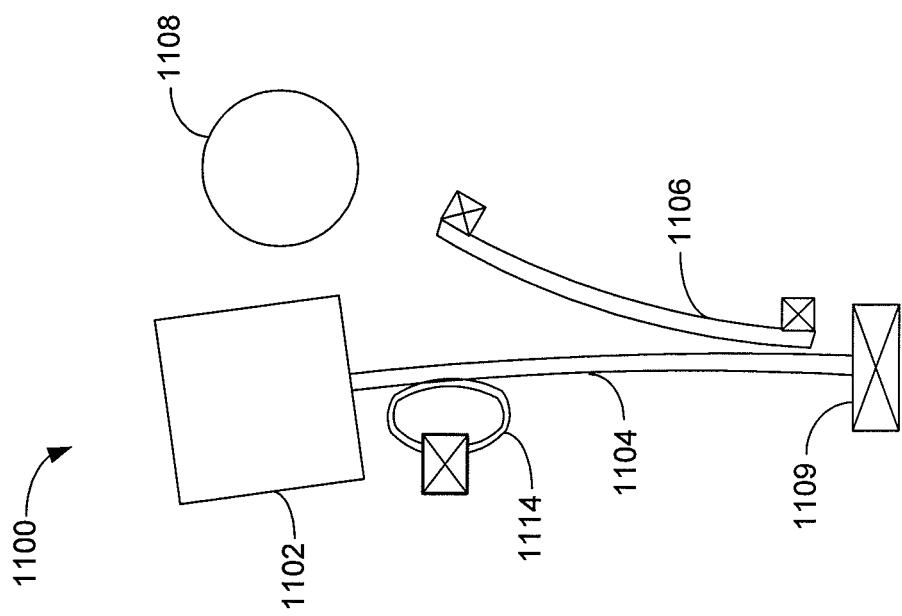

MECHANICAL LIGHT MODULATORS WITH STRESSED BEAMS

CROSS-REFERENCE TO RELATED APPLICATIONS

This application is a continuation-in-part of U.S. patent application Ser. No. 12/045,518, entitled "Display Apparatus and Methods For Manufacture Thereof," filed Mar. 10, 2008, which is a continuation of U.S. patent application Ser. No. 11/361,785, entitled "Display Apparatus and Methods For Manufacture Thereof," now U.S. Pat. No. 7,405,852 issued Jul. 29, 2008, and claims priority to U.S. Provisional Application No. 61/028,137 filed Feb. 12, 2008, U.S. Provisional Application No. 61/108,783 filed Oct. 27, 2008, and U.S. Provisional Application No. 61/109,045 filed Oct. 28, 2008. The entirety of each of these applications is incorporated herein by reference.

FIELD OF THE INVENTION

In general, the invention relates to the field of imaging displays, in particular, the invention relates to designs of light modulators to address stresses imparted on beams incorporated therein during the manufacturing of those beams.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications, and have recently been proposed for direct view applications. There is a need in the art for fast, bright, low-powered mechanically actuated displays. Specifically, there is a need for mechanically actuated displays that can be driven at high speeds and at low voltages for improved image quality and reduced power consumption.

SUMMARY OF THE INVENTION

According to one aspect, the invention relates to a spatial light modulator that includes a substrate and a modulation assembly coupled to the substrate. The modulation assembly includes a modulation element and a compliant beam. The modulation assembly is configured to limit the bending of the compliant beam towards an opposing surface that would otherwise be caused by inherent stresses within the compliant beam. In one embodiment, the limitation of bending yields an intended beam rest position. In another embodiment, the compliant beam is shaped to promote the bending of the beam being limited by the modulation assembly configuration.

In another embodiment, the compliant beam has first and second ends and is coupled to the substrate at a first anchor. For example, in one embodiment, the compliant beam is coupled to the first anchor at the first end. In another example, the compliant beam is shaped to extend away from the first anchor from the first end and curve back towards the first anchor towards the second end. In another example, the compliant beam is coupled to the first anchor between the first and second ends. In another example, the compliant beam is further coupled to the substrate at a second anchor.

In another embodiment, the compliant beam has first and second ends that couple to a common anchor deposited on the substrate. The shape of the compliant beam forms a loop. For example, in one embodiment, the loop has a first loop portion extending away from the common anchor and a second loop portion returning to the common anchor. The length of the first loop portion may be substantially greater than the length of the second loop portion. The first loop portion and/or the second loop portion may include a secondary loop.

In another embodiment, the modulation assembly includes a second compliant beam. Both the compliant beam and the second compliant beam attach to the modulation element.

In another embodiment, the modulation assembly includes a stationary structure that is not coupled to the compliant beam, where the stationary structure limits the bending of the compliant beam. For example, in one embodiment, the stationary structure includes a sliding surface.

In another embodiment, a plurality of attachment points couple the compliant beam to the substrate at positions on the compliant beam selected to promote the bending of the beam being limited by the modulation assembly configuration.

In another embodiment, the compliant beam includes first and second beam materials coupled to one another. The first beam material has a first stress state, and the second beam material has a second, different stress state, thereby promoting the bending of the beam being limited by the modulation assembly configuration.

According to another aspect, the invention relates to a method of manufacturing a spatial light modulator. The method includes the steps of forming a modulation assembly that includes a modulation element and a compliant beam and releasing the modulation assembly. The compliant beam is formed in a pre-release position to have an intended inherent stress state. As a result of the stress state in the compliant beam, upon release of the compliant beam, the compliant beam bends into a rest position which is different than the pre-release position. The rest position is based in part on the intended inherent stress state. In one embodiment, the inherent stress state includes a stress gradient. In another embodiment, upon release, the beam bends into an intended rest position.

In another embodiment, the compliant beam includes first and second faces, each perpendicular to a surface of a substrate. The intended inherent stress state includes stress components local to the first face that substantially differ from stress components local to the second face. For example, in one embodiment, the magnitude of the stress components local to the first face are greater than the stress components local to the second face. In another example, stress components local to the first face are tensile while stress components local to the second face are compressive.

In another embodiment, the intended inherent stress state is selected such that a portion of the compliant beam, in the rest position, is separated from an opposing surface by no more than a predetermined distance. Upon actuation, the compliant beam is drawn towards the opposing surface.

In another embodiment, the intended inherent stress state is selected such that a portion of the compliant beam, in the rest position, is separated from an opposing surface by at least a predetermined distance. Upon actuation, the compliant beam is drawn towards the opposing surface.

In another embodiment, the intended inherent stress state is selected such that a portion of the compliant beam, in the rest position, is separated from an opposing surface by no more than a predetermined distance. Upon actuation, the compliant beam is drawn away from the opposing surface.

In another embodiment, the intended inherent stress state is selected such that a portion of the compliant beam in the rest position is separated from an opposing surface by at least a predetermined distance. Upon actuation, the compliant beam is drawn away from the opposing surface. For example, in one embodiment, the beam, in its rest position, is curved.

In another embodiment, the step of forming the modulation assembly includes forming the compliant beam by coupling first and second beam materials to one another. The first beam material has a first stress state. The second beam material has a second, different stress state. In another embodiment, the step of forming the modulation assembly includes forming the compliant beam to have a first shape prior to releasing the modulation assembly and to have a different shape in the rest position.

BRIEF DESCRIPTION OF THE DRAWINGS

The foregoing discussion will be understood more readily from the following detailed description of the invention with reference to the following drawings:

FIG. 9 is a plan view of a shutter assembly, with a shape designed to be relatively insensitive to variations in the stress state of the beams, according to an illustrative embodiment of the invention.

FIG. 11 is a plan view of a shutter assembly, including a stopping structure designed to limit the bending of the beams, according to an illustrative embodiment of the invention.

DESCRIPTION OF CERTAIN ILLUSTRATIVE EMBODIMENTS

To provide an overall understanding of the invention, certain illustrative embodiments will now be described, including apparatus and methods for displaying images. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1A:
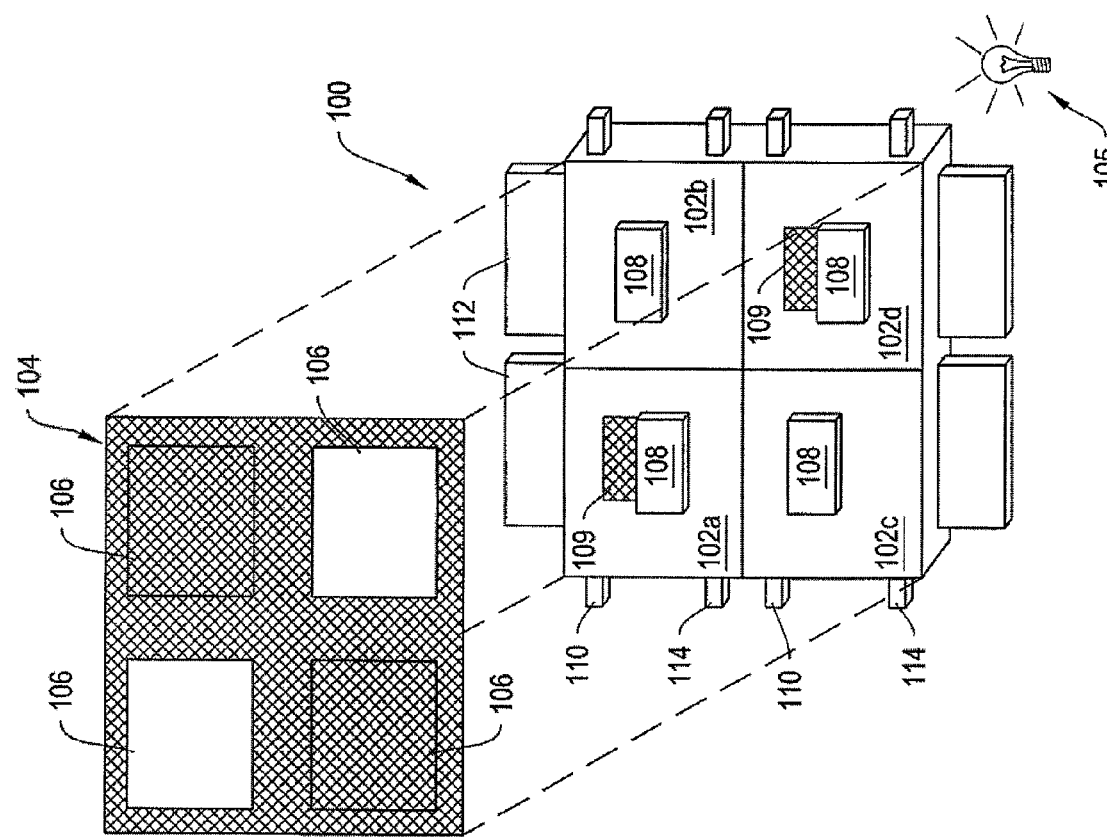
FIG. 1A is an isometric view of display apparatus, according to an illustrative embodiment of the invention.

FIG. 1A is a schematic diagram of a direct-view MEMS-based display apparatus 100, according to an illustrative embodiment of the invention. The display apparatus 100 includes a plurality of light modulators 102a-102d (generally "light modulators 102") arranged in rows and columns. In the display apparatus 100, light modulators 102a and 102d are in the open state, allowing light to pass. Light modulators 102b and 102c are in the closed state, obstructing the passage of light. By selectively setting the states of the light modulators 102a-102d, the display apparatus 100 can be utilized to form an image 104 for a backlit display, if illuminated by a lamp or lamps 105. In another implementation, the apparatus 100 may form an image by reflection of ambient light originating from the front of the apparatus. In another implementation, the apparatus 100 may form an image by reflection of light from a lamp or lamps positioned in the front of the display, i.e. by use of a frontlight. In one of the closed or open states, the light modulators 102 interfere with light in an optical path by, for example, and without limitation, blocking, reflecting, absorbing, filtering, polarizing, diffracting, or otherwise altering a property or path of the light.

In the display apparatus 100, each light modulator 102 corresponds to a pixel 106 in the image 104. In other implementations, the display apparatus 100 may utilize a plurality of light modulators to form a pixel 106 in the image 104. For example, the display apparatus 100 may include three color-specific light modulators 102. By selectively opening one or more of the color-specific light modulators 102 corresponding to a particular pixel 106, the display apparatus 100 can generate a color pixel 106 in the image 104. In another example, the display apparatus 100 includes two or more light modulators 102 per pixel 106 to provide grayscale in an image 104. With respect to an image, a "pixel" corresponds to the smallest picture element defined by the resolution of the image. With respect to structural components of the display apparatus 100, the term "pixel" refers to the combined mechanical and electrical components utilized to modulate the light that forms a single pixel of the image.

Display apparatus 100 is a direct-view display in that it does not require imaging optics. The user sees an image by looking directly at the display apparatus 100. In alternate embodiments the display apparatus 100 is incorporated into a projection display. In such embodiments, the display forms an image by projecting light onto a screen or onto a wall. In projection applications the display apparatus 100 is substantially smaller than the projected image 104.

Direct-view displays may operate in either a transmissive or reflective mode. In a transmissive display, the light modulators filter or selectively block light which originates from a lamp or lamps positioned behind the display. The light from the lamps is optionally injected into a light guide or "backlight". Transmissive direct-view display embodiments are often built onto transparent or glass substrates to facilitate a sandwich assembly arrangement where one substrate, containing the light modulators, is positioned directly on top of the backlight. In some transmissive display embodiments, a color-specific light modulator is created by associating a color filter material with each modulator 102. In other transmissive display embodiments colors can be generated, as described below, using a field sequential color method by alternating illumination of lamps with different primary colors.

Each light modulator 102 includes a shutter 108 and an aperture 109. To illuminate a pixel 106 in the image 104, the shutter 108 is positioned such that it allows light to pass through the aperture 109 towards a viewer. To keep a pixel 106 unlit, the shutter 108 is positioned such that it obstructs the passage of light through the aperture 109. The aperture 109 is defined by an opening patterned through a reflective or light-absorbing material.

The display apparatus also includes a control matrix connected to the substrate and to the light modulators for controlling the movement of the shutters. The control matrix includes a series of electrical interconnects (e.g., interconnects 110, 112, and 114), including at least one write-enable interconnect 110 (also referred to as a "scan-line interconnect") per row of pixels, one data interconnect 112 for each column of pixels, and one common interconnect 114 providing a common voltage to all pixels, or at least to pixels from both multiple columns and multiples rows in the display apparatus 100. In response to the application of an appropriate voltage (the "write-enabling voltage, $V_{we}$"), the write-enable interconnect 110 for a given row of pixels prepares the pixels in the row to accept new shutter movement instructions. The data interconnects 112 communicate the new movement instructions in the form of data voltage pulses. The data voltage pulses applied to the data interconnects 112, in some implementations, directly contribute to an electrostatic movement of the shutters. In other implementations, the data voltage pulses control switches, e.g., transistors or other non-linear circuit elements that control the application of separate actuation voltages, which are typically higher in magnitude than the data voltages, to the light modulators 102. The application of these actuation voltages then results in the electrostatic driven movement of the shutters 108.

Figure 1B:
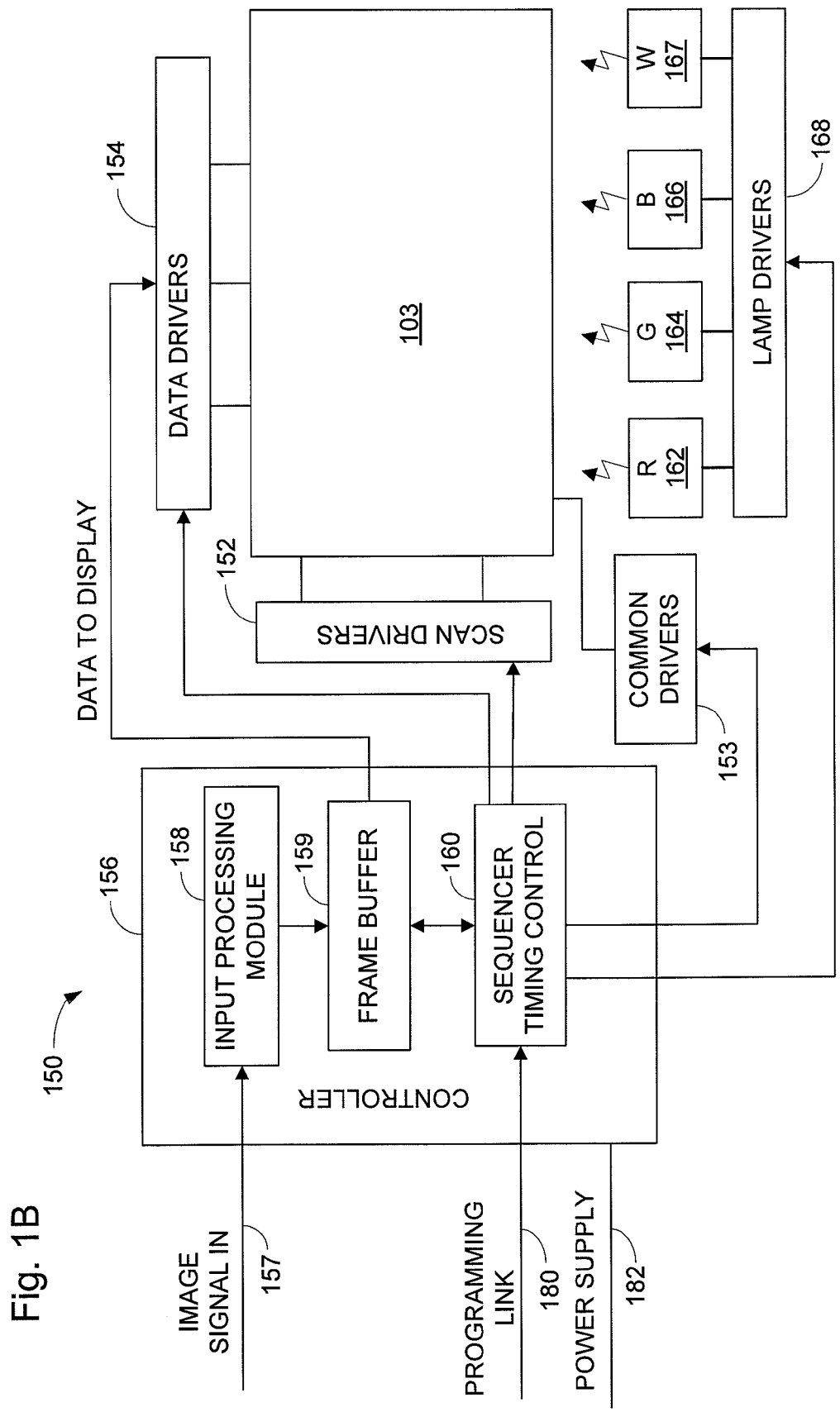
FIG. 1B is a block diagram of the display apparatus of FIG. 1A, according to an illustrative embodiment of the invention.

FIG. 1B is a block diagram 150 of the display apparatus 100. Referring to FIGS. 1A and 1B, in addition to the elements of the display apparatus 100 described above, as depicted in the block diagram 150, the display apparatus 100 includes a plurality of scan drivers 152 (also referred to as "write enabling voltage sources") and a plurality of data drivers 154 (also referred to as "data voltage sources"). The scan drivers 152 apply write enabling voltages to scan-line interconnects 110. The data drivers 154 apply data voltages to the data interconnects 112. In some embodiments of the display apparatus, the data drivers 154 are configured to provide analog data voltages to the light modulators, especially where the gray scale of the image 104 is to be derived in analog fashion. In analog operation the light modulators 102 are designed such that when a range of intermediate voltages is applied through the data interconnects 112 there results a range of intermediate open states in the shutters 108 and therefore a range of intermediate illumination states or gray scales in the image 104.

In other cases the data drivers 154 are configured to apply only a reduced set of 2, 3, or 4 digital voltage levels to the control matrix. These voltage levels are designed to set, in digital fashion, either an open state or a closed state to each of the shutters 108.

The scan drivers 152 and the data drivers 154 are connected to digital controller circuit 156 (also referred to as the "controller 156"). The controller 156 includes an input processing module 158, which processes an incoming image signal 157 into a digital image format appropriate to the spatial addressing and the gray scale capabilities of the display 100. The pixel location and gray scale data of each image is stored in a frame buffer 159 so that the data can be fed out as needed to the data drivers 154. The data is sent to the data drivers 154 in mostly serial fashion, organized in predetermined sequences grouped by rows and by image frames. The data drivers 154 can include series to parallel data converters, level shifting, and for some applications digital to analog voltage converters.

The display 100 apparatus optionally includes a set of common drivers 153, also referred to as common voltage sources. In some embodiments the common drivers 153 provide a DC common potential to all light modulators within the array of light modulators 103, for instance by supplying voltage to a series of common interconnects 114. In other embodiments the common drivers 153, following commands from the controller 156, issue voltage pulses or signals to the array of light modulators 103, for instance global actuation pulses which are capable of driving and/or initiating simultaneous actuation of all light modulators in multiple rows and columns of the array 103.

All of the drivers (e.g., scan drivers 152, data drivers 154, and common drivers 153) for different display functions are time-synchronized by a timing-control module 160 in the controller 156. Timing commands from the module 160 coordinate the illumination of red, green and blue and white lamps (162, 164, 166, and 167 respectively) via lamp drivers 168, the write-enabling and sequencing of specific rows within the array of pixels 103, the output of voltages from the data drivers 154, and the output of voltages that provide for light modulator actuation.

The controller 156 determines the sequencing or addressing scheme by which each of the shutters 108 in the array 103 can be re-set to the illumination levels appropriate to a new image 104. Details of suitable addressing, image formation, and gray scale techniques can be found in U.S. patent application Ser. Nos. 11/326,696 and 11/643,042, incorporated herein by reference. New images 104 can be set at periodic intervals. For instance, for video displays, the color images 104 or frames of video are refreshed at frequencies ranging from 10 to 300 Hertz. In some embodiments the setting of an image frame to the array 103 is synchronized with the illumination of the lamps 162, 164, and 166 such that alternate image frames are illuminated with an alternating series of colors, such as red, green, and blue. The image frames for each respective color is referred to as a color sub-frame. In this method, referred to as the field sequential color method, if the color sub-frames are alternated at frequencies in excess of 20 Hz, the human brain will average the alternating frame images into the perception of an image having a broad and continuous range of colors. In alternate implementations, four or more lamps with primary colors can be employed in display apparatus 100, employing primaries other than red, green, and blue.

In some implementations, where the display apparatus 100 is designed for the digital switching of shutters 108 between open and closed states, the controller 156 determines the addressing sequence and/or the time intervals between image frames to produce images 104 with appropriate gray scale. The process of generating varying levels of grayscale by controlling the amount of time a shutter 108 is open in a particular frame is referred to as time division gray scale. In one embodiment of time division gray scale, the controller 156 determines the time period or the fraction of time within each frame that a shutter 108 is allowed to remain in the open state, according to the illumination level or gray scale desired of that pixel. In other implementations, for each image frame, the controller 156 sets a plurality of sub-frame images in multiple rows and columns of the array 103, and the controller alters the duration over which each sub-frame image is illuminated in proportion to a gray scale value or significance value employed within a coded word for gray scale. For instance, the illumination times for a series of sub-frame images can be varied in proportion to the binary coding series 1, 2, 4, 8 . . . . The shutters 108 for each pixel in the array 103 are then set to either the open or closed state within a sub-frame image according to the value at a corresponding position within the pixel's binary coded word for gray level.

In other implementations, the controller alters the intensity of light from the lamps 162, 164, and 166 in proportion to the gray scale value desired for a particular sub-frame image. A number of hybrid techniques are also available for forming colors and gray scale from an array of shutters 108. For instance, the time division techniques described above can be combined with the use of multiple shutters 108 per pixel, or the gray scale value for a particular sub-frame image can be established through a combination of both sub-frame timing and lamp intensity. Details of these and other embodiments can be found in U.S. patent application Ser. No. 11/643,042, referenced above.

In some implementations the data for an image state 104 is loaded by the controller 156 to the modulator array 103 by a sequential addressing of individual rows, also referred to as scan lines. For each row or scan line in the sequence, the scan driver 152 applies a write-enable voltage to the write enable interconnect 110 for that row of the array 103, and subsequently the data driver 154 supplies data voltages, corresponding to desired shutter states, for each column in the selected row. This process repeats until data has been loaded for all rows in the array. In some implementations the sequence of selected rows for data loading is linear, proceeding from top to bottom in the array. In other implementations the sequence of selected rows is pseudo-randomized, in order to minimize visual artifacts. And in other implementations the sequencing is organized by blocks, where, for a block, the data for only a certain fraction of the image state 104 is loaded to the array, for instance by addressing only every $5^{th}$ row of the array in sequence.

In some implementations, the process for loading image data to the array 103 is separated in time from the process of actuating the shutters 108. In these implementations, the modulator array 103 may include data memory elements for each pixel in the array 103 and the control matrix may include a global actuation interconnect for carrying trigger signals, from common driver 153, to initiate simultaneous actuation of shutters 108 according to data stored in the memory elements. Various addressing sequences, many of which are described in U.S. patent application Ser. No. 11/643,042, can be coordinated by means of the timing control module 160.

In alternative embodiments, the array of pixels 103 and the control matrix that controls the pixels may be arranged in configurations other than rectangular rows and columns. For example, the pixels can be arranged in hexagonal arrays or curvilinear rows and columns. In general, as used herein, the term scan-line shall refer to any plurality of pixels that share a write-enabling interconnect.

The display 100 is comprised of a plurality of functional blocks including the timing control module 160, the frame buffer 159, scan drivers 152, data drivers 154, and drivers 153 and 168. Each block can be understood to represent either a distinguishable hardware circuit and/or a module of executable code. In some implementations the functional blocks are provided as distinct chips or circuits connected together by means of circuit boards and/or cables. Alternately, many of these circuits can be fabricated along with the pixel array 103 on the same substrate of glass or plastic. In other implementations, multiple circuits, drivers, processors, and/or control functions from block diagram 150 may be integrated together within a single silicon chip, which is then bonded directly to the transparent substrate holding pixel array 103.

The controller 156 includes a programming link 180 by which the addressing, color, and/or gray scale algorithms, which are implemented within controller 156, can be altered according to the needs of particular applications. In some embodiments, the programming link 180 conveys information from environmental sensors, such as ambient light or temperature sensors, so that the controller 156 can adjust imaging modes or backlight power in correspondence with environmental conditions. The controller 156 also comprises a power supply input 182 which provides the power needed for lamps as well as light modulator actuation. Where necessary, the drivers 152 153, 154, and/or 168 may include or be associated with DC-DC converters for transforming an input voltage at 182 into various voltages sufficient for the actuation of shutters 108 or illumination of the lamps, such as lamps 162, 164, 166, and 167.

MEMS Light Modulators

Figure 2A:
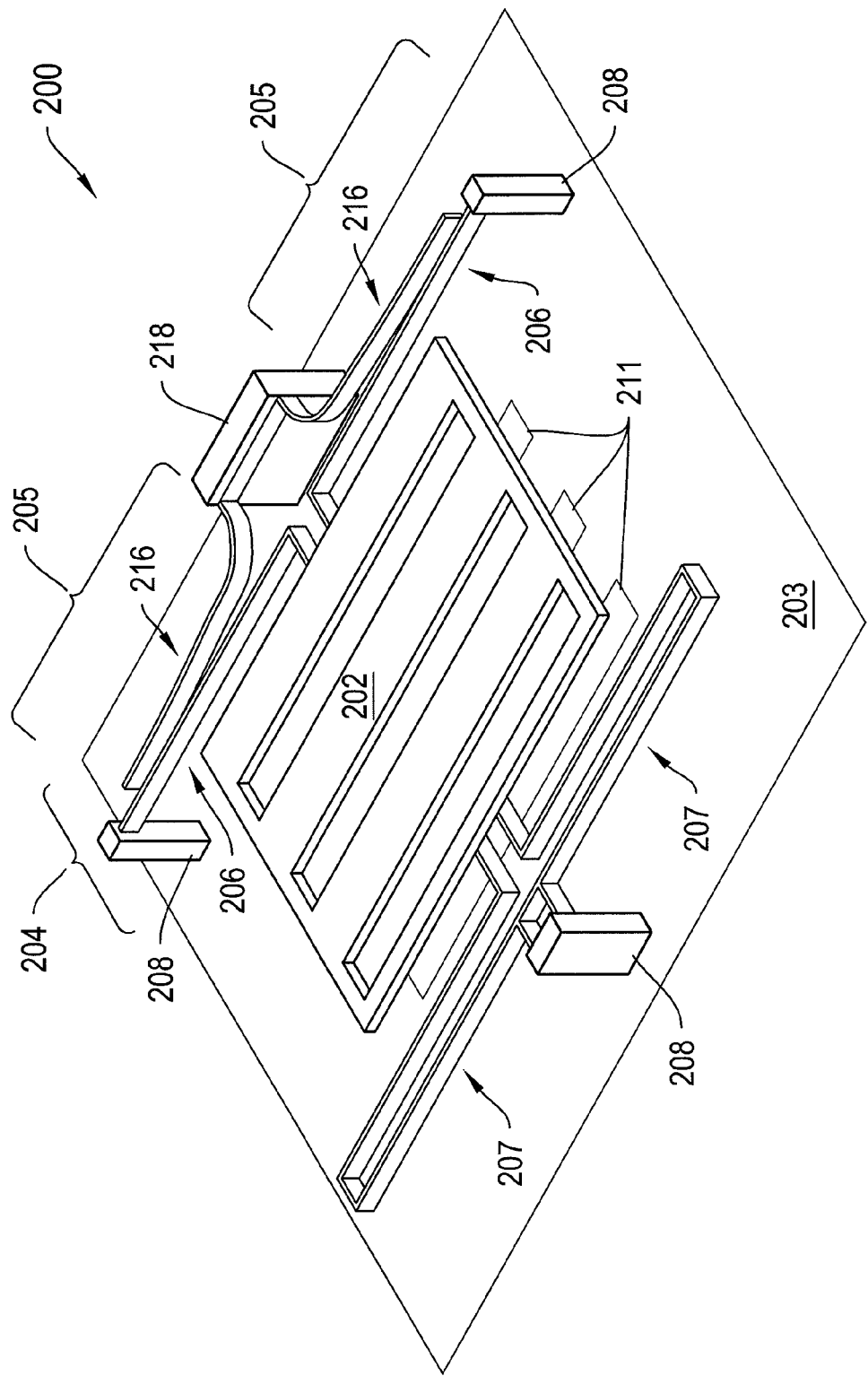
FIG. 2A is a perspective view of an illustrative shutter-based light modulator suitable for incorporation into the MEMS-based display of FIG. 1A, according to an illustrative embodiment of the invention.

FIG. 2A is a perspective view of an illustrative shutter-based light modulator 200 suitable for incorporation into the MEMS-based display apparatus 100 of FIG. 1A, according to an illustrative embodiment of the invention. The shutter-based light modulator 200 (also referred to as shutter assembly 200) includes a shutter 202 coupled to an actuator 204. The actuator 204 is formed from two separate compliant electrode beam actuators 205 (the "actuators 205"), as described in U.S. patent application Ser. No. 11/251,035, filed on Oct. 14, 2005. The shutter 202 couples on one side to the actuators 205. The actuators 205 move the shutter 202 transversely over a surface 203 in a plane of motion which is substantially parallel to the surface 203. The opposite side of the shutter 202 couples to a spring 207 which provides a restoring force opposing the forces exerted by the actuator 204.

Each actuator 205 includes a compliant load beam 206 connecting the shutter 202 to a load anchor 208. The load anchors 208 along with the compliant load beams 206 serve as mechanical supports, keeping the shutter 202 suspended proximate to the surface 203. The load anchors 208 physically connect the compliant load beams 206 and the shutter 202 to the surface 203 and electrically connect the load beams 206 to a bias voltage, in some instances, ground.

Each actuator 205 also includes a compliant drive beam 216 positioned adjacent to each load beam 206. The drive beams 216 couple at one end to a drive beam anchor 218 shared between the drive beams 216. The other end of each drive beam 216 is free to move. Each drive beam 216 is curved such that it is closest to the load beam 206 near the free end of the drive beam 216 and the anchored end of the load beam 206.

The surface 203 includes one or more apertures 211 for admitting the passage of light. If the shutter assembly 200 is formed on an opaque substrate, made for example from silicon, then the surface 203 is a surface of the substrate, and the apertures 211 are formed by etching an array of holes through the substrate. If the shutter assembly 200 is formed on a transparent substrate, made for example of glass or plastic, then the surface 203 is a surface of a light blocking layer deposited on the substrate, and the apertures are formed by etching the surface 203 into an array of holes 211. The apertures 211 can be generally circular, elliptical, polygonal, serpentine, or irregular in shape.

In operation, a display apparatus incorporating the light modulator 200 applies an electric potential to the drive beams 216 via the drive beam anchor 218. A second electric potential may be applied to the load beams 206. The resulting potential difference between the drive beams 216 and the load beams 206 pulls the free ends of the drive beams 216 towards the anchored ends of the load beams 206, and pulls the shutter ends of the load beams 206 toward the anchored ends of the drive beams 216, thereby driving the shutter 202 transversely towards the drive anchor 218. The compliant members 206 act as springs, such that when the voltage across the beams 206 and 216 is removed, the load beams 206 push the shutter 202 back into its initial position, releasing the stress stored in the load beams 206.

The shutter assembly 200, also referred to as an elastic shutter assembly, incorporates a passive restoring force, such as a spring, for returning a shutter to its rest or relaxed position after voltages have been removed. A number of elastic restore mechanisms and various electrostatic couplings can be designed into or in conjunction with electrostatic actuators, the compliant beams illustrated in shutter assembly 200 being just one example. Other examples are described in U.S. patent application Ser. Nos. 11/251,035 and 11/326,696, incorporated herein by reference. For instance, a highly non-linear voltage-displacement response can be provided which favors an abrupt transition between "open" vs "closed" states of operation, and which, in many cases, provides a bi-stable or hysteretic operating characteristic for the shutter assembly. Other electrostatic actuators can be designed with more incremental voltage-displacement responses and with considerably reduced hysteresis, as may be preferred for analog gray scale operation.

The actuator 205 within the elastic shutter assembly is said to operate between a closed or actuated position and a relaxed position. The designer, however, can choose to place apertures 211 such that shutter assembly 200 is in either the "open" state, i.e. passing light, or in the "closed" state, i.e. blocking light, whenever actuator 205 is in its relaxed position. For illustrative purposes, it is assumed below that elastic shutter assemblies described herein are designed to be open in their relaxed state.

In many cases it is preferable to provide a dual set of "open" and "closed" actuators as part of a shutter assembly so that the control electronics are capable of electrostatically driving the shutters into each of the open and closed states.

Figure 2B:
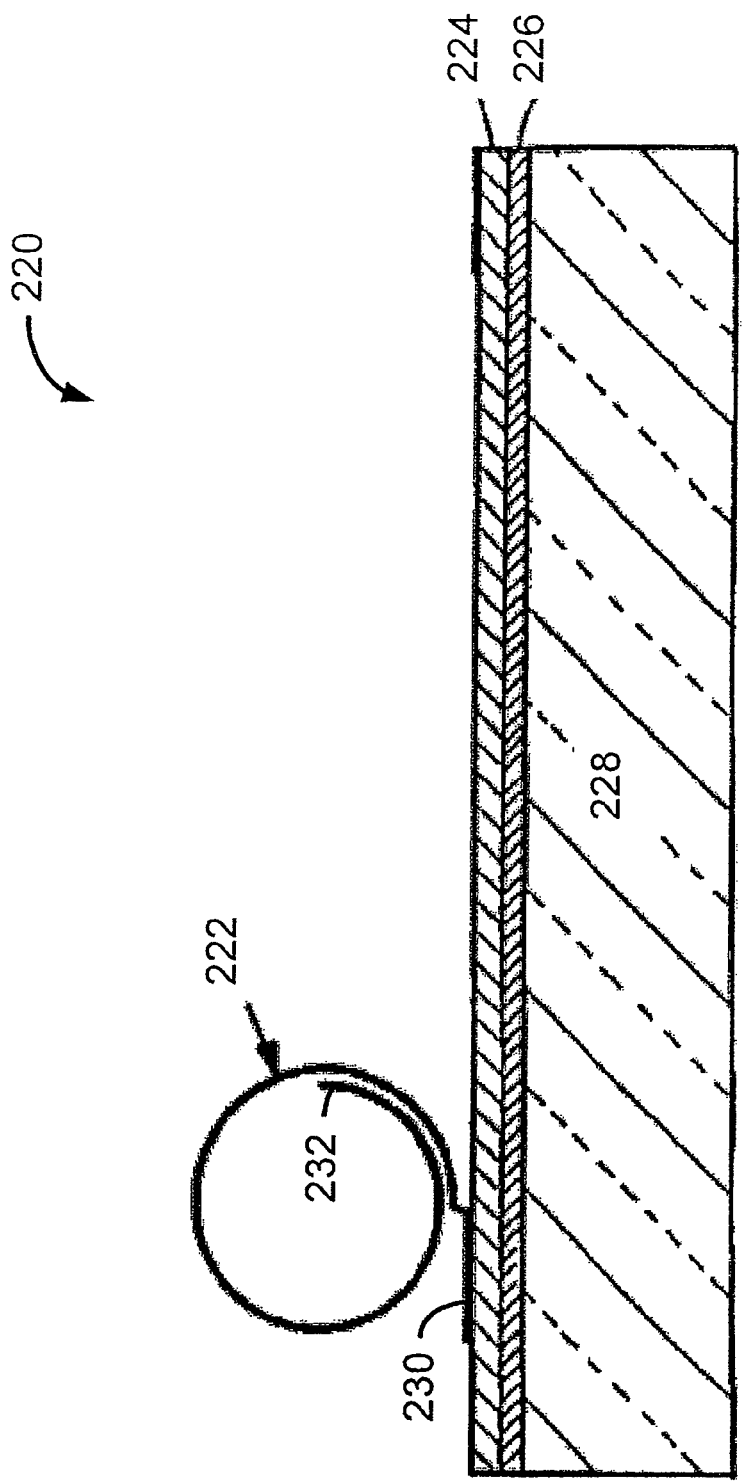
FIG. 2B is a cross-sectional view of a rollershade-based light modulator suitable for incorporation into the MEMS-based display of FIG. 1A, according to an illustrative embodiment of the invention.

Display apparatus 100, in alternative embodiments, includes light modulators other than transverse shutter-based light modulators, such as the shutter assembly 200 described above. For example, FIG. 2B is a cross-sectional view of a rolling actuator shutter-based light modulator 220 suitable for incorporation into an alternative embodiment of the MEMS-based display apparatus 100 of FIG. 1A, according to an illustrative embodiment of the invention. As described further in U.S. Pat. No. 5,233,459, entitled "Electric Display Device," and U.S. Pat. No. 5,784,189, entitled "Spatial Light Modulator," the entireties of which are incorporated herein by reference, a rolling actuator-based light modulator includes a moveable electrode disposed opposite a fixed electrode and biased to move in a preferred direction to produce a shutter upon application of an electric field. In one embodiment, the light modulator 220 includes a planar electrode 226 disposed between a substrate 228 and an insulating layer 224 and a moveable electrode 222 having a fixed end 230 attached to the insulating layer 224. In the absence of any applied voltage, a moveable end 232 of the moveable electrode 222 is free to roll towards the fixed end 230 to produce a rolled state. Application of a voltage between the electrodes 222 and 226 causes the moveable electrode 222 to unroll and lie flat against the insulating layer 224, whereby it acts as a shutter that blocks light traveling through the substrate 228. The moveable electrode 222 returns to the rolled state by means of an elastic restoring force after the voltage is removed. The bias towards a rolled state may be achieved by manufacturing the moveable electrode 222 to include an anisotropic stress state.

Figure 2C:
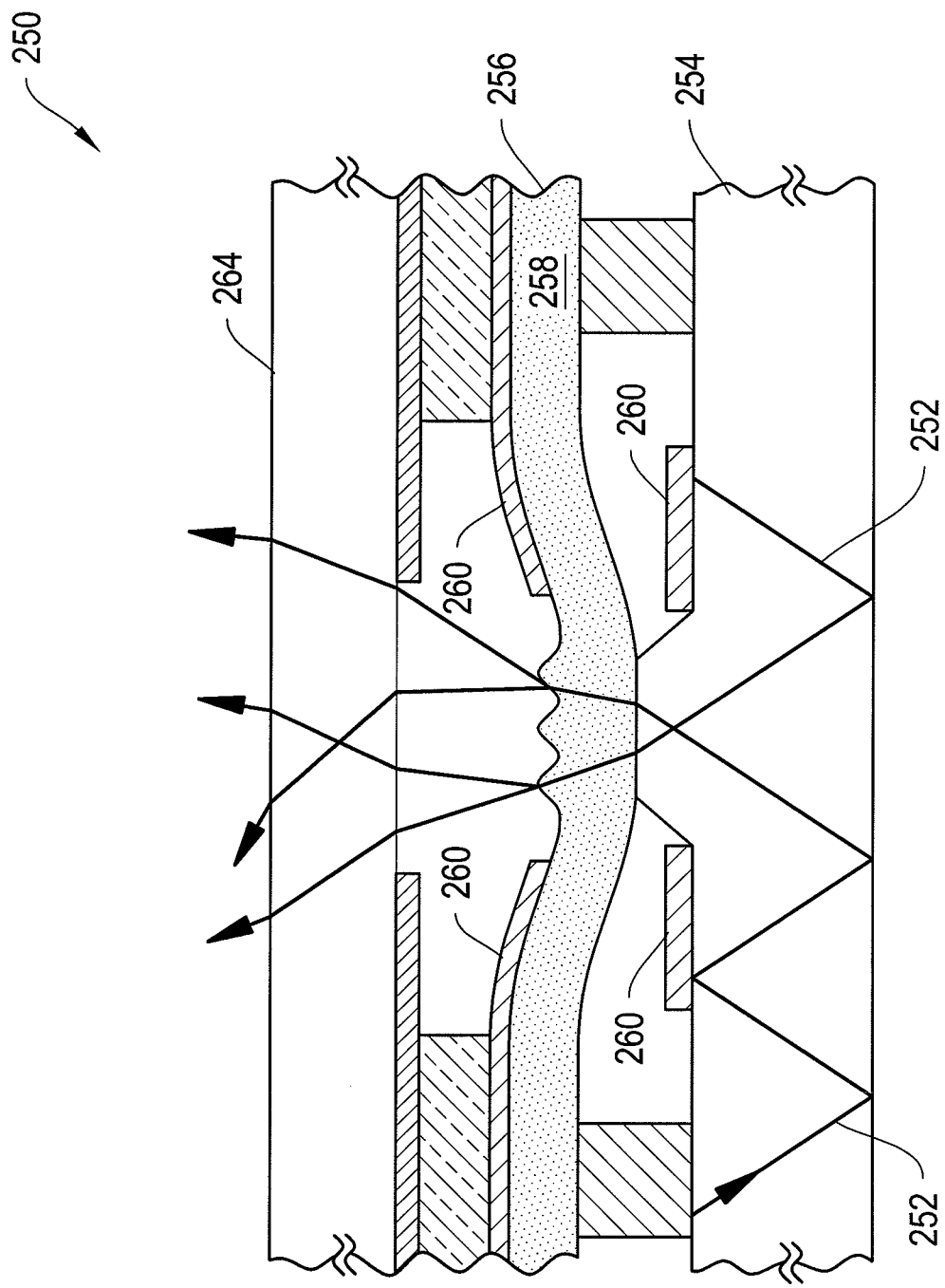
FIG. 2C is a cross sectional view of a light-tap-based light modulator suitable for incorporation into an alternative embodiment of the MEMS-based display of FIG. 1A, according to an illustrative embodiment of the invention.

FIG. 2C is a cross-sectional view of an illustrative non shutter-based MEMS light modulator 250. The light tap modulator 250 is suitable for incorporation into an alternative embodiment of the MEMS-based display apparatus 100 of FIG. 1A, according to an illustrative embodiment of the invention. As described further in U.S. Pat. No. 5,771,321, entitled "Micromechanical Optical Switch and Flat Panel Display," the entirety of which is incorporated herein by reference, a light tap works according to a principle of frustrated total internal reflection. That is, light 252 is introduced into a light guide 254, in which, without interference, light 252 is for the most part unable to escape the light guide 254 through its front or rear surfaces due to total internal reflection. The light tap 250 includes a tap element 256 that has a sufficiently high index of refraction that, in response to the tap element 256 contacting the light guide 254, light 252 impinging on the surface of the light guide 254 adjacent the tap element 256 escapes the light guide 254 through the tap element 256 towards a viewer, thereby contributing to the formation of an image.

In one embodiment, the tap element 256 is formed as part of beam 258 of flexible, transparent material. Electrodes 260 coat portions of one side of the beam 258. Opposing electrodes 260 are disposed on the light guide 254. By applying a voltage across the electrodes 260, the position of the tap element 256 relative to the light guide 254 can be controlled to selectively extract light 252 from the light guide 254.

The roller-based light modulator 220 and light tap 250 are not the only examples of MEMS light modulators suitable for inclusion in various embodiments of the invention. It will be understood that other MEMS light modulators can exist and can be usefully incorporated into the invention.

U.S. patent application Ser. Nos. 11/251,035 and 11/326,696 have described a variety of methods by which an array of shutters can be controlled via a control matrix to produce images, in many cases moving images, with appropriate gray scale. In some cases, control is accomplished by means of a passive matrix array of row and column interconnects connected to driver circuits on the periphery of the display. In other cases it is appropriate to include switching and/or data storage elements within each pixel of the array (the so-called active matrix) to improve either the speed, the gray scale and/or the power dissipation performance of the display.

Figure 3A:
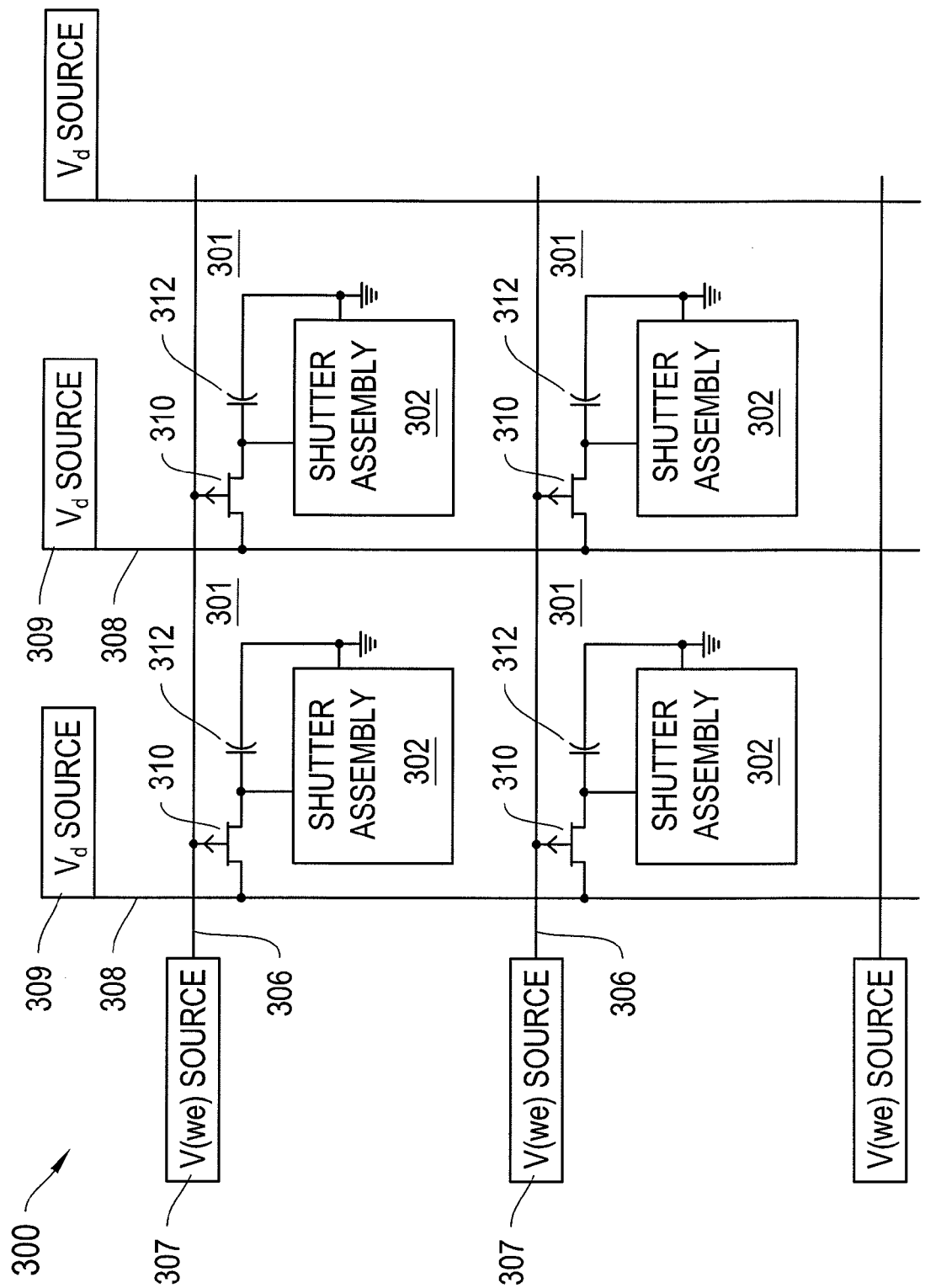
FIG. 3A is a schematic diagram of a control matrix suitable for controlling the light modulators incorporated into the MEMS-based display of FIG. 1A, according to an illustrative embodiment of the invention.
Figure 3B:
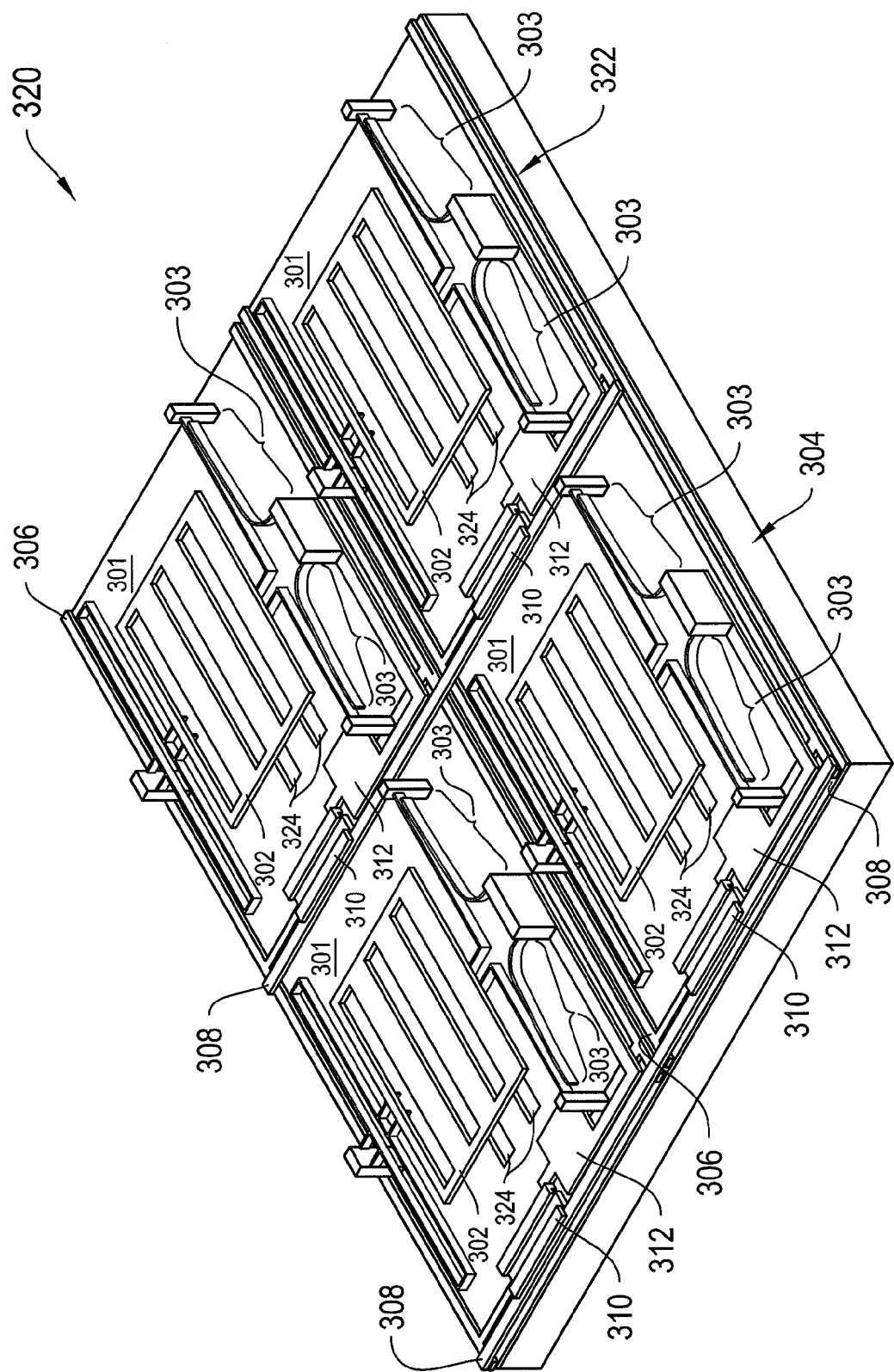
FIG. 3B is a perspective view of an array of shutter-based light modulators connected to the control matrix of FIG. 3A, according to an illustrative embodiment of the invention.

FIG. 3A is a schematic diagram of a control matrix 300 suitable for controlling the light modulators incorporated into the MEMS-based display apparatus 100 of FIG. 1A, according to an illustrative embodiment of the invention. FIG. 3B is a perspective view of an array 320 of shutter-based light modulators connected to the control matrix 300 of FIG. 3A, according to an illustrative embodiment of the invention. The control matrix 300 may address an array of pixels 320 (the "array 320"). Each pixel 301 includes an elastic shutter assembly 302, such as the shutter assembly 200 of FIG. 2A, controlled by an actuator 303. Each pixel also includes an aperture layer 322 that includes apertures 324. Further electrical and mechanical descriptions of shutter assemblies such as shutter assembly 302, and variations thereon, can be found in U.S. patent application Ser. Nos. 11/251,035 and 11/326,696. Descriptions of alternate control matrices can also be found in U.S. patent application Ser. No. 11/607,715.

The control matrix 300 is fabricated as a diffused or thin-film-deposited electrical circuit on the surface of a substrate 304 on which the shutter assemblies 302 are formed. The control matrix 300 includes a scan-line interconnect 306 for each row of pixels 301 in the control matrix 300 and a data-interconnect 308 for each column of pixels 301 in the control matrix 300. Each scan-line interconnect 306 electrically connects a write-enabling voltage source 307 to the pixels 301 in a corresponding row of pixels 301. Each data interconnect 308 electrically connects a data voltage source, ("Vd source") 309 to the pixels 301 in a corresponding column of pixels 301. In control matrix 300, the data voltage $V_d$ provides the majority of the energy necessary for actuation of the shutter assemblies 302. Thus, the data voltage source 309 also serves as an actuation voltage source.

Referring to FIGS. 3A and 3B, for each pixel 301 or for each shutter assembly 302 in the array of pixels 320, the control matrix 300 includes a transistor 310 and a capacitor 312. The gate of each transistor 310 is electrically connected to the scan-line interconnect 306 of the row in the array 320 in which the pixel 301 is located. The source of each transistor 310 is electrically connected to its corresponding data interconnect 308. The actuators 303 of each shutter assembly 302 include two electrodes. The drain of each transistor 310 is electrically connected in parallel to one electrode of the corresponding capacitor 312 and to one of the electrodes of the corresponding actuator 303. The other electrode of the capacitor 312 and the other electrode of the actuator 303 in shutter assembly 302 are connected to a common or ground potential. In alternate implementations, the transistors 310 can be replaced with semiconductor diodes and or metal-insulator-metal sandwich type switching elements.

In operation, to form an image, the control matrix 300 write-enables each row in the array 320 in a sequence by applying $V_{we}$ to each scan-line interconnect 306 in turn. For a write-enabled row, the application of $V_{we}$ to the gates of the transistors 310 of the pixels 301 in the row allows the flow of current through the data interconnects 308 through the transistors 310 to apply a potential to the actuator 303 of the shutter assembly 302. While the row is write-enabled, data voltages $V_d$ are selectively applied to the data interconnects 308. In implementations providing analog gray scale, the data voltage applied to each data interconnect 308 is varied in relation to the desired brightness of the pixel 301 located at the intersection of the write-enabled scan-line interconnect 306 and the data interconnect 308. In implementations providing digital control schemes, the data voltage is selected to be either a relatively low magnitude voltage (i.e., a voltage near ground) or to meet or exceed $V_{at}$ (the actuation threshold voltage). In response to the application of $V_{at}$ to a data interconnect 308, the actuator 303 in the corresponding shutter assembly 302 actuates, opening the shutter in that shutter assembly 302. The voltage applied to the data interconnect 308 remains stored in the capacitor 312 of the pixel 301 even after the control matrix 300 ceases to apply $V_{we}$ to a row. It is not necessary, therefore, to wait and hold the voltage $V_{we}$ on a row for times long enough for the shutter assembly 302 to actuate; such actuation can proceed after the write-enabling voltage has been removed from the row. The capacitors 312 also function as memory elements within the array 320, storing actuation instructions for periods as long as is necessary for the illumination of an image frame.

The pixels 301 as well as the control matrix 300 of the array 320 are formed on a substrate 304. The array includes an aperture layer 322, disposed on the substrate 304, which includes a set of apertures 324 for respective pixels 301 in the array 320. The apertures 324 are aligned with the shutter assemblies 302 in each pixel. In one implementation the substrate 304 is made of a transparent material, such as glass or plastic. In another implementation the substrate 304 is made of an opaque material, but in which holes are etched to form the apertures 324.

Components of shutter assemblies 302 are processed either at the same time as the control matrix 300 or in subsequent processing steps on the same substrate. The electrical components in control matrix 300 are fabricated using many thin film techniques in common with the manufacture of thin film transistor arrays for liquid crystal displays. Available techniques are described in Den Boer, *Active Matrix Liquid Crystal Displays* (Elsevier, Amsterdam, 2005), incorporated herein by reference. The shutter assemblies are fabricated using techniques similar to the art of micromachining or from the manufacture of micromechanical (i.e., MEMS) devices. Many applicable thin film MEMS techniques are described in Rai-Choudhury, ed., Handbook of Microlithography, Micromachining & Microfabrication (SPIE Optical Engineering Press, Bellingham, Wash. 1997), incorporated herein by reference. Fabrication techniques specific to MEMS light modulators formed on glass substrates can be found in U.S. patent application Ser. Nos. 11/361,785 and 11/731,628, incorporated herein by reference. For instance, as described in those applications, the shutter assembly 302 can be formed from thin films of amorphous silicon, deposited by a chemical vapor deposition process.

The shutter assembly 302 together with the actuator 303 can be made bi-stable. That is, the shutters can exist in at least two equilibrium positions (e.g. open or closed) with little or no power required to hold them in either position. More particularly, the shutter assembly 302 can be mechanically bi-stable. Once the shutter of the shutter assembly 302 is set in position, no electrical energy or holding voltage is required to maintain that position. The mechanical stresses on the physical elements of the shutter assembly 302 can hold the shutter in place.

The shutter assembly 302 together with the actuator 303 can also be made electrically bi-stable. In an electrically bi-stable shutter assembly, there exists a range of voltages below the actuation voltage of the shutter assembly, which if applied to a closed actuator (with the shutter being either open or closed), holds the actuator closed and the shutter in position, even if an opposing force is exerted on the shutter. The opposing force may be exerted by a spring such as spring 207 in shutter-based light modulator 200, or the opposing force may be exerted by an opposing actuator, such as an "open" or "closed" actuator.

The light modulator array 320 is depicted as having a single MEMS light modulator per pixel. Other embodiments are possible in which multiple MEMS light modulators are provided in each pixel, thereby providing the possibility of more than just binary "on" or "off" optical states in each pixel. Certain forms of coded area division gray scale are possible where multiple MEMS light modulators in the pixel are provided, and where apertures 324, which are associated with each of the light modulators, have unequal areas.

In other embodiments the roller-based light modulator 220 and the light tap 250, as well as other MEMS-based light modulators, can be substituted for the shutter assembly 302 within the light modulator array 320.

Figure 4A:
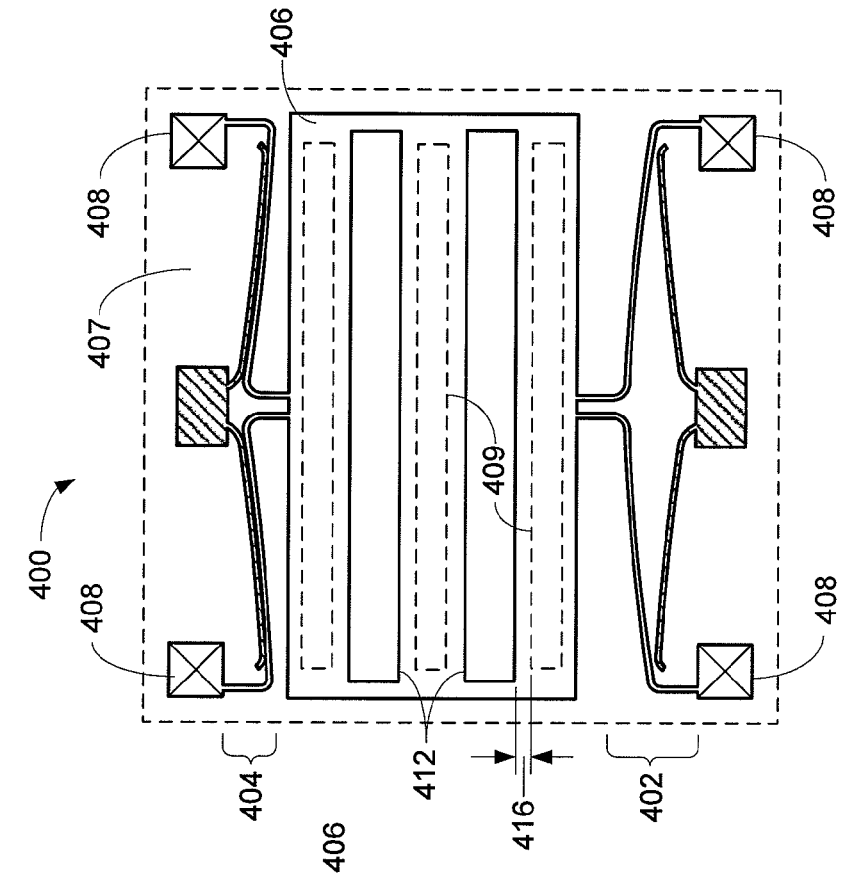
FIGS. 4A and 4B are plan views of a dual-actuated shutter assembly in the open and closed states respectively, according to an illustrative embodiment of the invention.
Figure 4B:
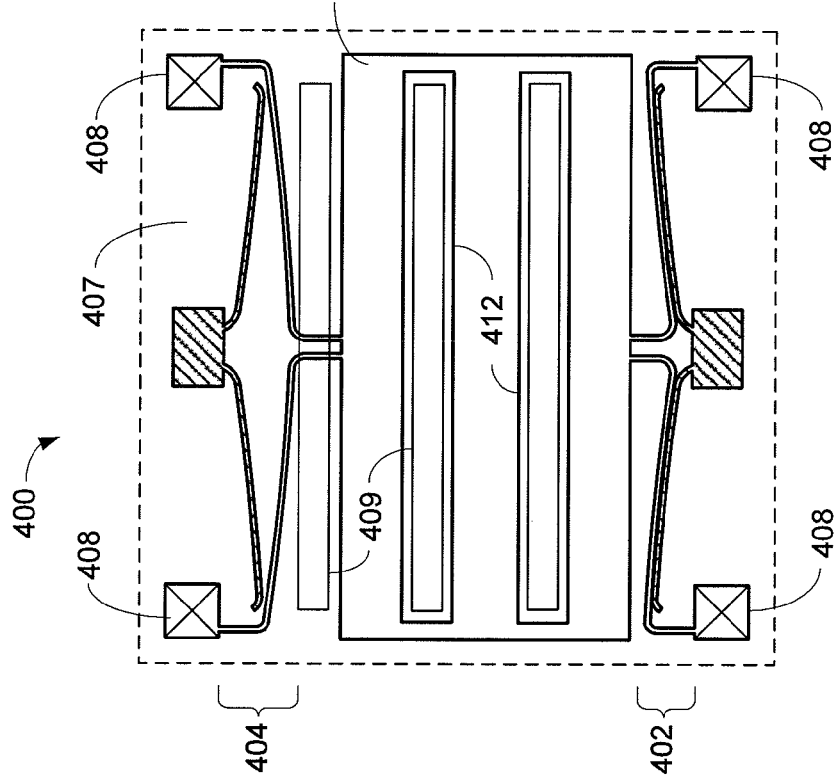

FIGS. 4A and 4B illustrate an alternative shutter-based light modulator (shutter assembly) 400 suitable for inclusion in various embodiments of the invention. The light modulator 400 is an example of a dual actuator shutter assembly, and is shown in FIG. 4A in an open state. FIG. 4B is a view of the dual actuator shutter assembly 400 in a closed state. Shutter assembly 400 is described in further detail in U.S. patent application Ser. No. 11/251,035, referenced above. In contrast to the shutter assembly 200, shutter assembly 400 includes actuators 402 and 404 on either side of a shutter 406. Each actuator 402 and 404 is independently controlled. A first actuator, a shutter-open actuator 402, serves to open the shutter 406. A second opposing actuator, the shutter-close actuator 404, serves to close the shutter 406. Both actuators 402 and 404 are compliant beam electrode actuators. The actuators 402 and 404 open and close the shutter 406 by driving the shutter 406 substantially in a plane parallel to an aperture layer 407 over which the shutter is suspended. The shutter 406 is suspended a short distance over the aperture layer 407 by anchors 408 attached to the actuators 402 and 404. The inclusion of supports attached to both ends of the shutter 406 along its axis of movement reduces out of plane motion of the shutter 406 and confines the motion substantially to a plane parallel to the substrate. By analogy to the control matrix 300 of FIG. 3A, a control matrix suitable for use with shutter assembly 400 might include one transistor and one capacitor for each of the opposing shutter-open and shutter-close actuators 402 and 404.

The shutter 406 includes two shutter apertures 412 through which light can pass. The aperture layer 407 includes a set of three apertures 409. In FIG. 4A, the shutter assembly 400 is in the open state and, as such, the shutter-open actuator 402 has been actuated, the shutter-close actuator 404 is in its relaxed position, and the centerlines of apertures 412 and 409 coincide. In FIG. 4B the shutter assembly 400 has been moved to the closed state and, as such, the shutter-open actuator 402 is in its relaxed position, the shutter-close actuator 404 has been actuated, and the light blocking portions of shutter 406 are now in position to block transmission of light through the apertures 409 (shown as dotted lines).

Each aperture has at least one edge around its periphery. For example, the rectangular apertures 409 have four edges. In alternative implementations in which circular, elliptical, oval, or other curved apertures are formed in the aperture layer 407, each aperture may have only a single edge. In other implementations the apertures need not be separated or disjoint in the mathematical sense, but instead can be connected. That is to say, while portions or shaped sections of the aperture may maintain a correspondence to each shutter, several of these sections may be connected such that a single continuous perimeter of the aperture is shared by multiple shutters.

In order to allow light with a variety of exit angles to pass through apertures 412 and 409 in the open state, it is advantageous to provide a width or size for shutter apertures 412 which is larger than a corresponding width or size of apertures 409 in the aperture layer 407. In order to effectively block light from escaping in the closed state, it is preferable that the light blocking portions of the shutter 406 overlap the apertures 409. FIG. 4B shows a predefined overlap 416 between the edge of light blocking portions in the shutter 406 and one edge of the aperture 409 formed in aperture layer 407.

The electrostatic actuators 402 and 404 are designed so that their voltage-displacement behavior provides a bi-stable characteristic to the shutter assembly 400. For each of the shutter-open and shutter-close actuators there exists a range of voltages below the actuation voltage, which if applied while that actuator is in the closed state (with the shutter being either open or closed), will hold the actuator closed and the shutter in position, even after an actuation voltage is applied to the opposing actuator. The minimum voltage needed to maintain a shutter's position against such an opposing force is referred to as a maintenance voltage $V_m$. A number of control matrices which take advantage of the bi-stable operation characteristic are described in U.S. patent application Ser. No. 11/607,715, referenced above.

Figure 5:
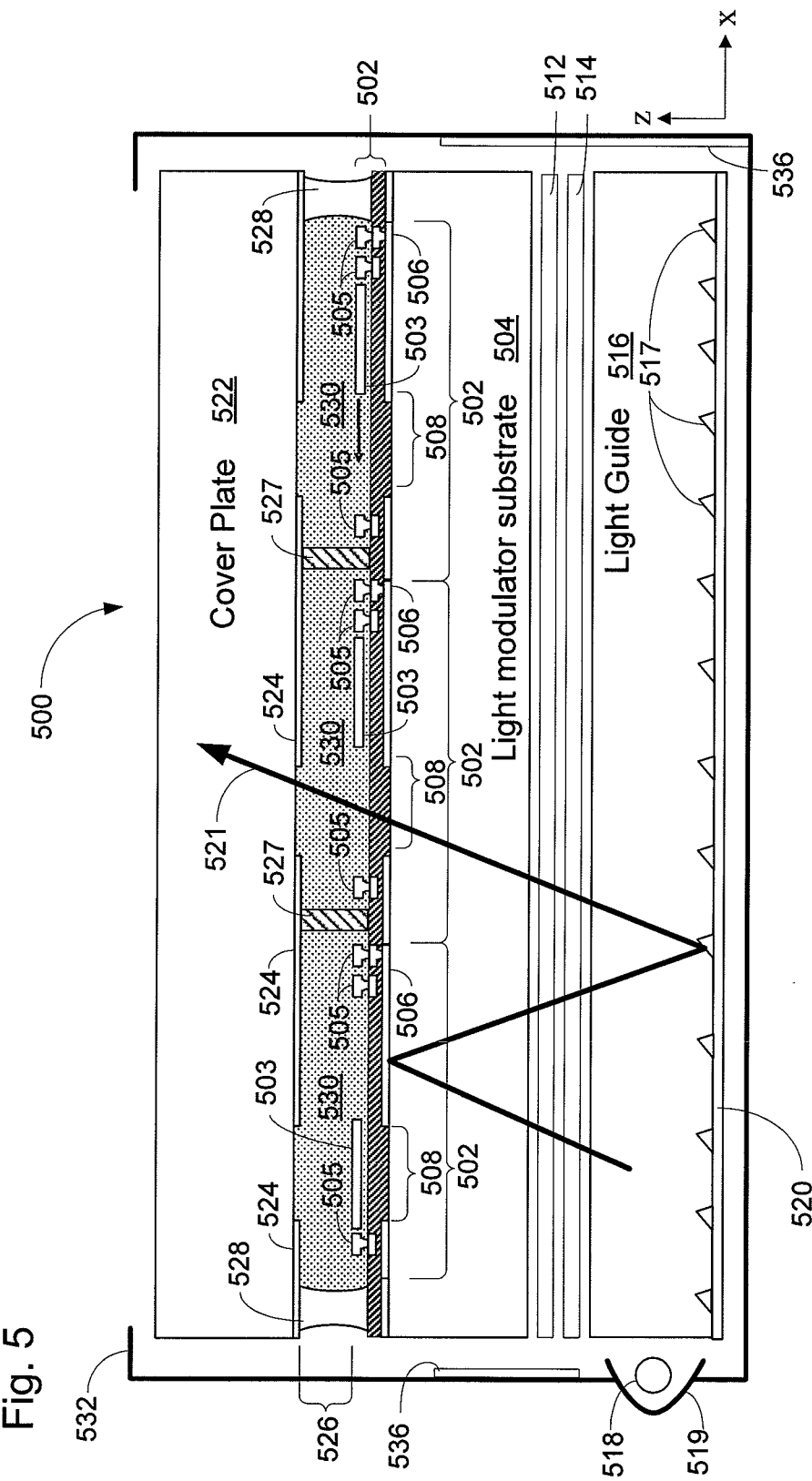
FIG. 5 is a cross-sectional view of a display apparatus, according to an illustrative embodiment of the invention.

FIG. 5 is a cross sectional view of a display apparatus 500 incorporating shutter-based light modulators (shutter assemblies) 502, according to an illustrative embodiment of the invention. Each shutter assembly incorporates a shutter 503 and an anchor 505. Not shown are the compliant beam actuators which, when connected between the anchors 505 and the shutters 503, help to suspend the shutters a short distance above the surface. The shutter assemblies 502 are disposed on a transparent substrate 504, preferably made of plastic or glass. A rear-facing reflective layer, reflective film 506, disposed on the substrate 504 defines a plurality of surface apertures 508 located beneath the closed positions of the shutters 503 of the shutter assemblies 502. The reflective film 506 reflects light not passing through the surface apertures 508 back towards the rear of the display apparatus 500. The reflective aperture layer 506 can be a fine-grained metal film without inclusions formed in thin film fashion by a number of vapor deposition techniques including sputtering, evaporation, ion plating, laser ablation, or chemical vapor deposition. In another implementation, the rear-facing reflective layer 506 can be formed from a mirror, such as a dielectric mirror. A dielectric mirror is fabricated as a stack of dielectric thin films which alternate between materials of high and low refractive index. The vertical gap which separates the shutters 503 from the reflective film 506, within which the shutter is free to move, is in the range of 0.5 to 10 microns. The magnitude of the vertical gap is preferably less than the lateral overlap between the edge of shutters 503 and the edge of apertures 508 in the closed state, such as the overlap 416 shown in FIG. 4B.

The display apparatus 500 includes an optional diffuser 512 and/or an optional brightness enhancing film 514 which separate the substrate 504 from a planar light guide 516. The light guide is comprised of a transparent, i.e. glass or plastic material. The light guide 516 is illuminated by one or more light sources 518, forming a backlight. The light sources 518 can be, for example, and without limitation, incandescent lamps, fluorescent lamps, lasers, or light emitting diodes (LEDs). A reflector 519 helps direct light from lamp 518 towards the light guide 516. A front-facing reflective film 520 is disposed behind the backlight 516, reflecting light towards the shutter assemblies 502. Light rays such as ray 521 from the backlight that do not pass through one of the shutter assemblies 502 will be returned to the backlight and reflected again from the film 520. In this fashion light that fails to leave the display to form an image on the first pass can be recycled and made available for transmission through other open apertures in the array of shutter assemblies 502. Such light recycling has been shown to increase the illumination efficiency of the display.

The light guide 516 includes a set of geometric light redirectors or prisms 517 which re-direct light from the lamps 518 towards the apertures 508 and hence toward the front of the display. The light re-directors can be molded into the plastic body of light guide 516 with shapes that can be alternately triangular, trapezoidal, or curved in cross section. The density of the prisms 517 generally increases with distance from the lamp 518.

In alternate embodiments the aperture layer 506 can be made of a light absorbing material, and in alternate embodiments the surfaces of shutter 503 can be coated with either a light absorbing or a light reflecting material. In alternate embodiments the aperture layer 506 can be deposited directly on the surface of the light guide 516. In alternate embodiments the aperture layer 506 need not be disposed on the same substrate as the shutters 503 and anchors 505 (see the MEMS-down configuration described below). These and other embodiments for a display illumination system are described in detail in the U.S. patent application Ser. Nos. 11/218,690 and 11/528,191, incorporated herein by reference.

In one implementation the light sources 518 can include lamps of different colors, for instance, the colors red, green, and blue. A color image can be formed by sequentially illuminating images with lamps of different colors at a rate sufficient for the human brain to average the different colored images into a single multi-color image. The various color-specific images are formed using the array of shutter assemblies 502. In another implementation, the light source 518 includes lamps having more than three different colors. For example, the light source 518 may have red, green, blue and white lamps or red, green, blue, and yellow lamps.

A cover plate 522 forms the front of the display apparatus 500. The rear side of the cover plate 522 can be covered with a black matrix 524 to increase contrast. In alternate implementations the cover plate includes color filters, for instance distinct red, green, and blue filters corresponding to different ones of the shutter assemblies 502. The cover plate 522 is supported a predetermined distance away from the shutter assemblies 502 forming a gap 526. The gap 526 is maintained by mechanical supports or spacers 527 and/or by an adhesive seal 528 attaching the cover plate 522 to the substrate 504.

The adhesive seal 528 seals in a working fluid 530. The working fluid 530 is engineered with viscosities preferably below about 10 centipoise and with relative dielectric constant preferably above about 2.0, and dielectric breakdown strengths above about $10^4$ V/cm. The working fluid 530 can also serve as a lubricant. In one implementation, the working fluid 530 is a hydrophobic liquid with a high surface wetting capability. In alternate implementations the working fluid 530 has a refractive index that is either greater than or less than that of the substrate 504.

Note this is short version of FIG. 5. It does not include details such as named varieties of seal materials, named varieties of fluids, and hydrophobic fluids. For these additions see file "Package II Alignment RB edit" dated Oct. 12, 2007.

A sheet metal or molded plastic assembly bracket 532 holds the cover plate 522, the substrate 504, the backlight 516 and the other component parts together around the edges. The assembly bracket 532 is fastened with screws or indent tabs to add rigidity to the combined display apparatus 500. In some implementations, the light source 518 is molded in place by an epoxy potting compound. Reflectors 536 help return light escaping from the edges of light guide 516 back into the light guide. Not shown in FIG. 5 are electrical interconnects which provide control signals as well as power to the shutter assemblies 502 and the lamps 518.

Further details and alternate configurations for the display apparatus 500, including manufacturing methods therefore, can be found in the U.S. patent application Ser. Nos. 11/361,785 and 11/731,628, incorporated herein by reference Display apparatus 500 is referred to as the MEMS-up configuration, wherein the MEMS based light modulators are formed on a front surface of substrate 504, i.e. the surface that faces toward the viewer. The shutter assemblies 502 are built directly on top of the reflective aperture layer 506. In an alternate embodiment of the invention, referred to as the MEMS-down configuration, the shutter assemblies are disposed on a substrate separate from the substrate on which the reflective aperture layer is formed. The substrate on which the reflective aperture layer is formed, defining a plurality of apertures, is referred to herein as the aperture plate. In the MEMS-down configuration, the substrate that carries the MEMS-based light modulators takes the place of the cover plate 522 in display apparatus 500 and is oriented such that the MEMS-based light modulators are positioned on the rear surface of the top substrate, i.e. the surface that faces away from the viewer and toward the back light 516. The MEMS-based light modulators are thereby positioned directly opposite to and across a gap from the reflective aperture layer. The gap can be maintained by a series of spacer posts connecting the aperture plate and the substrate on which the MEMS modulators are formed. In some implementations the spacers are disposed within or between each pixel in the array. The gap or distance that separates the MEMS light modulators from their corresponding apertures is preferably less than 10 microns, or a distance that is less than the overlap between shutters and apertures, such as overlap 416. Further details and alternate embodiments for the MEMS-down display configuration can be found in the U.S. patent application Ser. Nos. 11/361,785, 11/528,191, and 11/731,628 referenced above.

In other embodiments, the roller-based light modulator 220 or the light tap 250, as well as other MEMS-based light modulators, can be substituted for the shutter assemblies 502 within the display assembly 500.

Shutter Manufacturing

Figure 6A:
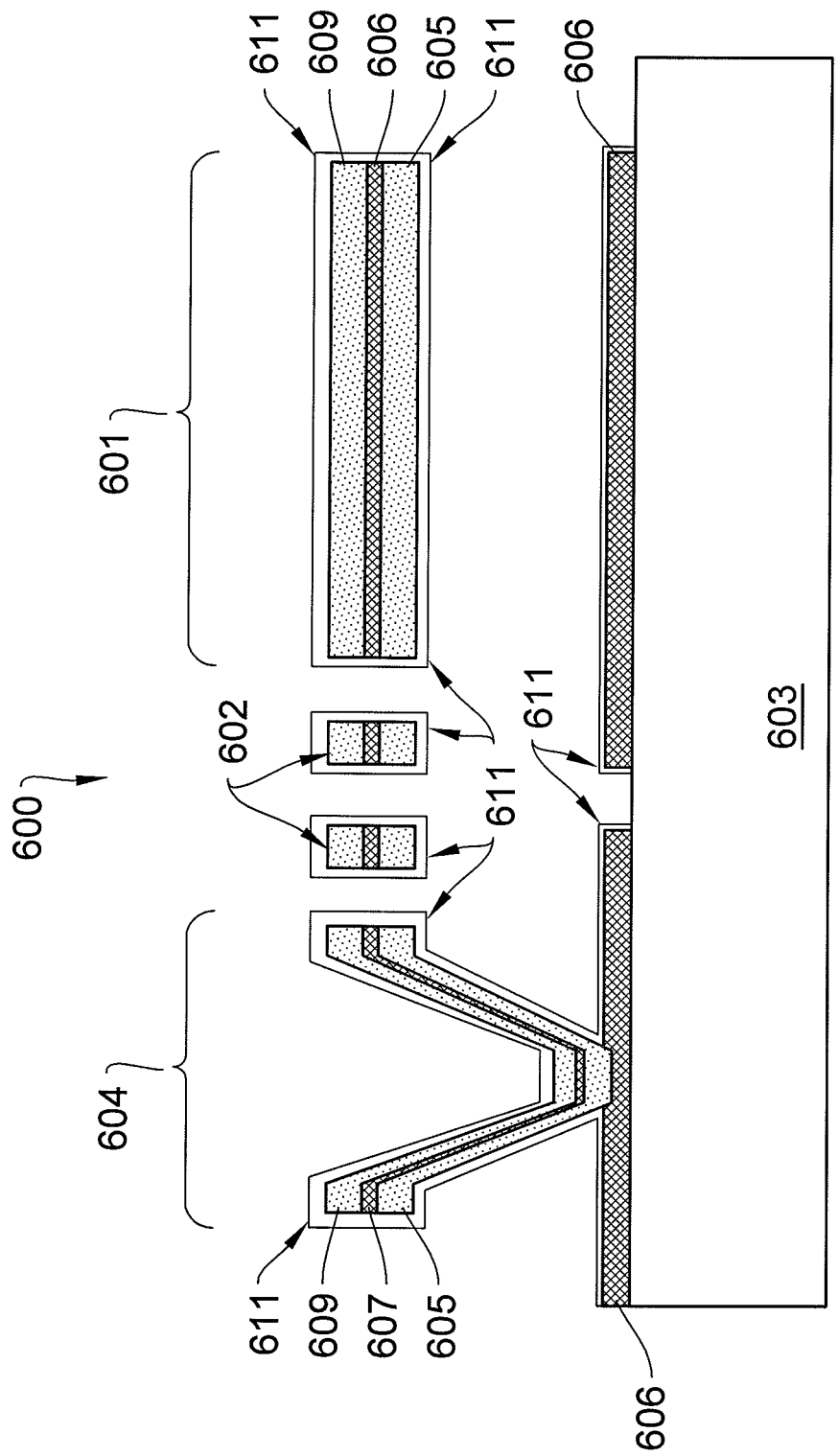
FIGS. 6A-6E are cross sectional views of stages of construction of a composite shutter assembly similar to that shown in FIG. 2A, according to an illustrative embodiment of the invention.

FIG. 6A shows a cross sectional detail of a composite shutter assembly 600, including shutter 601, a compliant beam 602, and anchor structure 604 built-up on substrate 603 and aperture layer 606 according to one implementation of the MEMS-based shutter display. The elements of the composite shutter assembly include a first mechanical layer 605, a conductor layer 607, a second mechanical layer 609, and an encapsulating dielectric 611. At least one of the mechanical layers 605 or 609 will be deposited to thicknesses in excess of 0.15 microns, as one or both of the mechanical layers will comprise the principle load bearing and mechanical actuation member for the shutter assembly. Candidate materials for the mechanical layers 605 and 609 include, without limitation, metals such as Al, Cu, Ni, Cr, Mo, Ti, Ta, Nb, Nd, or alloys thereof; dielectric materials such as $Al_2O_3$, $SiO_2$, $Ta_2O_5$, or $Si_3N_4$; or semiconducting materials such as diamond-like carbon, Si, Ge, GaAs, CdTe or alloys thereof. At least one of the layers, such as conductor layer 607, should be electrically conducting so as to carry charge on to and off of the actuation elements. Candidate materials include, without limitation, Al, Cu, Ni, Cr, Mo, Ti, Ta, Nb, Nd, or alloys thereof or semiconducting materials such as diamond-like carbon, Si, Ge, GaAs, CdTe or alloys thereof, especially when the semiconductors are doped with impurities such as phosphorus, arsenic, boron, or aluminum. FIG. 6A shows a sandwich configuration for the composite in which the deposited on either side of the conductor layer 607. In some embodiments the sandwich structure helps to ensure that stresses remaining after deposition and/or stresses that are imposed by temperature variations will not act cause bending or warping of the shutter assembly 600.

In some implementations the order of the layers in composite shutter assembly 600 can be inverted, such that the outside of the sandwich is comprised of a conducting layer while the inside of the sandwich is comprised of a mechanical layer.

Further description of materials for use in shutter 601, including the incorporation of materials selected for the absorption or reflection of incident light can be found in the U.S. patent application Ser. No. 11/361,785, entitled "Display Apparatus and Methods For Manufacture Thereof," filed Feb. 23, 2006 incorporated herein by reference.

Shutter assembly 600 includes an encapsulating dielectric layer 611. Dielectric coatings can be applied in conformal fashion, such that all bottom, tops, and side surfaces of the shutters and beams are uniformly coated. Such thin films can be grown by thermal oxidation and/or by conformal chemical vapor deposition of an insulator such as $Al_2O_3$, $Cr_2O_3$, $TiO_2$, $HfO_2$, $V_2O_5$, $Nb_2O_5$, $Ta_2O_5$, $SiO_2$, or $Si_3N_4$, or by depositing similar materials by means of atomic layer deposition. The dielectric coating layer can be applied with thicknesses in the range of 10 nm to 1 micron. In some cases sputtering and evaporation can be used to deposit the dielectric coating onto sidewalls.

FIGS. 6B-6E show the process for building shutter assembly 600, including shutter 601, a compliant beam 602, and anchor structure 604 on top of a substrate 603 and aperture layer 606. In many implementations, the shutter assembly is built on top of a pre-existing control matrix, for instance an active matrix array of thin film transistors. The processes used for constructing the control matrix on top of or in conjunction with an aperture layer 606 is described in U.S. patent application Ser. No. 11/361,785, referred to and incorporated above.

Figure 6B:
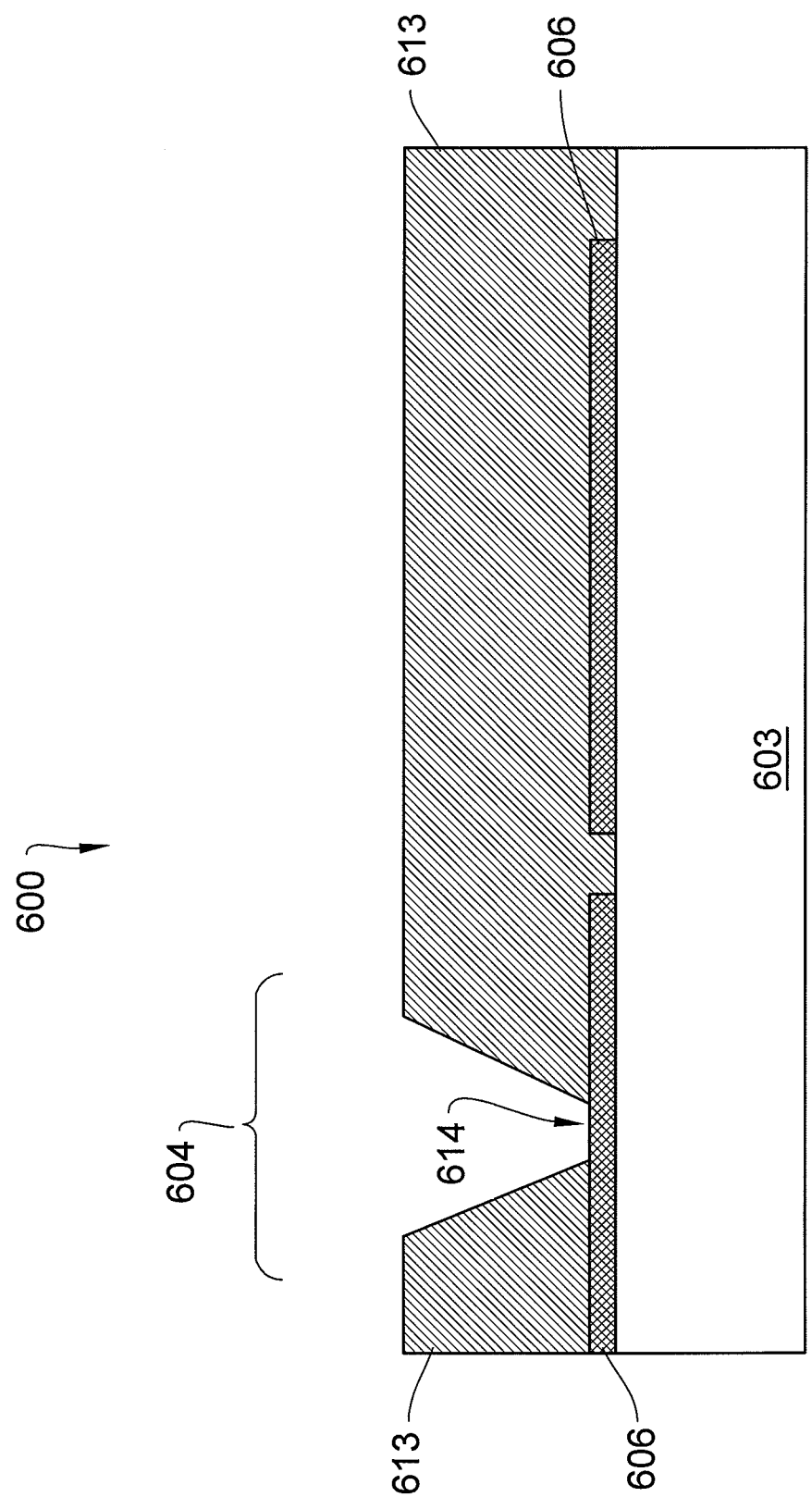

FIG. 6B is a cross sectional view of a first step in the process of forming the shutter assembly 600 according to an illustrative embodiment of the invention. As shown in FIG. 6B, a sacrificial layer 613 is deposited and patterned. Polyimide is a preferred sacrificial material. Other candidate sacrificial material include polymer materials such as polyamide, fluoropolymer, benzocyclobutene, polyphenylquinoxylene, parylene, or polynorbornene. These materials are chosen for their ability to planarize rough surfaces, maintain mechanical integrity at processing temperatures in excess of 250 C, and their ease of etch and/or thermal decomposition during removal. Alternate sacrificial layers can be found among the photoresists: polyvinyl acetate, polyvinyl ethylene, and phenolic or novolac resins, although their use will typically be limited to temperatures below 350 C. An alternate sacrificial layer is $SiO_2$, which can be removed preferentially as long as other electronic or structural layers are resistant to the hydrofluoric acid solutions used for its removal ($Si_3N_4$ is so resistant). Another alternate sacrificial layer is silicon, which can be removed preferentially as long as other electronic and structural layers are resistant to the fluorine plasmas or $XeF_2$ used for its removal (most metals and/or $Si_3N_4$ are so resistant). Yet another alternate sacrificial layer is aluminum, which can be removed preferentially as long as other electronic or structural layers are resistant to strong base (concentrated NaOH) solutions (Cr, Ni, Mo, Ta, and Si are so resistant). Still another alternate sacrificial layer is copper, which can be removed preferentially as long as other electronic or structural layers are resistant to nitric or sulfuric acid solutions (Cr, Ni, and Si are so resistant).

Next the sacrificial layer 613 is patterned to expose holes or vias at the anchor regions 604. The preferred polyimide material and other polymer resins can be formulated to include photoactive agents—enabling regions exposed through a UV photomask to be preferentially removed in a developer solution. Other sacrificial layers 613 can be patterned by coating the sacrificial layer in an additional layer of photoresist, photopatterning the photoresist, and finally using the photoresist as an etching mask. Other sacrificial layers can be patterned by coating the sacrificial layer with a hard mask, which can be a thin layer of $SiO_2$ or metal such as chromium. A photopattern is then transferred to the hard mask by means of photoresist and wet chemical etching. The pattern developed in the hard mask can be very resistant to dry chemical, anisotropic, or plasma etching—techniques which can be used to impart very deep and narrow anchor holes into the sacrificial layer.

After the anchor 604 or via regions have been opened in the sacrificial layer, the exposed and underlying conducting surface 614 can be etched, either chemically or via the sputtering effects of a plasma, to remove any surface oxide layers. Such a contact etching step can improve the ohmic contact between the underlying conductor and the shutter material.

After patterning of the sacrificial layer, any photoresist layers or hard masks can be removed through use of either solvent cleans or acid etching.

Figure 6C:
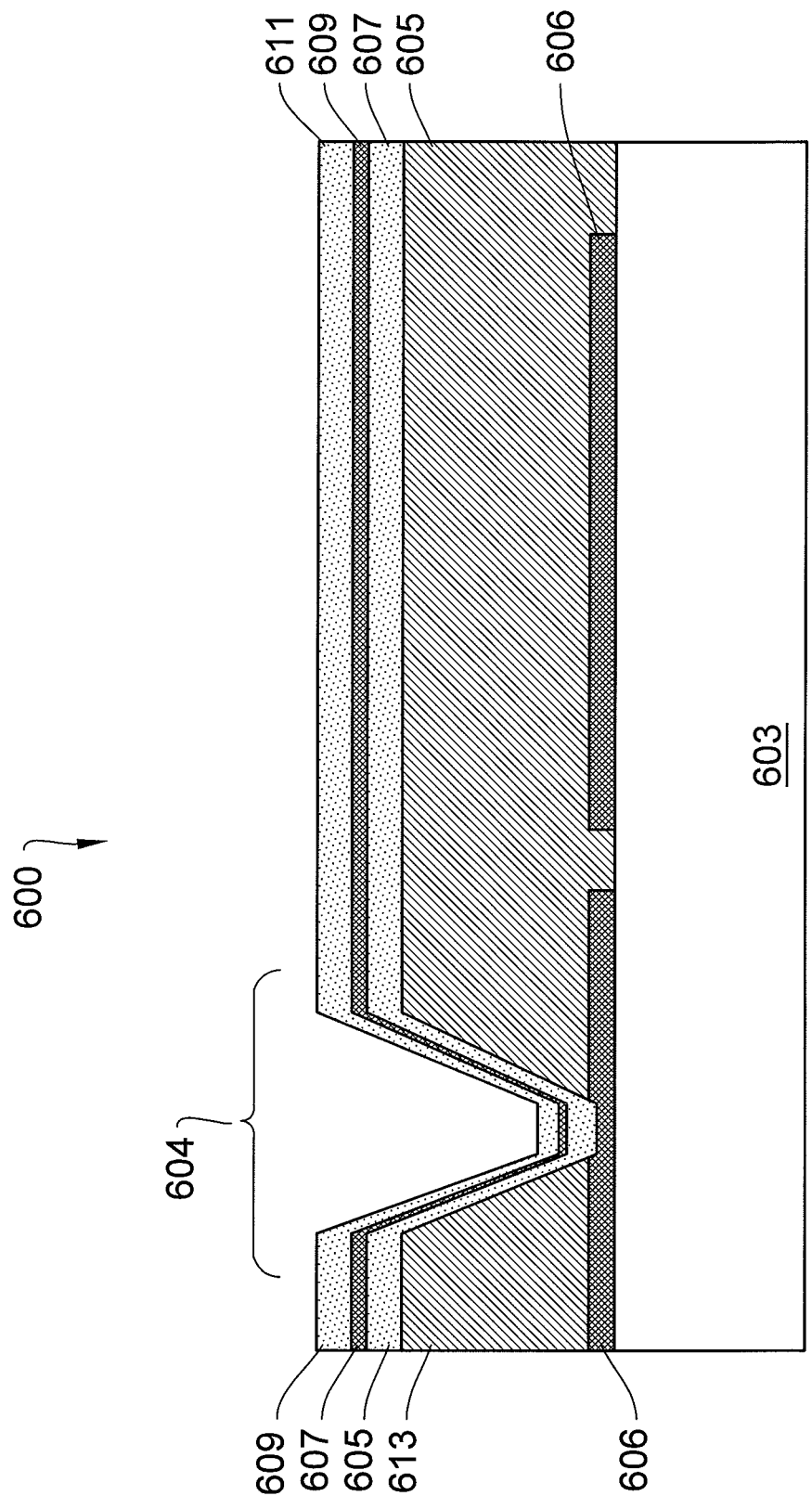

Next, in the process for building shutter assembly 600, as shown in FIG. 6C, the shutter materials are deposited. The shutter assembly 600 is composed of multiple thin films 605, 607, and 609. In a preferred embodiment the first mechanical layer 605 is an amorphous silicon layer, deposited first, followed by a conductor layer 607 comprised of aluminum, followed by a second layer 609 of amorphous silicon. The deposition temperature used for the shutter materials 605, 607, and 609 is below that at which physical degradation occurs for the sacrificial layer. For instance, polyimide is known to decompose at temperatures above 400 C. The shutter materials 605, 607 and 609 can be deposited at temperatures below 400 C, thus allowing usage of polyimide as a sacrificial material. Hydrogenated amorphous silicon is a useful mechanical material for layers 605 and 609 since it can be grown to thicknesses in the range of 0.15 to 3 microns, in a relatively stress-free state, by means of plasma-assisted chemical vapor deposition (PECVD) from silane gas at temperatures in the range of 250 to 350 C. Phosphene gas (PH3)

is used as a dopant so that the amorphous silicon can be grown with resistivities below 1 ohm-cm. In alternate embodiments, a similar PECVD technique can be used for the deposition of $Si_3N_4$, silicon-rich $Si_3N_4$, or $SiO_2$ materials as the mechanical layer 605 or for the deposition of diamond-like carbon, Ge, SiGe, CdTe, or other semiconducting materials for mechanical layer 605. An advantage of the PECVD deposition technique is that the deposition can be quite conformal, that is, it can coat a variety of inclined surfaces or the inside surfaces of narrow via holes. Even if the anchor or via holes which are cut into the sacrificial material present nearly vertical sidewalls, the PECVD technique can provide a continuous coating between the bottom and top horizontal surfaces of the anchor.

In addition to the PECVD technique, alternate techniques available for the growth of shutter layers 605 or 609 include RF or DC sputtering, metal-organic chemical vapor deposition, evaporation, electroplating or electroless plating.

For the conducting layer 607, a metal thin film such as Al is preferred, although alternates such as Cu, Ni, Mo, or Ta can be chosen. The inclusion of such a conducting material serves two purposes. It reduces the overall sheet resistance of the shutter material and it helps to block the passage of visible light through the shutter material. (Amorphous silicon, if grown to thicknesses of less than 2 microns can transmit visible light to some degree.) The conducting material can be deposited either by sputtering or, in a more conformal fashion, by chemical vapor deposition techniques, electroplating, or electroless plating.

Figure 6D:
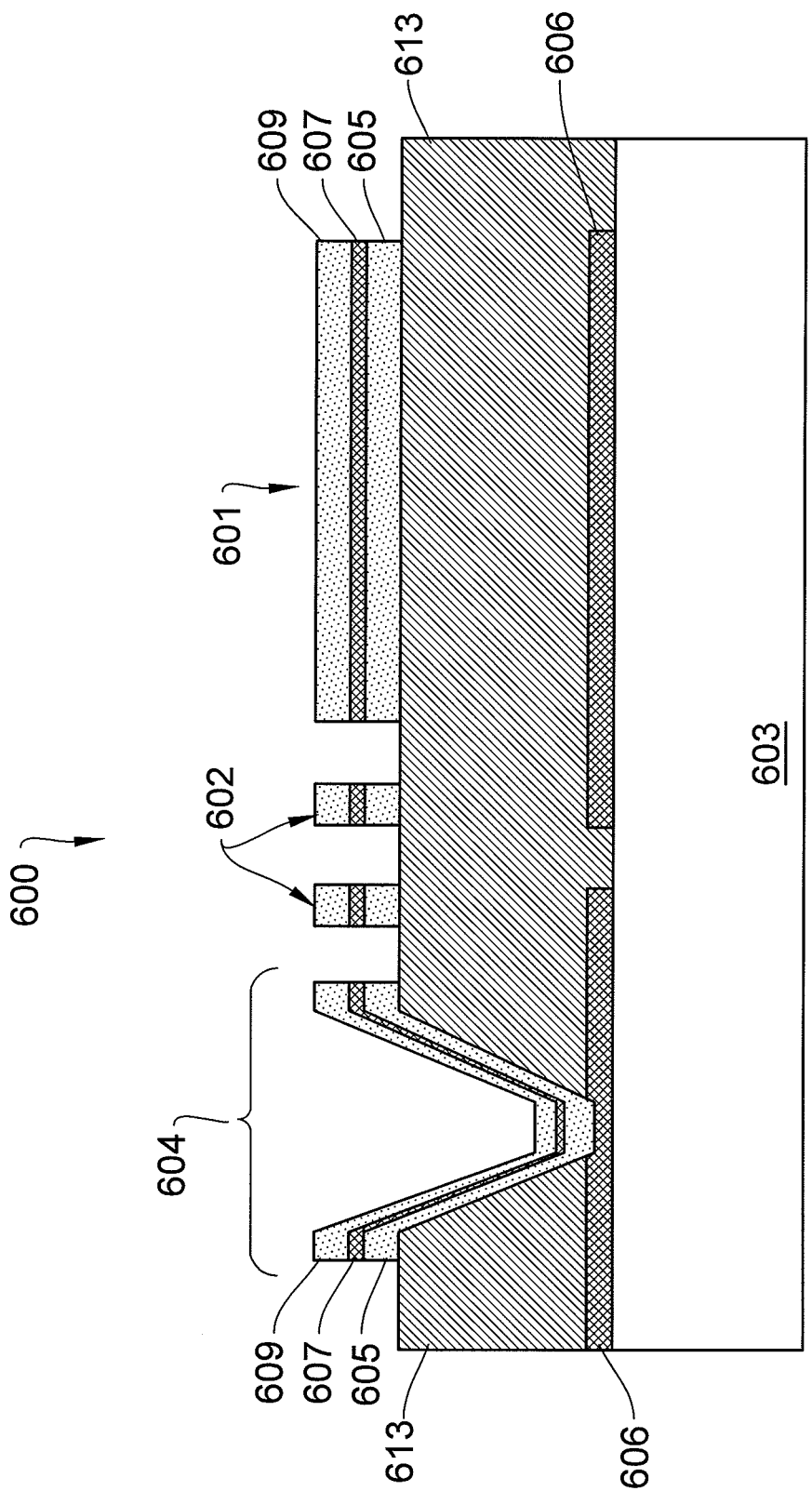

The process for building the shutter assembly 600 continues in FIG. 6D. The shutter layers 605, 607, and 609 are photomasked and etched while the sacrificial layer 613 is still on the wafer. First a photoresist material is applied, then exposed through a photomask, and then developed to form an etch mask. Amorphous silicon, silicon nitride, and silicon oxide can then be etched in fluorine-based plasma chemistries. $SiO_2$ mechanical layers can be etched using HF wet chemicals; and any metals in the conductor layers can be etched with either wet chemicals or chlorine-based plasma chemistries.

Figure 6E:
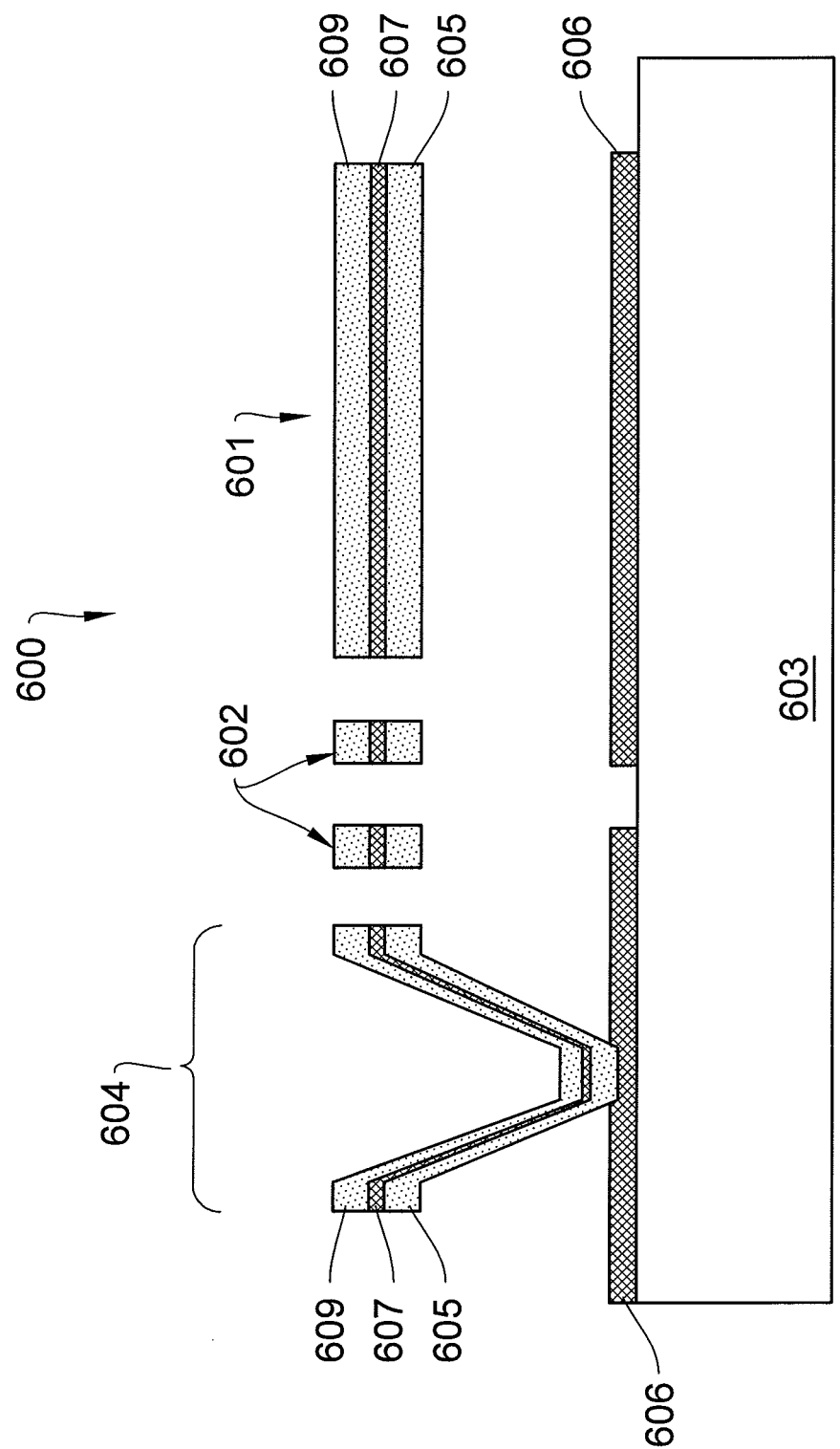

The pattern shapes applied through the photomask at FIG. 6D influence the mechanical properties, such as stiffness, compliance, and the voltage response in the actuators and shutters of the shutter assembly 600. The shutter assembly 600 includes a compliant beam 602, shown in cross section. Compliant beam 602 is shaped such that the width is less than the total height or thickness of the shutter material. It is preferable to maintain a beam dimensional ratio of at least 1.4:1, with the beams 602 being taller or thicker than they are wide The process for building the shutter assembly 600 continues as depicted in FIG. 6E. The sacrificial layer 613 is removed, which frees-up all moving parts from the substrate 603, except at the anchor points. Polyimide sacrificial materials are preferably removed in an oxygen plasma. Other polymer materials used for sacrificial layer 613 can also be removed in an oxygen plasma, or in some cases by thermal pyrolysis. Some sacrificial layers 613 (such as $SiO_2$) can be removed by wet chemical etching or by vapor phase etching.

In a final process, not shown in FIG. 6E but shown in FIG. 6A, a dielectric coating 611 is deposited on all exposed surfaces of the shutter. Dielectric coatings 611 can be applied in conformal fashion, such that all bottom, tops, and side surfaces of the shutters 601 and beams 602 are uniformly coated using chemical vapor deposition. $Al_2O_3$ is a preferred dielectric coating for layer 611, which is deposited by atomic layer deposition to thicknesses in the range of 10 to 30 nanometers.

Finally, anti-stiction coatings can be applied to the surfaces of all shutters 601 and beams 602. These coatings prevent the unwanted stickiness or adhesion between two independent beams of an actuator. Applicable coatings include carbon films (both graphite and diamond-like) as well as fluoropolymers, and/or low vapor pressure lubricants. These coatings can be applied by either exposure to a molecular vapor or by decomposition of a precursor compounds by means of chemical vapor deposition. Anti-stiction coatings can also be created by the chemical alteration of shutter surfaces, as in the fluoridation, silanization, siloxidation, or hydrogenation of insulating surfaces.

The Sidewall Beams Process

U.S. patent application Ser. No. 11/251,035 describes a number of useful designs for shutter assemblies and actuators. One class of suitable actuators for use in MEMS-based shutter displays include compliant actuator beams for controlling shutter motion that is transverse to or in-the-plane of the display substrate. The voltage necessary for the actuation of such shutter assemblies decreases as the actuator beams become more compliant. The control of actuated motion also improves if the beams are shaped such that in-plane motion is preferred or promoted with respect to out-of-plane motion. In a preferred design the compliant actuator beams have a rectangular cross section, such as beam 602 of FIG. 6A, such that the beams are taller or thicker than they are wide.

The stiffness of a long rectangular beam with respect to bending within a particular plane scales with the thinnest dimension of that beam in that plane to the third power. It is of interest, therefore, to reduce the width of the compliant beams as far as possible to reduce the actuation voltages for in-plane motion. When using conventional photolithography equipment to define and fabricate the shutter and actuator structures, however, the minimum width of the beams is usually limited to the resolution of the optics. And although photolithography equipment has been developed for defining patterns in photoresist with features as narrow as 15 nanometers, such equipment is expensive and the areas over which can be patterning can be accomplished in a single exposure are limited. For economical photolithography over large panels of glass, the patterning resolution or minimum feature size is typically limited to 1 micron or 2 microns or greater.

U.S. patent application Ser. No. 11/361,785 describes a technique, illustrated in FIGS. 7A through 7D, whereby a shutter assembly 700 with compliant actuator beams 716 can be fabricated at dimensions well below the conventional lithography limits on large glass panels. In the process of FIGS. 7A through 7D, the compliant beams of shutter assembly 700 are formed as sidewall features on a mold made from a sacrificial material. The process is referred to as a sidewall beams process.

Figure 7A:
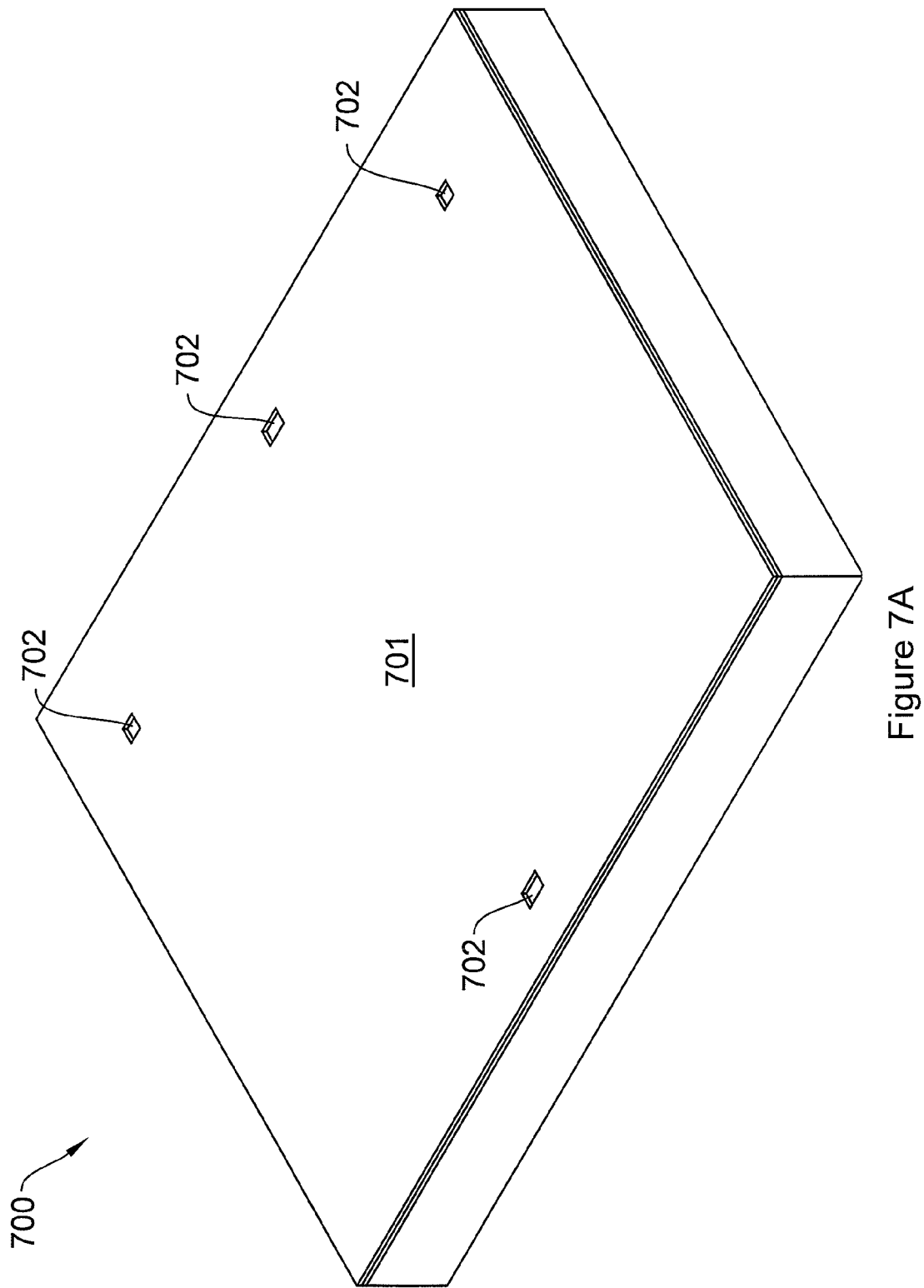
FIGS. 7A-7D are isometric views of stages of construction of an alternate shutter assembly with narrow sidewall beams, according to an illustrative embodiment of the invention.

The process of forming a shutter assembly 700 with sidewall beams begins, as shown in FIG. 7A, with the deposition and patterning of a first sacrificial material 701. The pattern defined in the first sacrificial material creates openings or vias 702 within which anchors for the shutter will eventually be formed. The deposition and patterning of the first sacrificial material 701 is similar in concept, and uses similar materials, as those described for the deposition and patterning described in relation to FIGS. 6A-6E.

Figure 7B:
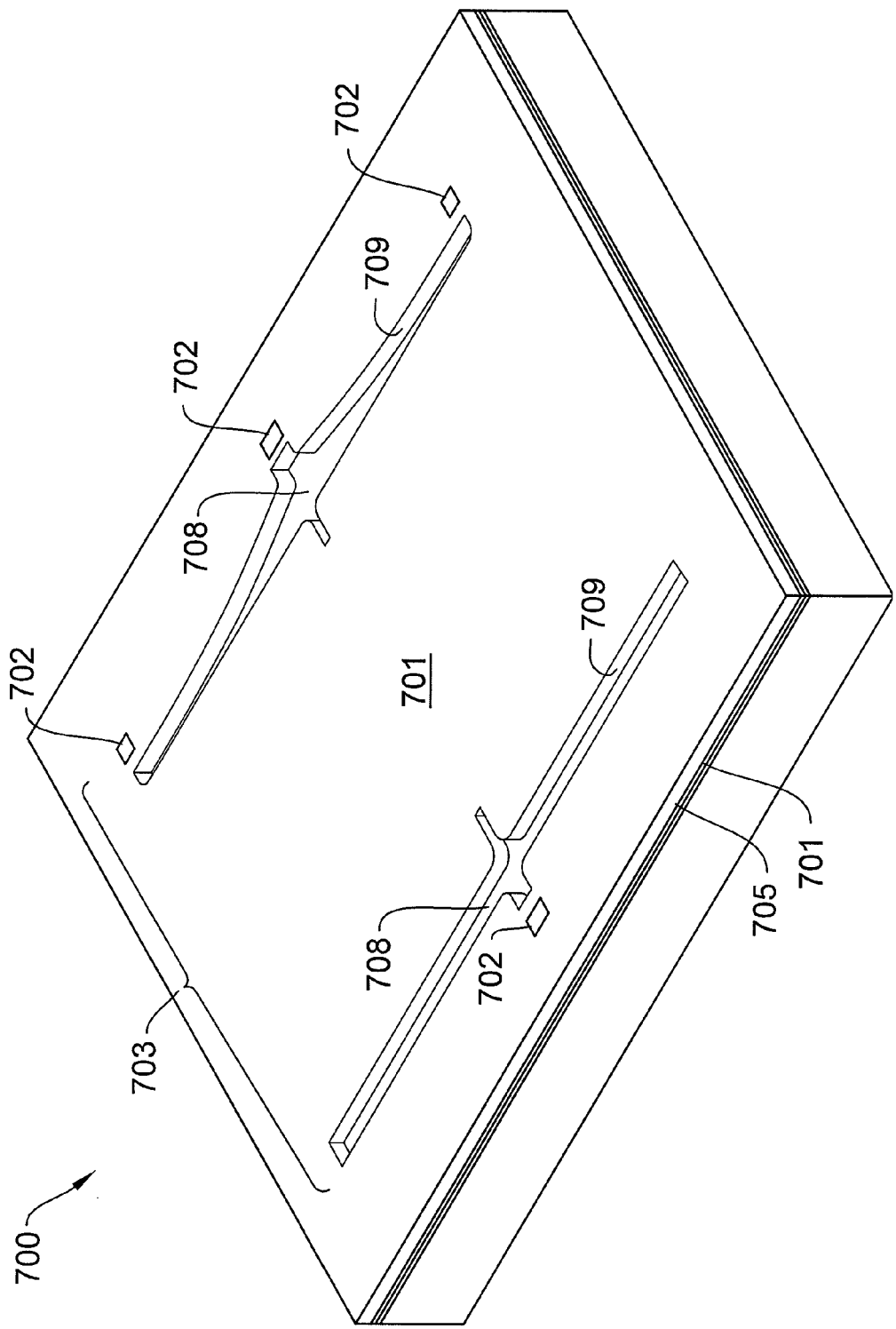

The process of forming sidewall beams continues with the deposition and patterning of a second sacrificial material 705. FIG. 7B shows the shape of a mold 703 that is created after patterning of the second sacrificial material 705. The mold 703 also includes the first sacrificial material 701 with its previously defined vias 702. The mold 703 in FIG. 7B includes two distinct horizontal levels: The bottom horizontal level 708 of mold 703 is established by the top surface of the first sacrificial layer 701 and is accessible in those areas where the second sacrificial layer 705 has been etched away. The top horizontal level 710 of the mold 703 is established by the top surface of the second sacrificial layer 705. The mold 703 illustrated in FIG. 7B also includes substantially vertical sidewalls 709.

Materials for use as sacrificial materials 701 and 705 are described above with respect to sacrificial material 613.

Figure 7C:
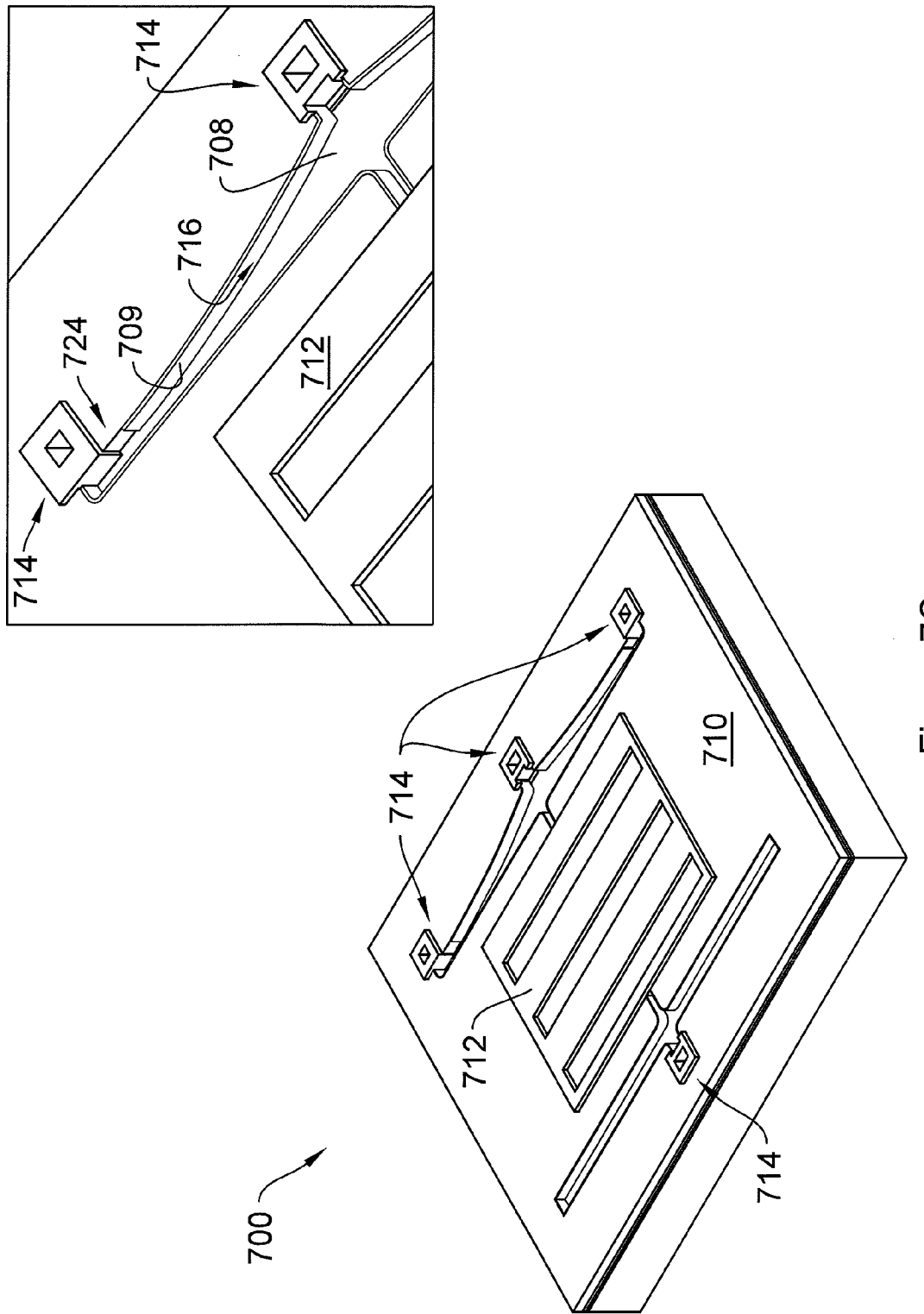

The process of forming sidewall beams continues with the deposition and patterning of the shutter material onto all of the exposed surfaces of the sacrificial mold 703, as depicted in FIG. 7C. The preferred materials for use in shutter 712 are described above with respect to the shutter materials 605, 607, and 609. Alternate shutter materials and/or shutter coatings are described in U.S. patent application Ser. No. 11/361, 785. The shutter material is deposited to a thickness of less than about 2 microns. In some implementations, the shutter material is deposited to have a thickness of less than about 1.5 microns. In other implementations, the shutter mater is deposited to have a thickness of less than about 1.0 microns, and as thin as about 0.10 microns. After deposition, the shutter material (which may be a composite shutter as described above) is patterned, as shown in FIG. 7C. The pattern developed into the photoresist is designed such that shutter material remains in the region of shutter 712 as well as at the anchors 714.

Particular equipment and chemistries are also chosen for the etching process used at the step shown in FIG. 7C, known in the art as an anisotropic etch. The anisotropic etch of the shutter material is carried out in a plasma atmosphere with a voltage bias applied to the substrate, or to an electrode in proximity to the substrate. The biased substrate (with electric field perpendicular to the surface of the substrate) leads to acceleration of ions toward the substrate at an angle nearly perpendicular to the substrate. Such accelerated ions, coupled with the etching chemicals, lead to etch rates that are much faster in a direction that is normal to the plane of the substrate as compared to directions parallel to the substrate. Undercut-etching of shutter material in the regions protected by photoresist is thereby substantially eliminated. Along sidewall surfaces 709 of mold 703, which are substantially parallel to the track of the accelerated ions, the shutter material is also substantially protected from the anisotropic etch. Such protected sidewall shutter material will later form compliant beams 716 for supporting the shutter 712. Along other (non-photoresist-protected) horizontal surfaces of the mold, such as top horizontal surface 710 or bottom horizontal surface 708, the shutter material has been completely removed by the etch.

The anisotropic etch used to form sidewall beams 716 can be achieved in either an RF or DC plasma etching device as long as provision for electrical bias of the substrate, or of an electrode in close proximity of the substrate, is supplied. For the case of RF plasma etching, an equivalent self-bias can be obtained by disconnecting the substrate holder from the grounding plates of the excitation circuit, thereby allowing the substrate potential to float in the plasma. In one implementation it is possible to provide an etching gas such as $CHF_3$, $C_4F_8$, or $CHCl_3$ in which both carbon and hydrogen and/or carbon and fluorine are constituents in the etch gas. When coupled with a directional plasma, achieved again through voltage biasing of the substrate, the liberated C, H, and/or F atoms can migrate to the sidewalls 709 where they build up a passive or protective quasi-polymer coating. This quasi-polymer coating further protects the sidewall beams 716 from etching or chemical attack.

Figure 7D:
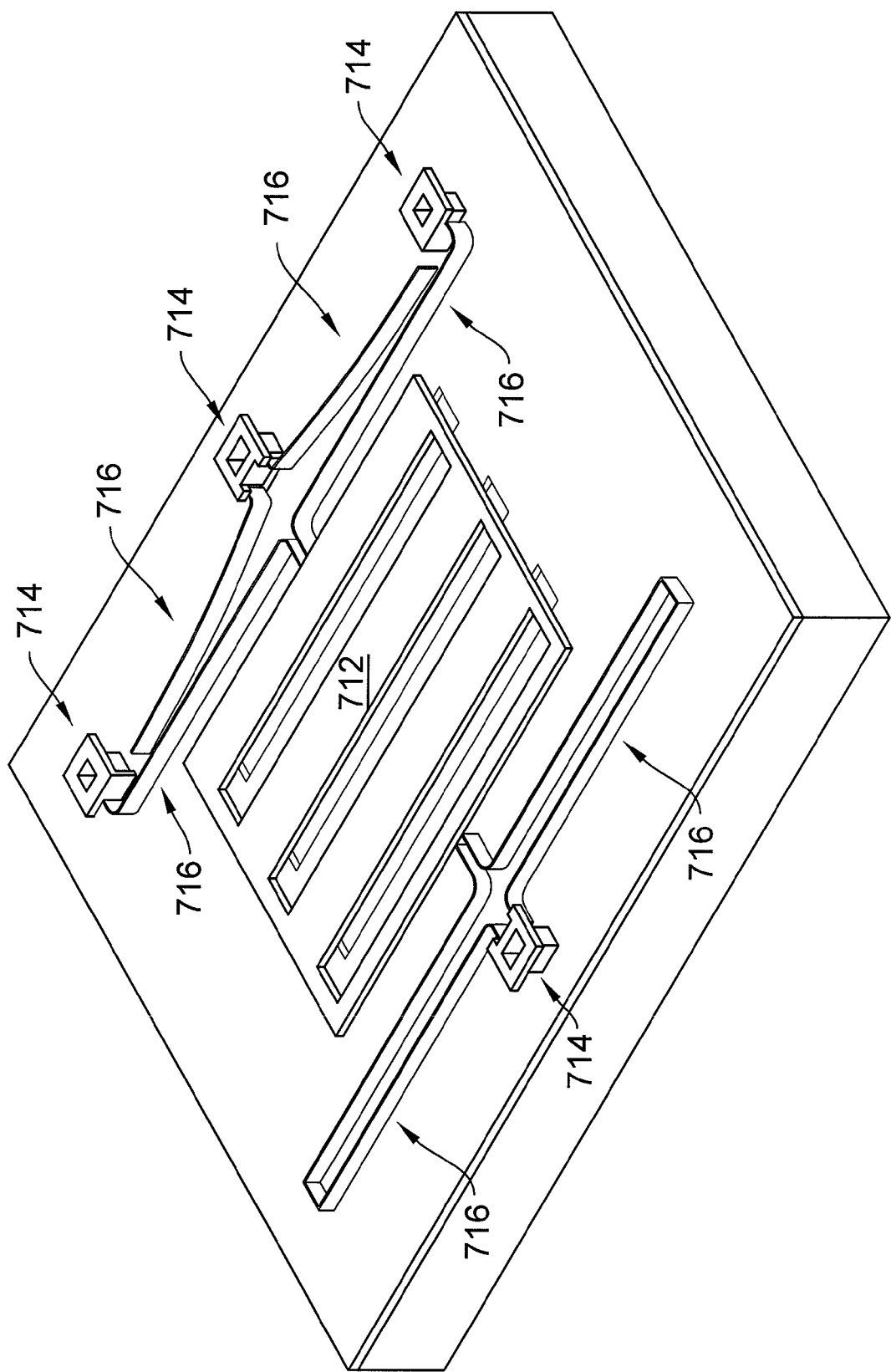

The process of forming sidewall beams is completed with the removal of the remainder of the second sacrificial layer 705 and the first sacrificial layer 701, the result being shown in FIG. 7D. The process of removing sacrificial material is similar to that described with respect to FIG. 6E. The material deposited on the sidewalls 709 of the mold 703 remain as the compliant beams 716. The compliant beams 716 mechanically connect the anchors 714 to the shutter 712. The anchors connect to an aperture layer 725. The compliant beams 716 are tall and narrow. The width of the sidewall beams 716, as formed from the surface of the mold 703, is similar to the thickness of the shutter material as deposited. In some cases the beam width at 716 will be the same as the thickness of the horizontal shutter material at 712, in other cases the beam width will be only about ½ the thickness of the shutter material. The height of the sidewall beams 716 is determined by the thickness of the second sacrificial material 705, or in other words, by the depth of the mold 703 as created during the patterning step described in relation to FIG. 7B. As long as the thickness of the deposited shutter material is chosen to be less than 2 microns (for many applications the thickness range of 0.1 to 2.0 micron is suitable), the method illustrated in FIGS. 7A-7D is well suited for the production of very narrow beams. Conventional photolithography would limit the patterned features shown in FIGS. 7A, 7B, and 7C to much larger dimensions, for instance allowing minimum resolved features no smaller than 2 microns or 5 microns.

FIG. 7D depicts an isometric view of a shutter assembly 700, formed after the release step in the above-described process, yielding compliant beams with cross sections of high aspect ratio. As long as the thickness of the second sacrificial layer is, for example, greater than 4 times larger than the thickness of the shutter material, the resulting ratio of beam height to beam width will be produced to a similar ratio, i.e. greater than 4.

An optional step, not illustrated above but included as part of the process leading to FIG. 7C, involves isotropic etching of sidewall beams 716 to separate or decouple beams formed along the sidewalls of mold 703. For instance, the shutter material at point 724 has been removed from the sidewall through use of an in isotropic etch. An isotropic etch is one whose etch rate is the same in all directions, so that sidewall material in regions such as point 724 is no longer protected. The isotropic etch can be accomplished in the typical plasma etch equipment as long as a bias voltage is not applied to the substrate. Isotropic etch can also be achieved using wet chemical or vapor phase etching techniques. The separation of beams at point 724 is achieved through a distinct sequence of photoresist dispense, patterning, and etch. The photoresist pattern in this case is designed to protect the sidewall beams 716 from the isotropic etch chemistry but expose the sidewall beams at point 724.

As a final step in the sidewall process, an encapsulating dielectric, such as dielectric 611 is deposited around the outside surfaces of the sidewall beams.

In order to protect the shutter material deposited on sidewalls 709 of the mold 703 and to produce sidewall beams 716 of substantially uniform cross section, some particular process guidelines can be followed. For instance, in FIG. 7B, the sidewalls 709 can be made as vertical as possible. Slopes at the sidewalls 709 and/or exposed surfaces become susceptible to the anisotropic etch. Vertical sidewalls 709 can be produced if the patterning step at FIG. 7B, the patterning of the second sacrificial material 705, is also carried out in anisotropic fashion. The use of an additional photoresist coating or a hard mask in conjunction with patterning of the second sacrificial layer 705 (see the discussion with respect to FIG. 12A) makes it possible to employ aggressive plasmas and/or high substrate bias in the anisotropic etch of the second sacrificial material 705 without fear of excessive wear of the photoresist. Vertical sidewalls 709 can also be produced in photoimageable sacrificial materials as long as care is taken to control the depth of focus during the UV exposure and excessive shrinkage is avoided during final cure of the resist.

Another process specification that helps during sidewall beam processing regards the conformality of the shutter material deposition. The surfaces of the mold 703 are preferably covered with similar thicknesses of shutter material, regardless or the orientation of those surfaces, either vertical or horizontal. Such conformality can be achieved when depositing with a chemical vapor deposition technique (CVD). In particular, the following conformal techniques can be employed: plasma enhanced chemical vapor deposition (PECVD), low pressure chemical vapor deposition (LPCVD), and atomic or self-limited layer deposition (ALD). In the above CVD techniques the growth rate of the thin film can be limited by reaction rates on a surface as opposed to exposing the surface to a directional flux of source atoms. In such conformal deposition techniques, the thickness of material grown on vertical surfaces is preferably at least 50% of the thickness of material grown on horizontal surfaces. Alternatively, shutter materials can be conformally deposited from solution by electroless plating or electroplated, as long as a metal seed layer is provided that uniformly coats all surfaces before plating.

Designs Incorporating Compliant Beams Under Stress

Figure 8C:
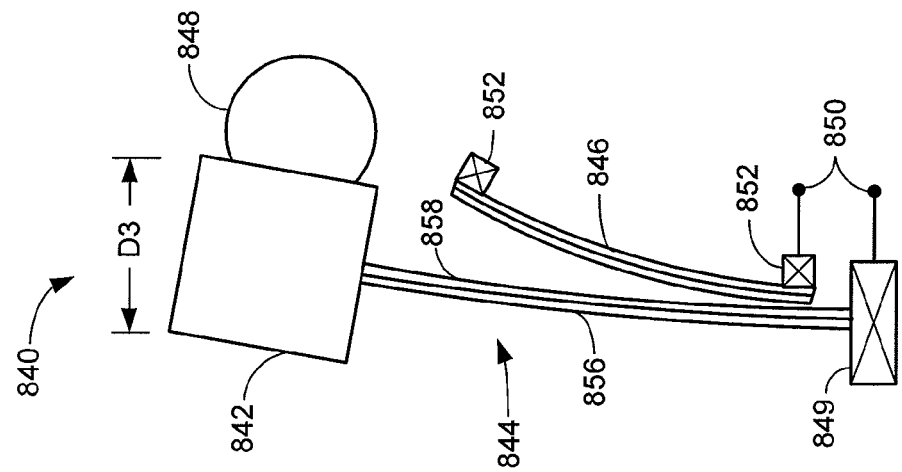
FIGS. 8A-8C are plan views of three different shutter assemblies, with are characterized by a variety of stress states, according to an illustrative embodiment of the invention.
Figure 8B:
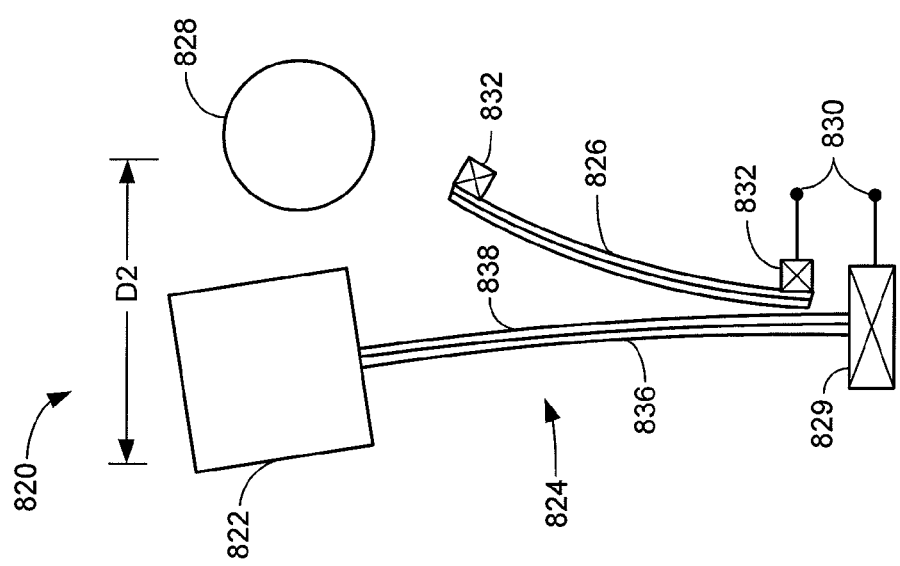
Figure 8A:
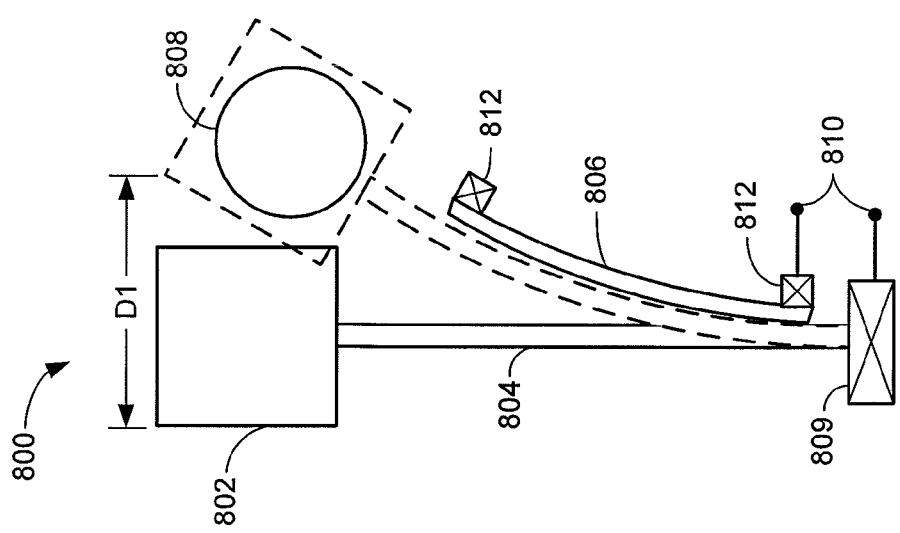

The sidewall beam process, illustrated in FIGS. 7A to 7D, is capable of producing very narrow and compliant actuator or support beams. In most cases the beam widths will be comparable to the thickness of the shutter material as deposited and will be considerably less than 1 micron. Because of their narrow and compliant property, however, the shape of the beams after release from the mold can be very dependant on the stress state of the beam materials as deposited. FIGS. 8A through 8C illustrate the consequences of various stress states on the rest or relaxed shape and position of the beams. The stresses within a beam absent any external applied force (e.g., electrostatic forces generated during actuation) resulting, for example, from its, material composition, or the processes of manufacturing, will be referred to collectively herein as the "inherent stress state" of the beam.

FIG. 8A provides an example of a transverse shutter assembly 800, which includes a shutter 802, and a compliant support beam 804, an anchor 809, and an actuator electrode 806. The shutter assembly 800 also includes an aperture 808, defined by an opening formed through the bulk of the substrate or patterned in a reflective or light-absorbing thin film deposited on the substrate. Together, the compliant support beam 804 and the electrode 806 comprise an electrostatic actuator. When a voltage is placed across electrical contacts 810 the compliant support beam 804 is forced to bend and move toward the electrode 806, and the shutter is caused to move and obstruct the passage of light through the aperture. The open position, also referred to as the rest or the relaxed position for shutter 802 and compliant beam 804, is represented by solid lines in FIG. 8A. The actuated or closed position is represented by dotted lines. The minimum distance traversed by the shutter 802 between the open and closed positions is indicated by the marker D1.

For shutter assembly 800, the compliant support beam 804 and the electrode 806 are formed by means of a sidewall beam process. Each of the beams 804 and 806 is suspended above the substrate surface, and is attached to the substrate at anchors 809 and 812, respectively. In cross section, each of the beams has an aspect ratio greater than one, where the vertical faces, i.e. those perpendicular to the substrate surface, have a dimension substantially taller or higher than the narrow dimension in the plane of the substrate.

FIG. 8B illustrates a transverse shutter assembly 820, which includes a shutter 822, and a compliant support beam 824, an anchor 829, and an actuator electrode 826 and an aperture 828. Similar to shutter assembly 800, the support beam 824 and the electrode 826 can be formed by means of the sidewall beam process. Similar to shutter assembly 800, the shutter assembly 820 can be actuated by a voltage across the contacts 830, causing the shutter 822 to move and obstruct the aperture 828. For shutter assembly 820, however, the compliant beam 824 is comprised of two different materials which are characterized by different stress states, and where the stress states determine, in part, the rest or relaxed position of the beam. In the rest position of shutter assembly 820 the first material on the left, 836 is, on average, in a tensile stress state while the second material on the right, 838 is, on average, in a compressive stress state.

The different stress states imposed by materials 836 and 838 creates the equivalent of a bending moment on the beam 824, causing the beam 824 to bend toward the aperture 828 after release from the sacrificial mold. The sacrificial mold is not shown in FIGS. 8A-8C, but in these three examples one can assume that the mold is similar in materials and function to the mold 703. The design or shape for each of the molds used in conjunction with shutter assemblies 800, 820 and 824 is similar; and the shape of the beam 804 is representative of the shape of the sacrificial mold used in each case. The shutter assembly 800 is the only shutter assembly of the three illustrated in FIGS. 8A-8C whose shape is not substantially changed after release from the mold.

The support beam 824 bends into a rest or relaxed position, as is illustrated in FIG. 8B. The rest position is that position which minimizes strain energy or potential energy of the beam without application of any actuation voltages. The minimum distance to be traversed by the shutter 822 between the open (or rest) position and the closed (or actuated) position is indicated by the marker D2. The distance D2 in shutter assembly 820 is greater than the distance D1 in shutter assembly 800.

FIG. 8C illustrates a transverse shutter assembly 840, which includes a shutter 842, and a compliant support beam 844, an anchor 849, and an actuator electrode 846 and an aperture 848. Similar to shutter assembly 800, the support beam 844 and the electrode 846 can be formed by means of the sidewall beam process. Similar to shutter assembly 800, the shutter assembly 840 can be actuated by a voltage across the contacts 850, causing the shutter 842 to move and obstruct the aperture 848. For shutter assembly 840, however, the compliant beam 844 is comprised of two different materials which are characterized by different stress states, and where the stress states determine, in part, the rest or relaxed position of the beam. In the rest position of shutter assembly 840 the first material on the left, 856 is, on average, in a compressive stress state while the second material on the right, 858 is, on average, in a tensile stress state.

The different stress states imposed by materials 856 and 858 creates the equivalent of a bending moment on the beam 844, causing the beam to bend toward a relaxed position in a direction closer to and even overlapping the aperture 848. The minimum distance to be traversed by the shutter 842 between the open (or rest) position and the closed (or actuated) position is indicated by the marker D3. The distance D3 in shutter assembly 840 is less than the distance D1 in shutter assembly 800.

Comparing the bending positions at rest for the beams in shutter assemblies 820 and 840, the shutter assembly 820 is preferred. This is because, due to the bending stresses carried within the beam 844, the shutter 842 is unable to completely clear the aperture hole 848 in its rest state. The shutter assembly 840 suffers a loss in illumination intensity in its open position compared to the situation in shutter assembly 820.

The voltages required to actuate the shutter assemblies 800, 820, and 840 are directly related to the distances required for actuation. The actuation voltage for shutter assembly 840 will be the least, because as noted above D3<D1<D2. Theoretically, then, the shutter assembly 800 would provide the best combination of a design with a relatively low actuation voltage (compared to shutter assembly 840) wherein the aperture 808 will not be obstructed in the rest state. Unfortunately, the theoretical situation of shutter assembly 800 is difficult to achieve, since a variety of stresses or unbalancing of stresses can and often are imparted to sidewall beams during manufacture, as a result of the beam deposition process. In shutter assembly 820, however, a pair of materials is provided for the beam 824—materials 836 and 838 being disposed on opposite faces of the beam and with a predetermined relation in their stress states. The shutter assembly 820 is an improved design because the direction of movement or bending of beam 824 after release can be predicted based on the predetermined relation between the stress states at the two faces. The rest position of the beam 824 is therefore to a large extent controllable despite other extraneous variations to the stress state in beams that might be imparted during the manufacturing process.

It should be noted that the electrode beams 826 and 846 also possess the same pair of materials employed for their respective support beams, as they were deposited at the same time during a sidewall deposition process. However, the electrode beams are connected and at each end to anchors 832 and 852 respectively. By pinning the beam 826 with two anchors 832, one at each end, the degree of bending or shape change of the electrode 826 can be reduced or eliminated.

FIG. 9 illustrates another transverse shutter assembly 900, which includes a shutter 902, two compliant support beams 904 and 905, an anchor 909, an actuator electrode 906 and an aperture 908. Similar to shutter assembly 800, the support beams 904, 905 and the electrode 906 can be formed by means of the sidewall beam process. Similar to shutter assembly 800, the shutter assembly 900 can be actuated by a voltage across the contacts 910, causing the shutter 902 to move and obstruct the aperture 908.

For shutter assembly 900 the two support beams 904 and 905 are designed as redundant and substantially parallel support beams. The symmetrical design of the beams 904 and 905 helps to ensure that stresses induced during a sidewall manufacturing process do not lead to bending moments which might alter or displace the as-designed rest position for the shutter 902. In one example of a sidewall beam process, the sacrificial mold material (such as mold 703) can be situated in the interstitial space 907 between the beams 904 and 905. If an unbalanced stress distribution is imparted during deposition of the beam 904 attached to one sidewall of the mold, then, a similar and mirror-image stress distribution will be imparted to the beam 905 as it is formed on the opposite sidewall of the same mold. If the beams 904 and 905 are left with mirror-image stress distributions, then the equivalent bending moment experienced at the point where the beams connect to the shutter 902 will be reduced or removed and the shutter will not move substantially after the sacrificial mold is removed.

As a result, the use of substantially parallel support beams with mirror-image stress states provides another method for controlling the rest position of the shutter assembly 900. There is some voltage penalty to the use of parallel support beams, since the bending forces required to move or actuate a cantilevered shutter with parallel support beams are higher than those required of a shutter connected to a single support beam, but at least in shutter assembly 900 the rest position of the shutter can be controlled despite stresses imparted during the manufacturing process.

An Example of Stress Distributions Before and After Release

Numerous techniques are available for controlling the degree and direction of curvature in beams where the bend is in a direction parallel to the substrate (i.e. transverse to an optical axis) by controlling stress distributions in the beams during the sidewall manufacturing process. For the particular case described above, the sacrificial molds for beams 804, 824, and 844 were each drawn with similar shapes in the photomask; for instance with the same straight-line beam shape as shown for beam 804. But the stresses imparted by the use of composite beam materials, such as those employed in beams 824 and 844, caused the beams to move and bend after the sacrificial mold was removed. By advantageously controlling stress distributions within a beam, the rest or relaxed shape of the beam (with no voltage applied) can be different from whatever shape is drawn in the photomask or initially produced after deposition onto the mold.

Figure 10B:
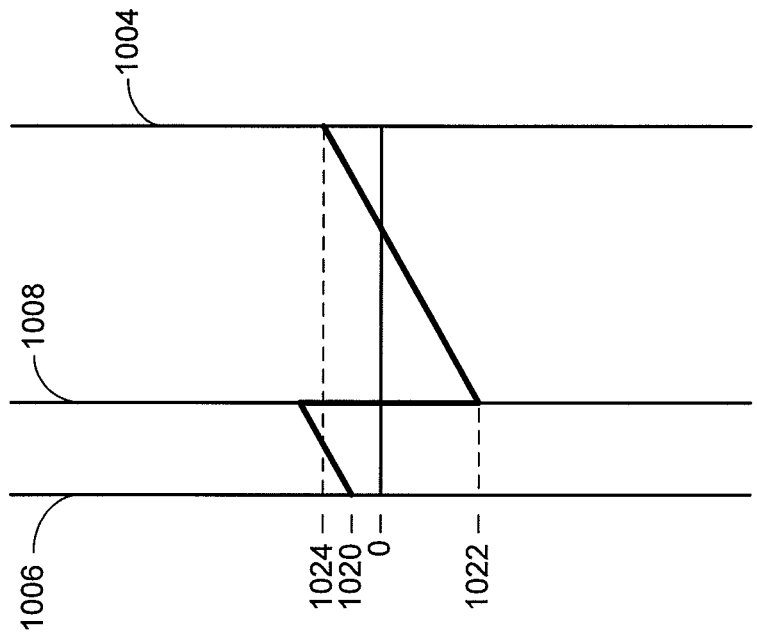
FIGS. 10A and 10B are graphs illustrating the stress distributions within the beams shown FIG. 8B, both before and after release from the mold according to an illustrative embodiment of the invention.
Figure 10A:
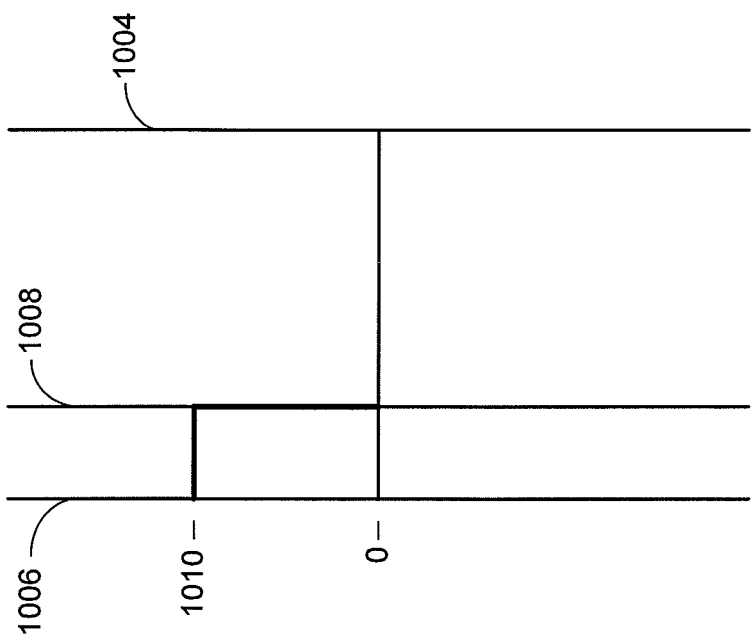

An illustration of how stress is distributed through the composite compliant beam 824, both before and after release from the mold, is given in FIGS. 10A and 10B. FIG. 10A shows the stress distribution 1001 that is imparted to the composite beam 824 after deposition but before the beam is released from the mold. Both FIGS. 10A and 10B are graphs of a scalar stress value (on the vertical axis) versus position through the thickness of the beam (on the horizontal axis). The beam has two faces that are perpendicular to the plane of the substrate. The right face 1004 is directly attached to the sidewall of the mold after deposition, and the left face 1006 is disposed opposite to the mold. For this example, the right face 1004 is also designed as the face closest to the electrode 826 and to the aperture 828. The material 838 is the first material to be deposited onto the mold. It is grown or deposited between the positions 1004 and 1008. The material 836 is the second material to be deposited. It exists between the positions 1008 and 1006. For various implementations the thicknesses of materials 836 and 838 can vary anywhere between 0.01 and 5 microns. The material 838 is deposited in a stress state near zero, while the material 836 is deposited in a state of tension with a predetermined stress value near the level 1010. After deposition, the beam 824 possesses a net average tensile stress (FIG. 10A), a stress state supported in part by tractions at the mold face 1004. The shape of the beam at this point, while it is still rigidly attached to the mold, is straight, similar to the shape of beam 804 in FIG. 8A. The beam does not move as long as it remains rigidly attached to the mold. FIG. 10B shows the stress distribution which results after the sacrificial mold, and the force the mold applied to the beam 824, is removed. After release from the mold, the beam 824 deforms into a relaxed position, adopting its inherent stress state. The rest position can be predicted analytically as the position at which the inherent stress state which has a minimum in strain energy. The relaxed shape of the beam in FIG. 8B has changed from the pre-release shape (which was similar to FIG. 8A), and it has developed a controlled bend that moved the shutter 822 away from the aperture 828. With beams formed from linear elastic materials, in the bent or rest state, the materials within beam 824 develop a linear variation in strain, with compressive strains appearing on the left face and with tensile strains developing on the right face. The linear variation in strain is often accompanied by a linear variation in stress, as is shown in FIG. 10B. The stress at point 1006 is still tensile, but is now at a value 1020, which is less than value 1010. There remains a stress discontinuity at the point 1008. The stress on material 838 varies from a compressive value 1022 at point 1008 to a tensile value 1024 at point 1004. The net stress on material 838 (the integral of stress over position) is now compressive, which balances the tensile stress in material 836. The tensile stress value 1020 is less than the value 1024.

The bending of the beam 824 is initiated by the stress difference imparted to the two faces of the beam after deposition. In FIG. 10A the stress difference is represented by the difference between stress 1010, representing the tensile stress in material 836 and zero, which represents the approximate initial stress state of material 838. After relaxation, as illustrated in FIG. 10B, the stress difference on the two faces is expressed by the difference between stress value 1020 and stress value 1024. The stress values on each of the two faces 1004 and 1006 in FIG. 10B are also substantially different from the average stress states observed between the two faces.

The stress values illustrated in FIGS. 10A and 10B are expressed as scalar values, as if the only significant stresses that vary with position in the beam are uniaxial stresses. This scalar approximation is often usefully applied to long and thin compliant beams. For more complex shapes and/or for shapes with additional boundary constraints (such as intermediate or distributed anchoring) or shapes which are constrained by external forces, a more complete tensor characterization of the stress and strain versus position may be needed in order to explain quantitatively the resulting bend or relaxation in shape. Nevertheless, when a beam is observed to bend or change shape after release from the mold, the bending can still be attributed to an inherent stress state that includes unbalanced uniaxial stress components acting on the beam in a direction tangent to the circumference of the bend.

FIG. 10B illustrates an inherent stress state that includes linear variation in stress within material 838 between the stress values 1022 to 1024. The linear variation in stress versus position is a simplifying approximation. For more complex beam shapes, or where plastic deformation takes place within a beam as a function of material deposition or as a result of beam bending, the variation of stress with position within a beam is unlikely to be linear. For the case when the stress gradients are non-linear, the unbalanced nature of inherent stresses can still result in bending of the beam toward its rest position. The presence of a non-linear inherent stress state still results in differences between stress components that are local to the two faces 1004 and 1006. The inherent stress state also results in differences between stress values located near the faces and near the center or interior of the beam.

The stress distributions in FIGS. 10A and 10B represent only one illustrative example of stress distributions that lead to or provide evidence of shape changes which occur after release from a mold. Many alternative and applicable stress distributions before and after release will be recognized by those skilled in the art. Generally any uniaxial stress distribution which is unbalanced, asymmetrical, anisotropic, or non-linear will lead to or provide evidence of shape changes in the beam.

The bending of the beam 824 is initiated by the stress difference imparted to the two faces of the beam after deposition. A useful value for the stress difference, such as the stress value 1010, which leads to significant bending after release can be any stress difference in excess of 30 Mpa (mega-Pascals). In certain implementations, stress differences between the two faces of a beam in excess of about 400 Mpa are imparted for this purpose. As a result of the beam bending the stress values on the faces will change, but remain as is evident from the differences in stress values 1020 and 1024. A stress difference between the values 1020 and 1024 which is indicative of a beam which has been bent because of an initially anisotropic stress state can be any value in excess of 30 Mpa.

Analytical techniques exist for measuring the stress difference between two faces of a beam, but the techniques can be difficult to apply in every circumstance. In many cases it is easier to establish that a relative difference in strain values exists between two surfaces, as strain is a straightforward measurement of the relative expansion or contraction of a crystal lattice and these strains will be related to the stresses by means of the materials' elastic modulus. A simple test is available, however, to confirm whether a beam has been bent under the influence of anisotropic stresses or stress gradients. A wet chemical etch, a sputtering plasma, or an ion beam can be used to selectively remove material from one of the two surfaces of a narrow compliant beam. If the shape of the original beam was not originally established by the presence of anisotropic stresses or stress gradients, then the shape of the beam will not be altered after the removal of any further material from one of the faces. For the case of a stressed beam, however, such as is illustrated in FIG. 10B, the equilibrium condition for stresses within the beam will no longer be met after the removal of material from one surface and the beam will bend to a new shape representing a new equilibrium. This re-shaping of the beam after an etch process is evidence the existence of anisotropic stresses or stress gradients in the beam.

Numerous techniques are known in the art for creating thin film materials with predetermined stress states. Generally speaking the refractive materials (melting temperatures in excess of 1200 C) are deposited with more substantial states of tensile stress than materials with lower melting points. The metals W, Ta, Nb, Mo, Ti, V, Cr, and Si are examples of metals that are available for deposition into a tensile stress state, commonly with stresses in excess of 100 Mpa. The dielectrics SiO2, Al2O3, and Ta2O5 are examples of dielectric materials that are commonly deposited in a tensile stress state, particularly when deposited by means of sputter deposition. Even the lower melting point materials such as Al, Cu, Ni, Ga, Ge, Ag, and Au can be deposited with significant tensile stress state if measures are taken to reduce the density or increase porosity in the material. The use of fast deposition rates can lead to porosities in excess of 10% and tensile states >30 Mpa. Alternately, if the materials are formed in an environment of excess oxygen, hydrogen, or argon gas the result is a thin film with stress in excess of 30 Mpa.

In an alternate manufacturing process for the shutter assembly 820, the right-hand material 838 can be initially deposited in a compressive stress state while the left-hand material 836 can be deposited with a stress state near zero. The net result would be a relaxed stress distribution similar to that shown in FIG. 10B. A compressive stress sufficient for the purpose of bending a beam can be any stress less than −30 Mpa. (Compressive stresses are generally denoted by negative values.)

Numerous techniques are known in the art for depositing a thin film in a compressive stress state. Plasma atmospheres can be employed for the deposition, or a substrate bias, or an ion emission source can be employed which accelerates ions toward a substrate—the result of which is a thin film in a compressive stress below 30 Mpa. Slower deposition rates can also be employed, particularly in conjunction with a chemical vapor deposition process, to create atomically dense thin films that also demonstrate compressive stresses below 30 Mpa. Dielectric materials such as SiO2, Al2O3, and Ta2O5, when deposited by means of chemical vapor deposition, are often deposited in a compressive stress state. In some implementations a thermal annealing process can be employed to convert a thin film with an initially tensile stress state into a thin film with a significantly compressive stress state. In other implementations a doping or alloy material, preferably a material with a larger atomic radius, can be added to the thin film after deposition in order to create a compressive stress state below 30 Mpa.

In an alternate manufacturing process for the shutter assembly 820, both the left-hand and the right hand materials 836 and 838 can be deposited into either a tensile or a compressive stress state. In order to effect a bending in the desired direction after release, i.e. a bend that carries the shutter 822 away from the aperture 828, it is only necessary that the stress at the face 1004 be less by at least 30 Mpa than the stress at the face 1006, i.e. the face 1004 should be relatively more compressive than the face 1006.

Many deposition processes occur at elevated temperatures. As a consequence, when a two or more layers of different materials are grown, the stack of materials experiences a thermal stress after the substrate is cooled to room temperature. Generally the materials in the stack with greater coefficients of thermal expansion (CTE) will experience a tensile stress on cooldown. The materials with relatively lower CTE will be under compression.

In an alternate manufacturing process for the shutter assembly 820 multiple layers of different materials, i.e. more than 2, can be used for the construction of the compliant beam. Three or more thin film layers of different materials can be employed, including the sandwich structures described above with respect to FIG. 6A. In some cases the thin films employed can be as thin as 100 Angstroms. A predetermined stress differential can be designed for a multiple layer compliant beam merely by adjusting the relative thicknesses of the layers. For instance, the outside layers of a sandwich structure can include similar materials but with differing thicknesses.

In an alternate manufacturing process, the stress differences between the two faces of a compliant beam need not arise discontinuously across an interface, such as the interface at point 1008 between the materials 836 and 838 in beam 824. Instead a more gradual change in the stress properties of a thin film can be imparted as a function of thickness in the thin film. For instance a thin film made from a single or variable chemical composition can be deposited whose stress varies from a relatively compressive state near the mold surface to a relatively tensile state at the opposite surface. For instance, in one embodiment, the deposition rate can be gradually increased during the growth process of a thin film. (Conversely, a gradient from relatively tensile to relatively compressive stress can be achieved by slowing-down a deposition rate.) In alternate embodiments, a stress gradient or stress variation can be imposed on a single thin film through gradual changes in the thin film composition or doping properties, or by changing the flux of an incident ion beam, or by changing the energy density in a plasma as a function of growth time, or by changing the temperature of substrate during deposition.

Stress Compensation Techniques or Designing Mold Shapes for Stress Compensation

In some implementations of the manufacturing processes described above, the differences in stress values between the two faces of the fabricated compliant beams are unavoidable due to the materials, equipment, or processes employed. Such stress differences can arise, for instance, when the atomic density of a thin film which is grown near to a mold interface is different from the density which develops during the later stages of a deposition. Stress differences can also arise due to surface temperature changes on the deposition substrate during deposition. In some cases external design considerations dictate the thin film structure and dominant stress characteristics. For instance, the designer might prefer that a low-melting point or reactive metal be the first material to be deposited for the beams during a sidewall process.

Even in a situation where the sign or magnitude of stresses difference between two faces of a compliant beam is a secondary effect and not an ab initio design consideration, the designer still has options for using stress to his advantage. For instance, the designer can control the motion of a compliant beam in any of two directions by appropriate choice of the mold position and shape.

A beneficial choice in mold position can be illustrated with respect to FIG. 8B and FIGS. 10A and 10B. For the shutter assembly 820, the mold (not shown) was rigidly attached to the right face 1004 of the beam 824 after deposition. The right face, after deposition, had a stress state that was predetermined to be more compressive by at least 30 Mpa as compared to the left face 1006. Therefore the beam 824 bent away from the aperture 828 after release, in a favorable direction.

Let one assume for purposes of illustration, however, that in a particular sidewall manufacturing operation the first material to be deposited is generally more tensile than the last material to be deposited. For the same mold position or shape, then, the beam would be expected to bend toward the aperture, toward the unfavorable position. In this situation, assuming that the sign of the stresses as manufactured are reproducible, the designer can still achieve a favorable position for the beam if the conformation or the shape of the mold is reversed. In an alternative embodiment, the mold can be patterned such that the sidewall on which first growth occurs is located at the position 1006, so that the beam material now grows from left to right instead of from right to left. With such a reversal to the mold pattern, the first material to be grown, in a relatively tensile state, is now created along the edge 1006 (the left side of beam 824) and after release the beam 824 will bend in a favorable direction, i.e. away from the aperture 828 after release.

By reversing the mold shape as described in the above embodiment, (inverted mold, OK) the designer can compensate for stress differences regardless of whether the first material to be grown is in a relatively tensile or relatively compressive stress state. This technique is useful in cases where the sign of the stress difference as given by the manufacturing process is reproducible but the magnitude is not.

A more refined or quantitative method of stress compensation is possible where the magnitude of stresses imparted to the two surfaces is also reproducible and controllable. If the magnitude of the residual stresses can be predicted to within an accuracy of +/−100 Mpa, or preferably within an accuracy of +/−30 Mpa, then it is possible to predict and control with some precision the final rest position of a compliant beam after release. In one alternative embodiment of the invention the designer includes pre-compensating curvature to the mold. (Pre-curve)

For instance, if the statistical data is available showing that the beam 824 will tend to move to the left and away from aperture 828 by for example 12+/−3 microns, then it is possible to design the beam on the mold with a compensating curvature. For instance, in this alternative embodiment the mold can be designed such that the beam before release has a shape that looks similar to the rest shape of beam 844, i.e. where in its initial (before release) position the shutter 822 actually occludes as much as 9 microns of the aperture 828. Then, after release, all of the beams (or perhaps > than 99.99% of them) will relax and move to the left completely uncovering the aperture. The final rest position might look approximately straight, i.e. similar to the shape of the beam 804. By employing statistical data on beam motion after release along with a compensating curvature, the distance D2 can be kept to a minimum with only a small probability that the aperture 828 will be occluded. Average actuation voltages can thereby be decreased.

In a converse example, if it is known that the beam 804 will tend to move toward the right after release by for example 12+/−3 microns, then it is possible to design the beam on the mold with a curved shape that looks more similar to the rest position of curved beam 824, i.e. with an initial position where the shutter 804 is actually curved away by a safety margin of 15 microns from the aperture 828. Then, after release of the beam 804, all of the beams (or perhaps > than 99.99% of them) will relax and move to the right. The beam 804 in its final rest position will look approximately straight, as shown in FIG. 8A. Only an acceptably small percentage of the beams (perhaps <0.01% of them) would move to the right so far that they would occlude the apertures 808. The straight shape of beam 804 will tend toward a lower actuation voltage that that of beam 824 as illustrated in FIG. 8B.

Stopping Structures

Judicious choice of mold shape is be useful in determining the direction of beam bending after release. Further control over the degree of shape change in a support beam can be realized by means of stopping structures. An example is shown in FIG. 11, which depicts a shutter assembly 1100 according to an illustrative embodiment of the invention. The shutter assembly 1100 comprises an shutter 1102, a support beam 1104, an actuator electrode 1106, an aperture 1108, and an anchor 1109. The shutter assembly 1100 also includes a stop 1114. Although the mold for support beam 1104 was designed with a straight-line shape for the support beam 1104, the stresses imparted during beam manufacturing tend to cause a bend toward the left and away from the aperture 1108. It is advantageous, however, to prevent unnecessary or excessive bending within the beam 1104 and thereby to reduce the voltage required for actuation. The stopping structure 1114 limits the position or the deformation of the support beam 1104 in its relaxed state after removal of the sacrificial mold.

Beneficial Bend, Non-Sidewall Structures

It is not necessary that a compliant beam be formed using the sidewall technique of FIGS. 7A-7D in order to benefit from the techniques of stress control in compliant beams. The U.S. patent application Ser. No. 11/361,785 describes several alternate methods for producing thin and compliant beams without sidewall deposition. In many of these alternate methods there is no direct method for introducing or predetermining a stress difference between the two faces of the beam, and therefore many of the beam shaping techniques described above are unavailable. Additional means for stress control are available, however, and is illustrated in FIGS. 12A and 12B.

Figure 12B:
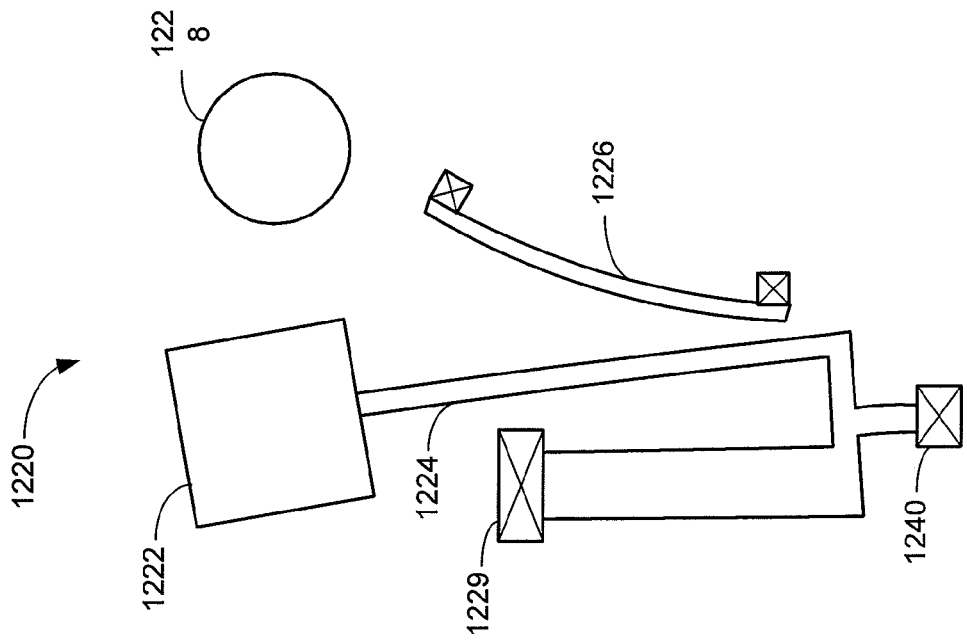
FIGS. 12A and 12B are plan views of a shutter assembly, including stress-induced deformations, which do not require the sidewall manufacturing technique described with respect to FIG. 7A-7D. The Figures show the shape of the beams both before and after release from the mold, according to an illustrative embodiment of the invention.
Figure 12A:
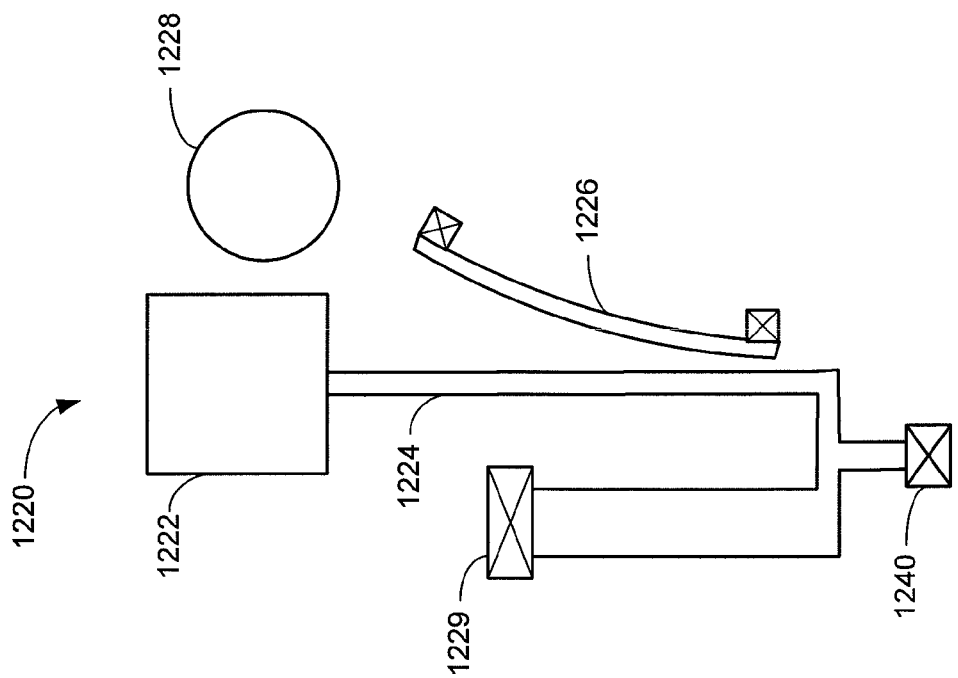

FIG. 12A illustrates a transverse shutter assembly 1220 before release from a mold and FIG. 12B illustrates the same shutter assembly after release from the mold. The shutter assembly 1220 includes a shutter 1222, and a compliant support beam 1224, an anchor 1229, and an actuator electrode 1226 and an aperture 1228. The beam 1224 is connected to a second anchor 1240 which is attached at a point along the beam between the anchor 1229 and the shutter 1222. Except at the positions of the two anchors 1229 and 1240, the bottom surface of beam 1224 is not connected to the substrate and free to move after release from the mold. The materials and deposition technique for the beam 1224 have been chosen or predetermined to leave the beam in a uniform state of compressive stress before release from the mold. A uniform state of compressive stress can be defined as a state where the average or net stress across the thickness of the beam is negative and, optionally, where there is no significant difference in the stress state between the two faces of the beam that lie perpendicular to the substrate surface.

FIG. 12B illustrates the relaxed shape or rest position of the beam 1224 and shutter 1222 after release from the mold. The beam 1224 has tilted away from the aperture 1228. This motion has occurred in response to a relaxation of the compressive stress that was stored in the beam before release. After release the beam relaxes by developing a positive strain, i.e. the beam becomes longer so that the stress state is partially relaxed. The lengthening of the beam, however, is constrained by the anchor 1240. As a result the beam develops a bending moment about the axis of the anchor 1240 and the shutter 1222 has moved away from the aperture 1228. A torsional stress is developed within the anchor 1240.

Stress Control in Dual Compliant Actuators

Figure 13A:
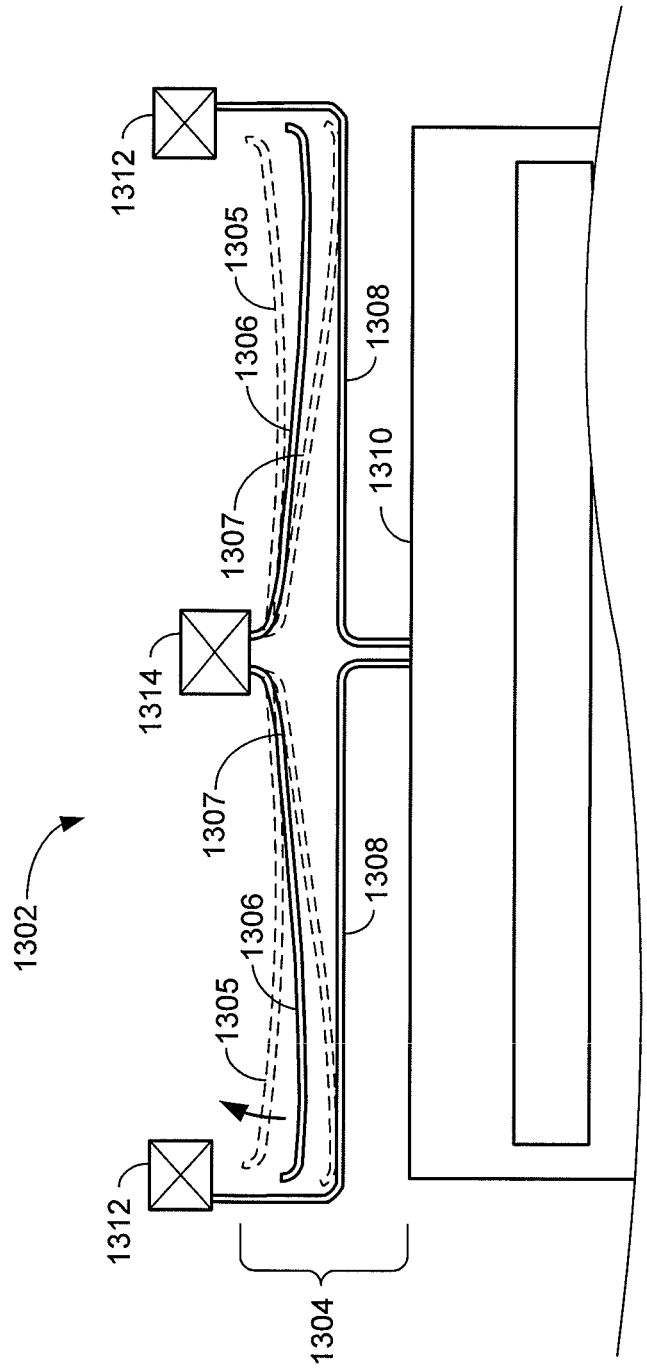
FIG. 13A is a partial plan view of a shutter assembly similar to the shutter assembly shown in FIG. 4, showing the effects of inherent stress on the shape of the drive beams, according to an illustrative embodiment of the invention.

FIG. 13A illustrates a portion of a shutter assembly 1302 including dual compliant actuators 1304 which are functionally similar to the actuators 404 designed within the shutter assembly 400. The narrow beams within actuators 1304 have been manufactured using a sidewall beam process as described with respect to FIGS. 7A-7D. The stresses imparted during the sidewall beam processing lead to shape changes in the narrow beams after release from the mold, as illustrated by the comparing the alternate shapes of drive beams 1305, 1306, and 1307. The actuators 1304 include nominal or as-designed drive beams 1306 along with a compliant load beam 1308. The load beams 1308 support the shutter 1310 on one end and are each attached to a load beam anchor 1312 at the other end. Both of the as-designed drive beams 1306 are attached to the drive beam anchor 1314 at one end while the other end is free to move.

Exemplary anchors 1312 and 1314 are described in U.S. Provisional Application No. 61/108,783 filed Oct. 27, 2008, the entirety of which is incorporated by reference.

Because of stresses imparted onto the compliant beams, the relaxed shape of the drive beams can differ from the as-designed shape, such as shape 1306, provided on the mold during processing. In some instances the stressed drive beams will bend away from the load beams 1308, as is illustrated by beams 1305, and in other instances the stressed drive beams can bend toward the load beams 1308 as is illustrated by beams 1307. In many processes, including the sidewall process described with respect to FIGS. 7A-7D, an encapsulating dielectric is deposited on the surfaces of the beams 1306 or 1308, although the dielectric is often not added until after the sacrificial mold has been removed. In the case, however, where the drive beam 1307 bends toward and touches the load beam as part of the release step, the encapsulating dielectric would be added too late in the process, since the residual stresses in the beams will have already brought the two beams into contact. This situation is preferably avoided since contact between uncoated actuator beams can lead to a short circuit and a non-operational shutter assembly.

For the case, illustrated by stressed drive beam 1305, where the beam 1305 is curved away from the load beam 1308 the voltage required to initiate actuation will be unfavorably increased.

The designer seeks a situation where the drive beam 1306 approaches the load beam 1308 in its relaxed state as closely as possible, within the capabilities of the manufacturing process, while avoiding the situation where the drive beam 1306 actually touches the load beam 1308. For the ideal case where no residual stresses are present and the beams do not change shape after release (cf the as-designed shape of beam 1306) the gap or distance of closest approach between the beams will be determined by the resolution capability of lithography equipment used in the manufacturing process. For the case wherein stresses lead to beam deformation, a number of methods for managing the gap or separation between beams are available as will be described in the succeeding examples.

Figure 13B:
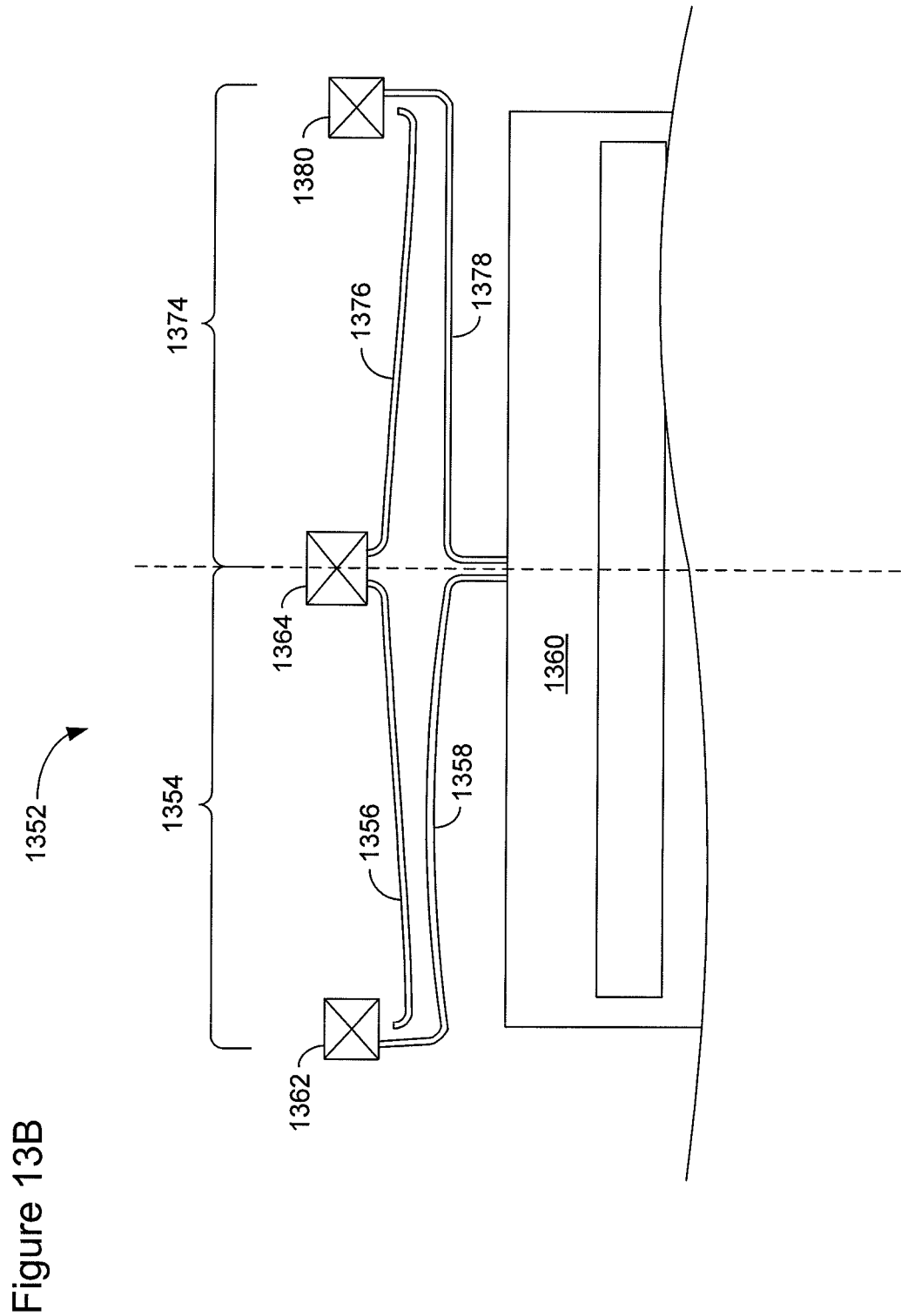
FIG. 13B is a partial plan view of a shutter assembly similar to the shutter assembly shown in FIG. 4, showing the effects of inherent stress on the shape of the load beams, according to an illustrative embodiment of the invention.

FIG. 13B presents a portion of a shutter assembly 1352 which illustrates the difference between two dual compliant actuators 1354 and 1374, which are functionally similar to the actuators 404. The narrow beams within actuators 1354 and 1374 have been manufactured using a sidewall beam process described above. The stresses imparted during the sidewall beam processing have led to shape changes in the narrow beams. The shape changes can be noted by comparing the shape of the beams in actuators 1354 and 1374, to the left and the right of the dotted line. The shape of the load beam 1378 represents a nominal or as-designed load beam which connects the shutter 1360 to the anchor 1380. The shape of the beam 1358 represents the desired rest shape for the load beam within actuator 1354. The rest shape of the beam 1358 is formed by stresses within the beam after release from the mold. Both of the as-designed drive beams 1356 and 1376 are attached to the drive beam anchor 1364 at one end while the other end is free to move.

The nominal shape of beam 1378, which is the shape imparted to the beam while it is still attached to the mold, consists of 3 nominally straight sections which are rotated by about 90 degrees from each other. After release and relaxation, however, as illustrated by beam 1358, the nominally straight sections become curved and the orientations of the three sections become substantially greater or less than 90 degrees from each other. The shape changes illustrated by comparing beams 1358 and 1378 can be created by any of the stress distributions described with respect to FIG. 10.

The relaxed and curved load beam 1358 is relatively more parallel to the drive beam 1356 when compared to the pair of beams 1378 and 1376. The distance of closest approach between the beams 1356 and 1358 is also closer than that shown for the as-designed beams 1378 and 1376, and closer than a distance allowed by the resolution capability of lithography equipment. The design of the beams 1356 and 1358 in their rest position makes it possible to design for a separation between the beams that is no more than a predetermined distance. As a consequence the actuation voltage within actuator 1354 is less than that for actuator 1374.

The stresses have induced a curvature in the beam 1358 that did not exist while the beam was attached to the mold. Similar beneficial shape changes can occur in any stressed beam which is free to move or bend while suspended between two rigid structures, such as between the anchor 1362 and the shutter 1360, or for beams suspended between two anchoring points. If the stresses imparted to the beams in manufacturing are predictable and reproducible, then a compensating shape or curvature can be designed into the mold so that after release the beam 1358 will bend or curve into the desired shape.

By designing particular shapes in the mold, the designer can compensate for stresses which are inherent in a compliant beam, as was described above under the section titled "Stress Compensation Techniques". For instance, to a large degree the separation between the beams 1358 and 1356 can be optimized through variations in the shape of the sacrificial mold. It is also possible to alter the direction of the curvature in a beam after release by choosing an alternate or reversed shape for the sacrificial mold. For instance in a first mold shape a gap, a trench, or an open space can be formed in the space in between the sidewalls, on which will be formed the beams 1356 and 1358. For this first or normal mold shape the beams 1356 and 1358 might be expected to bend toward each other after release from the mold. An alternative design is possible, employing a second mold shape, wherein the mold is continuous or solid in the space between the sidewalls which will be used to form the beams 1356 and 1358. (The trenches or open spaces for this second mold would be placed in spaces to the outside of the beams 1356 and 1358.) For this second or inverted mold shape, the beams 1356 and 1358 might be expected to bend away from each other after release from the mold.

Dual Anchors

Figure 14:
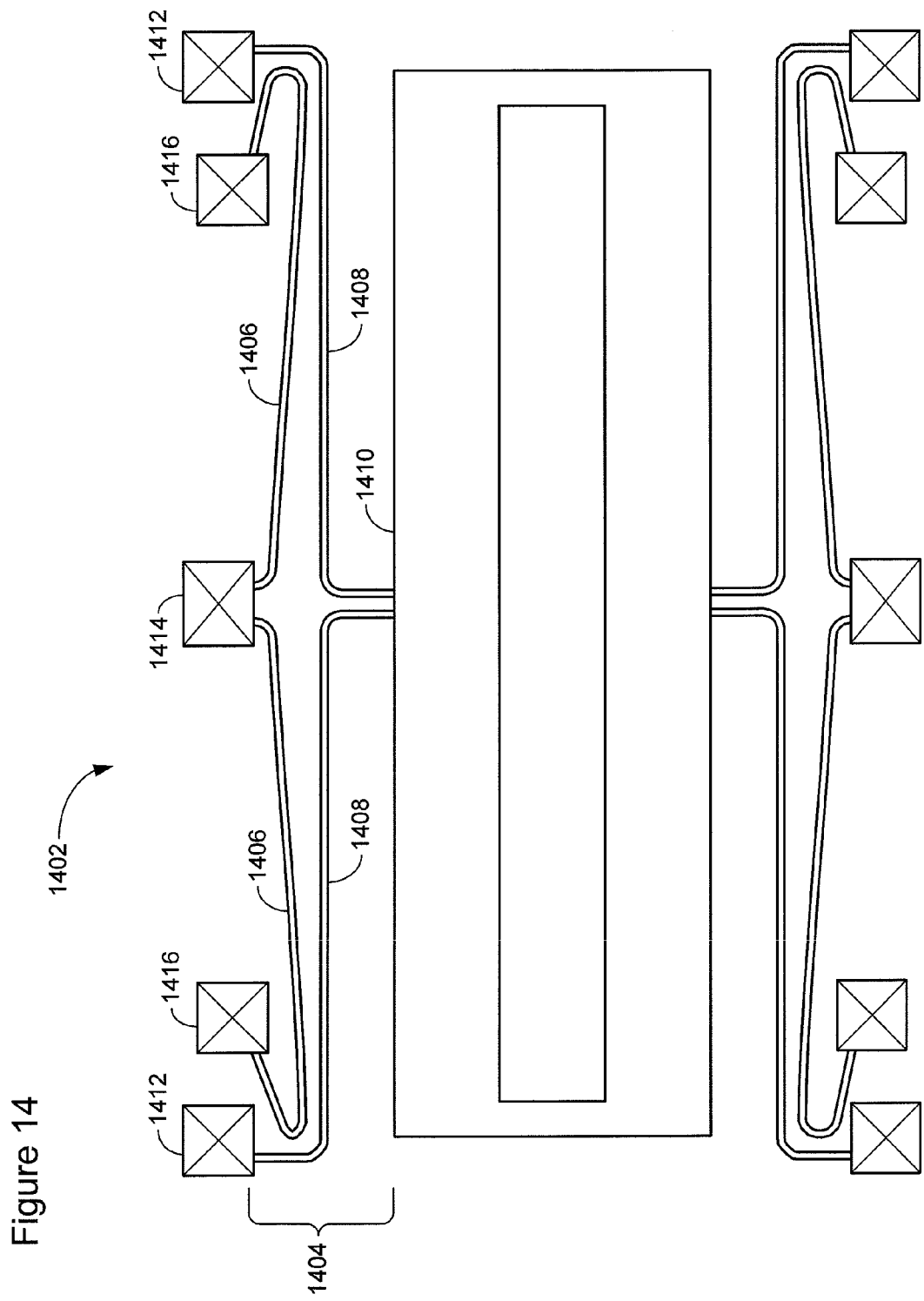
FIG. 14 is a plan view of a shutter assembly which includes dual anchors on the drive beams, according to an illustrative embodiment of the invention.

FIG. 14 illustrates a portion of a shutter assembly 1402 including dual compliant actuators 1404 which are functionally similar to the actuators 404 designed for the shutter assembly 400 according to an illustrative embodiment of the invention. The actuators 1404 include drive beams 1406 along with compliant load beams 1408. The load beams 1408 support the shutter 1410 on one end and are each attached to a load beam anchor 1412 at the other end. Both of the drive beams 1406 are attached to a central drive beam anchor 1414 at one end and attached to supplementary drive beam anchors 1416 at the other end.

The supplementary drive beam anchors 1416 act to limit the deformation or shape change which might otherwise occur within the drive beams 1406. A mechanical beam, such as beam 1406, which is fixed, supported, or anchored at two points along its length will more easily retain its shape even under the influence of residual stresses or external loads. Note that the drive beam 1406 is still free to move or deform at points in between the anchors 1414 and 1416 and therefore partially compliant, so that the actuation voltage of the actuators 1404 is still less than would be the case with a completely rigid drive beam.

Looped Beams

Figure 15:
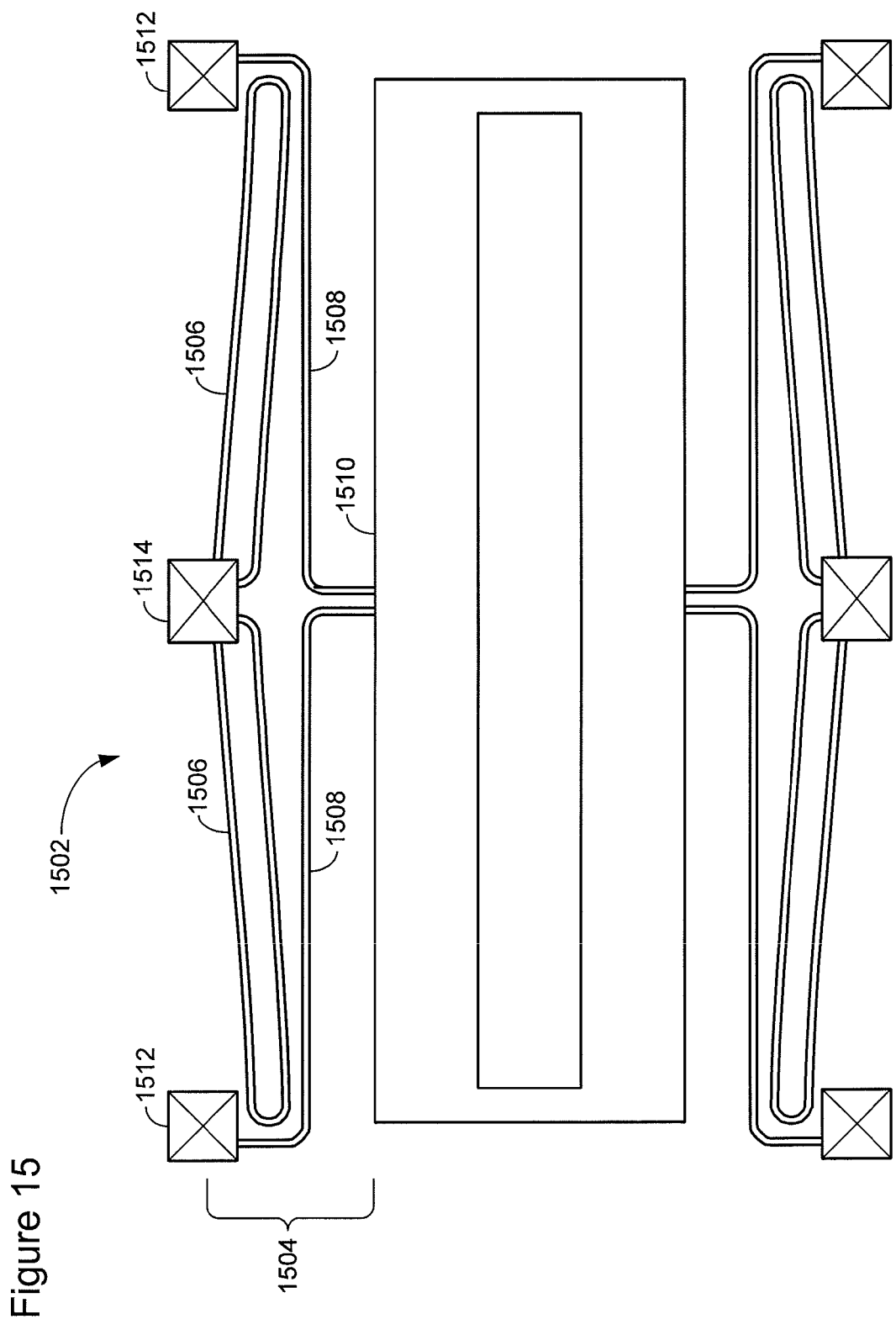
FIG. 15 is a plan view of a shutter assembly which includes a drive beam formed into a loop which is attached to a single anchor, according to an illustrative embodiment of the invention.

FIG. 15 illustrates a portion of a shutter assembly 1502 including dual compliant actuators 1504 which are functionally similar to the actuators 404 designed for the shutter assembly 400 according to an illustrative embodiment of the invention. The actuators 1504 include compliant drive beams 1506 along with compliant load beams 1508. The load beams 1508 support the shutter 1510 on one end and are each attached to a load beam anchor 1512 at the other end. The drive beams 1506 are formed into a loop wherein each end of the drive beam is attached to a common anchor 1514. Along the loop there is a section of outgoing beam which is substantially parallel to a returning section of the same beam. The lengths of these two loop sections are equal. When formed in a sidewall beam process, the stresses which would tend to deform the outgoing section of the looped drive beam 1506 will mirror or oppose the stresses along the returning section of beam. The forces which would otherwise cause the drive beam to bend or move from its designed position are therefore substantially cancelled, and the distal position of the looped drive beam 1506 does not move after removal from the mold.

Partial or Asymmetrical Looped Beams

Figure 16A:
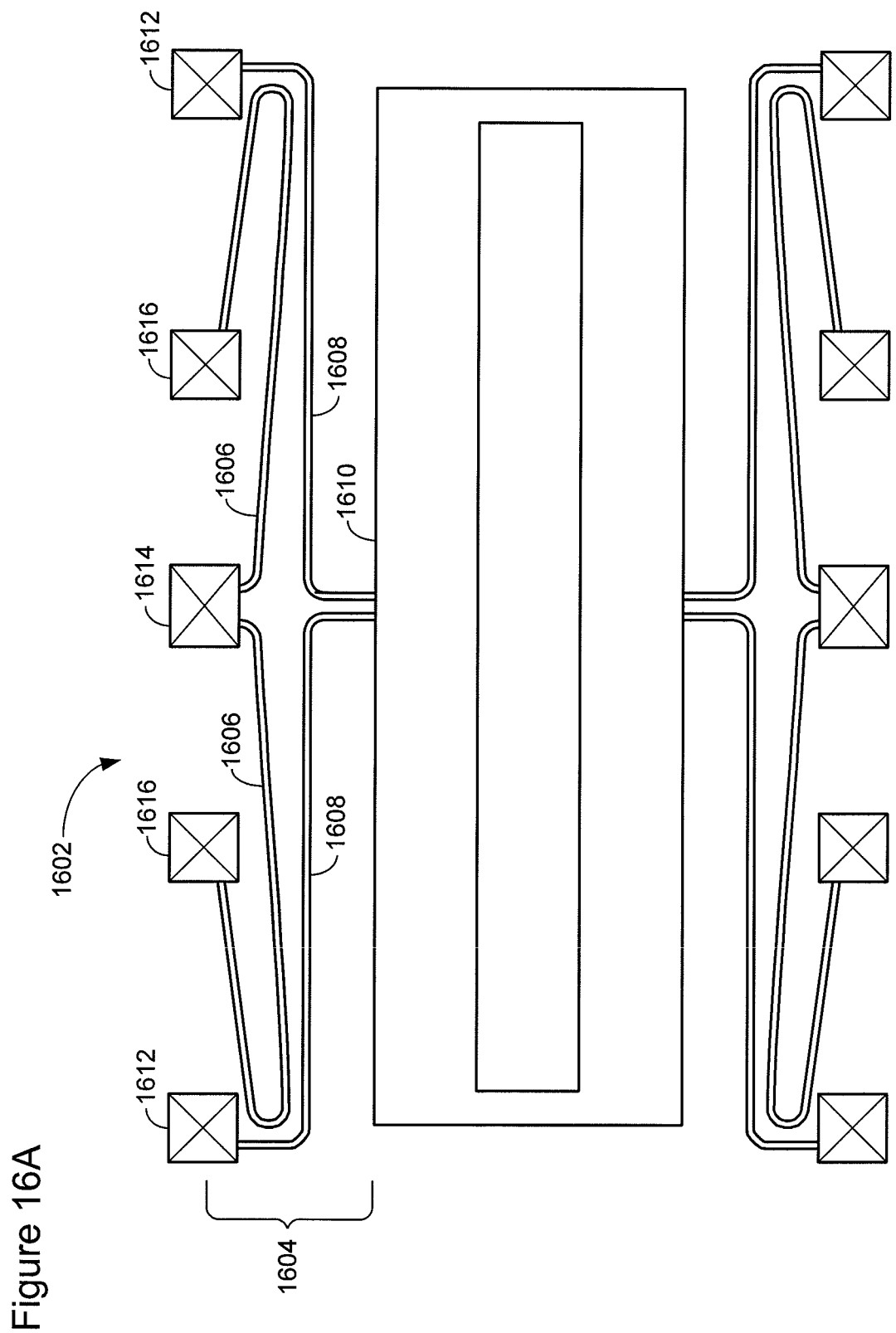
FIGS. 16A and 16B are plan views of shutter assemblies which include looped or partial-looped drive beams, according to an illustrative embodiment of the invention.

FIG. 16A illustrates a portion of a shutter assembly 1602 including dual compliant actuators 1604 which are functionally similar to the actuators 404 designed for the shutter assembly 400 according to an illustrative embodiment of the invention. The actuators 1604 include compliant drive beams 1606 along with compliant load beams 1608. The load beams 1608 support the shutter 1610 on one end and are attached to a load beam anchor 1612 at the other end. Both of the drive beams 1606 are attached to a central drive beam anchor 1614 at one end and attached to supplementary drive beam anchors 1616 at the other end.

The supplementary drive beam anchors 1616 are positioned and the drive beams 1606 are shaped so as to form partial loops. Along each loop there is a section of beam which extends out from the central anchor 1614 which is substantially parallel to a returning section of the same beam before it is attached to the supplementary anchor 1616. The lengths of these two straight line sections in the loop are not equal. This asymmetry in shape provides the opportunity to create or allow for an advantageous shape change in the loop after release from the mold. Either because of residual stresses, or because of a length change (shrinkage or expansion) along the drive beam 1606, the forces experienced at the distal end of the loop can cause it to move in a direction parallel to the substrate on which the shutter assembly 1602 is formed. Because of the stiffness created by the dual anchors 1614 and 1616, however, the motion of the distal end will not be nearly so severe as those experienced by the cantilevered drive beams 1305 or 1307 illustrated in FIG. 13A. A small or controlled motion of the distal end of drive beam 1606 after release from the mold and in a direction toward the load beam 1608 can thereby be promoted. By providing this asymmetrical shape to the compliant beam 1606 it is possible to design for a separation between beams 1608 and 1606 in their rest position that is no more than or no less than a predetermined distance. The bending into the rest position can be accomplished with a reduced risk that the drive beam 1606 and the load beam 1608 will touch before an encapsulating dielectric is applied.

Figure 16B:
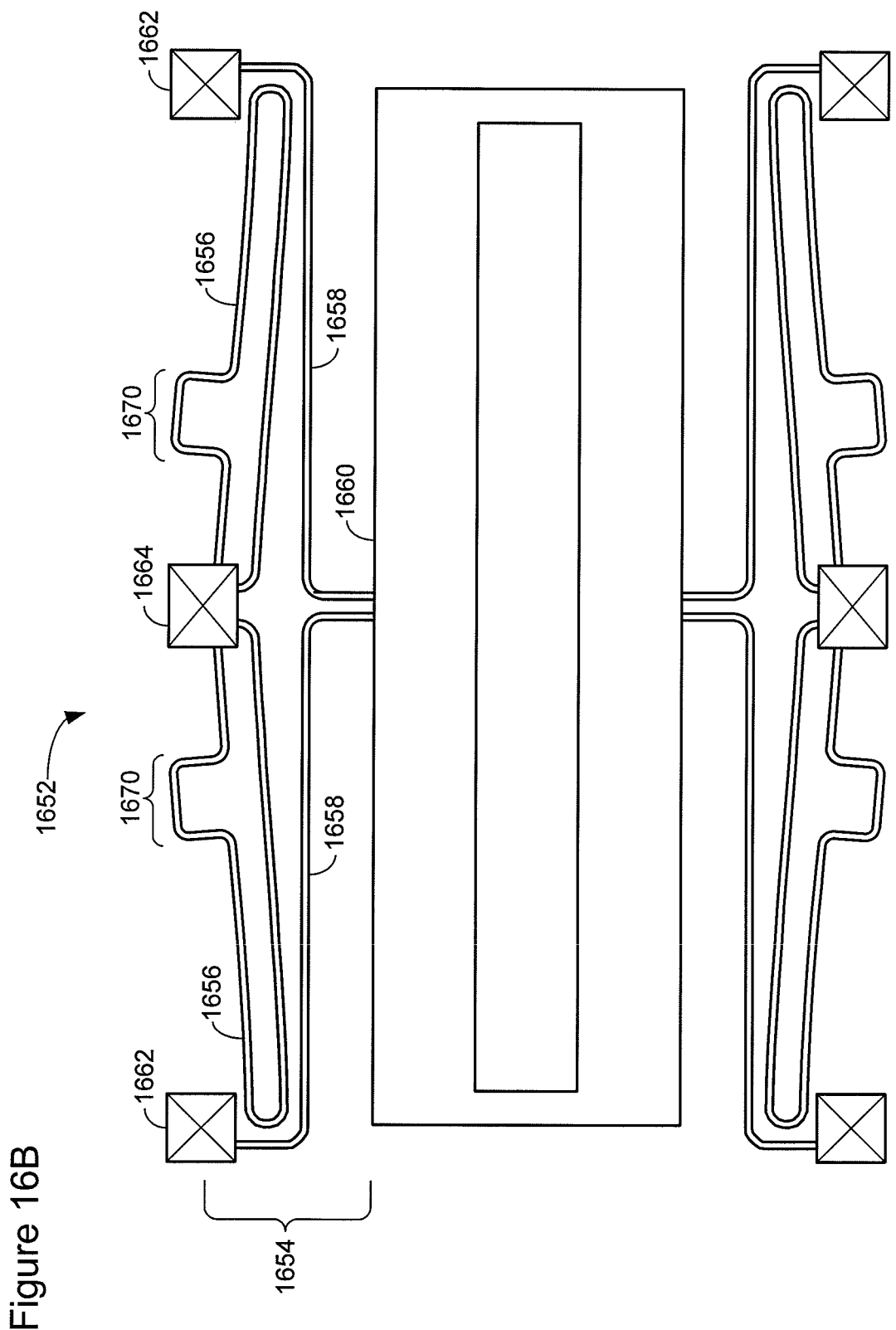

FIG. 16B provides another example of a beam designed with an asymmetrical shape such that the beam will deform into a desired direction, according to an illustrative embodiment of the invention. FIG. 16B illustrates a portion of a shutter assembly 1652 including dual compliant actuators 1654 which are functionally similar to the actuators 404 designed for the shutter assembly 400 according to an illustrative embodiment of the invention. The actuators 1654 include compliant drive beams 1656 along with compliant load beams 1658. The load beams 1658 support the shutter 1660 on one end and are each attached to a load beam anchor 1662 at the other end. Both of the drive beams 1656 are attached to a central drive beam anchor 1664. The drive beams 1656 are each formed into a loop wherein each end of the loop is attached to a common anchor 1664. Along the loop there is a section of outgoing beam which is substantially parallel to a returning section of the same beam.

In contrast to the shape of loop 1506, the lengths of the sides of the drive beam loop 1656 are not equal. One side of the loop 1656 is in fact provided with an additional set of corners or bends at areas 1670 (the "elongating portion") such that the two sides of loop 1656 have substantially different lengths. The elongating portion 1670 of the compliant beam 1656 can in addition to taking the form of a simple secondary loop as depicted in FIG. 16B, be designed with a variety of meandering shapes, such as an s-curve or a zig-zag.

The elongating portion 1670 of the compliant beam 1656 provides an asymmetry to the shape of compliant beam 1656 such that, upon release from the mold, the beam 1656 will bend or deform into a desired direction. The motion will be driven by residual stresses in the beams. The desired direction of movement may be such that, after release from the mold, the separation between beams 1656 and 1658 is decreased from what was allowed by the resolution capability of lithography equipment. A separation between beams 1658 and 1656 in their rest position can thereby be provided that is no more than or no less than a predetermined distance.

Actuator Beam Stops

Figure 17:
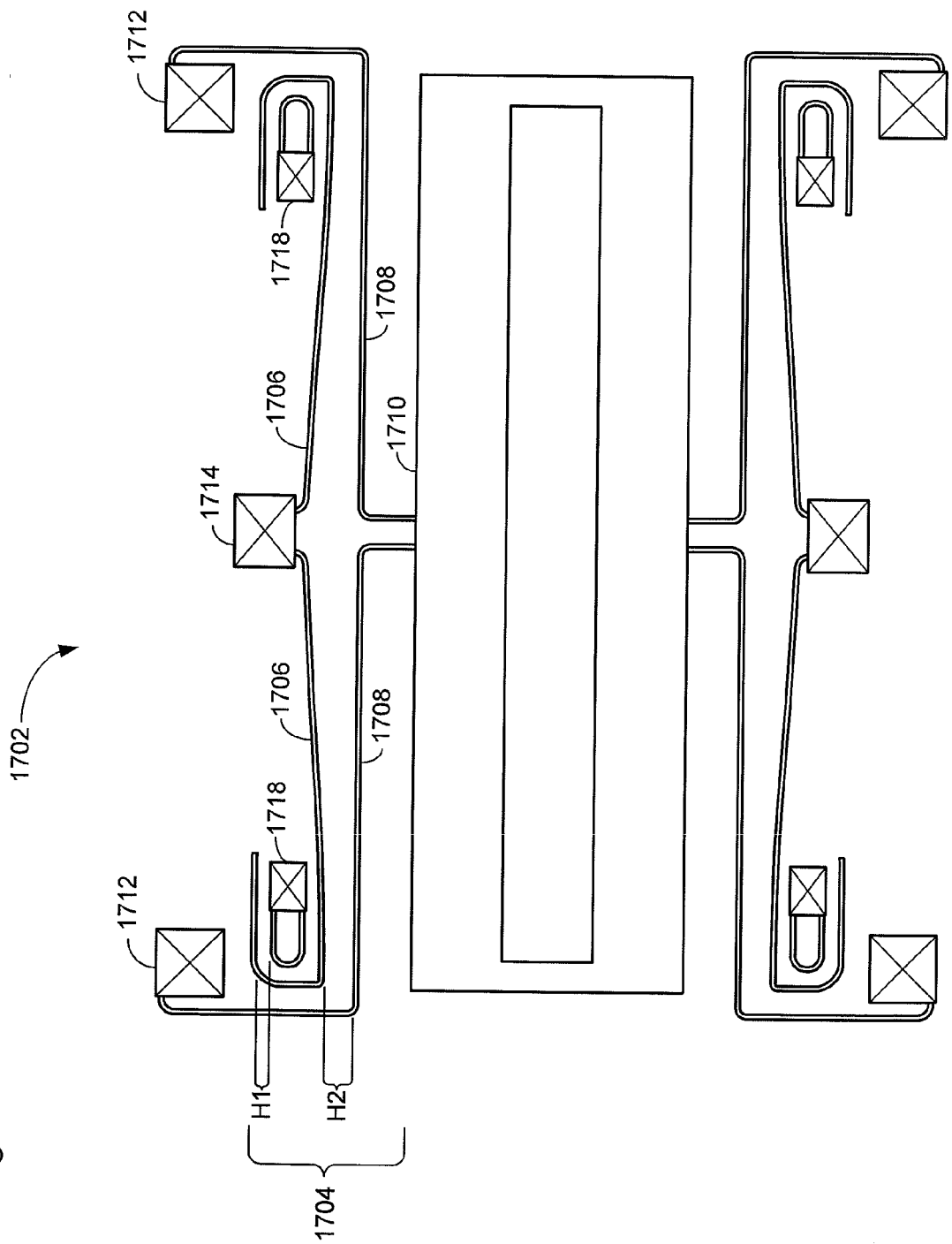
FIG. 17 is a plan view of a shutter assembly which includes a stopping structure which limits the deformation of the drive beam, according to an illustrative embodiment of the invention.

FIG. 17 illustrates a portion of a shutter assembly 1702 including dual compliant actuators 1704 which are functionally similar to the actuators 404 designed for the shutter assembly 400 according to an illustrative embodiment of the invention. The actuators 1704 include compliant drive beams 1706 along with compliant load beams 1708. The load beams 1708 support the shutter 1710 on one end and are each attached to a load beam anchor 1712 at the other end. The drive beams 1706 are provided as cantilever beams, meaning that the drive beams 1706 are attached to a drive beam anchor 1714 at one end while the other end is free to move. Additionally, each of the actuators 1704 includes a drive beam stop 1718.

The drive beam stop 1718 is positioned and configured to limit and control the motion or deformation of the drive beam 1706. The as-designed shape of the drive beam 1706 (which can differ from the relaxed shape after release from the mold), includes a gap or distance H1 between the drive beam 1706 and the stop 1718 which is less than the gap or distance H2 between the drive beam 1706 and the load beam 1708. Therefore, even though the drive beam 1706 may deform after release and bend toward the load beam 1708, its motion will be limited by the presence of the stop 1718 such that in the non-actuated and relaxed state the drive beam 1706 and the load beam 1708 cannot touch. Significantly in this fashion, it is possible to create a gap or separation between the drive beam 1706 and the load beam 1708, in their relaxed state, which is greater than zero but substantially less than the resolution limits allowed by the lithography equipment employed in the manufacturing. Note also that in the actuator 1704 the load anchor 1712 is positioned and the load beam 1708 is designed to provide the shape of a partial loop. This partial loop provides more compliance to the load beam 1708 than that which is found in load beams 1508 or 1608. With this extra compliance, it is easier for the load beam 1708 to approach the drive beam 1706 during actuation, even while the motion of the drive beam 1706 is limited by the presence of the stop 1718.

Figures 18A, 18B:
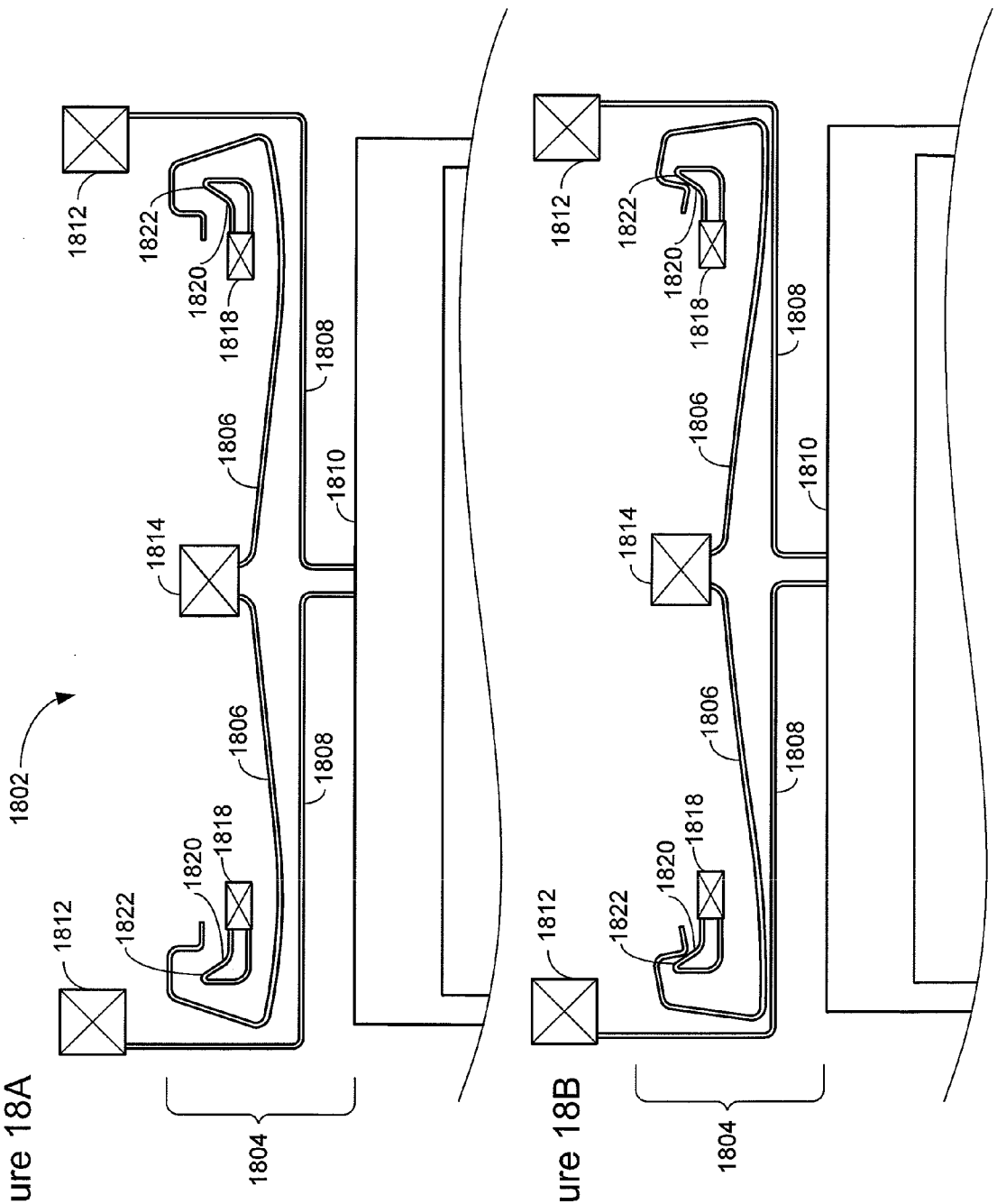
FIGS. 18A and B are plan views of a shutter assembly which includes an alternative stopping structure which limits the deformation of the drive beam, according to an illustrative embodiment of the invention.

FIGS. 18A and 18B illustrates a portion of a shutter assembly 1802 including dual compliant actuators 1804 which are functionally similar to the actuators 404 designed for the shutter assembly 400 according to an illustrative embodiment of the invention. The actuators 1804 include compliant drive beams 1806 along with compliant load beams 1808. The load beams 1808 support the shutter 1810 on one end and are each attached to a load beam anchor 1812 at the other end. The drive beams 1806 are provided as cantilever beams, meaning that the drive beams 1806 are attached to a drive beam anchor 1814 at one end while the other end is free to move. Additionally, each of the actuators 1804 includes a drive beam stop 1818.

The drive beam 1806 and the drive beam stop 1818 are designed for more precise control over the rest position of the drive beam 1806 after release from the mold. FIG. 18A shows the actuators 1804 in their as-designed shape, i.e. it shows the shape of the beams before release from the mold. FIG. 18B shows the actuators 1804 from the same shutter assembly 1802 after release, or in their desired rest position. Because of residual stresses the drive beam 1806 bends or deforms after release from the mold. Similar to the motion expected for the drive beam 1706, the drive beam 1806 moves towards the load beam 1808 so as to minimize distance of separation between the beams 1806 and 1808. The drive beam stop 1818 prevents the drive beam 1806 from touching the load beam 1808.

The advanced design of the actuator 1804 allows for more precision in determining the rest position of the beams, such that at rest the final separation between the beams 1806 an 1808 can be held to no more than or no less than a predetermined distance. This precision is be achieved despite variations in the residual stress in the drive beam 1806 due to manufacturing variations. The precision is achieved in part by providing a compensating shape to the drive beam in its as-designed shape, as is illustrated in FIG. 18A. And the precision is achieved in part through provision of a sliding contact between the end of the drive beam 1806 and the drive beam stop 1818.

The sliding contact between the beam 1806 and the stop 1818 helps to maintain a particular separation distance between the beams 1806 and 1808, despite variations in residual stress. Two contact positions 1820 and 1822 are illustrated in FIG. 18B. In cases where the beam 1806 contains a smaller amount of residual stress, the beam might contact the stop at contact position 1820. In cases where the beam 1806 contains a greater amount of residual stress, the beam might make contact and/or slide along the beam stop 1818 after release, until coming to rest at a point further out on the beam stop, for instance near contact point 1822. The beam 1806 and the stop 1818 are shaped such that, in cases where a greater stress induces a greater amount of bending, the further bending will be concentrated near the end of the beam 1806, near its contact with the stop 1818. In this manner the shape and position of the beam 1806 near its closest approach to the load beam 1808 remains largely unchanged from a desired or predetermined position, even in cases where the beams have different intrinsic stress levels. The control is made possible in part by designing the contact surface at stop 1818 as a sliding surface, which allows for a plurality of contact positions.

While the concepts highlighted in FIGS. 6 through 18 have been described in relation to the design of shutter-based light modulators, other types of mechanically actuated light modulators will also benefit from the management of stresses and stress-related deformations in compliant beams. Similar stress management techniques can be applied to the roller-based light modulator 220, to the light tap 250, and to other MEMS-based light modulators such as interference modulators or micro-mirror devices. Any light modulator with a moveable element designed to tilt, translate, or rotate will benefit from the principles of this invention.

The invention may be embodied in other specific forms without departing from the spirit or essential characteristics thereof. The forgoing embodiments are therefore to be considered in all respects illustrative, rather than limiting of the invention.

What is claimed is:

1. A spatial light modulator comprising:
   a substrate having a surface; and
   a modulation assembly coupled to the substrate including a modulation element and a compliant beam;
   wherein the modulation assembly is configured such that the compliant beam has first and second ends and is coupled to the substrate at a first anchor, and
   wherein the modulation assembly is configured such that the compliant beam is shaped to extend away from the first anchor from the first end and curve back towards the first anchor towards the second end.

2. The spatial light modulator of claim 1, wherein the modulation assembly is configured such that the compliant beam is coupled to the first anchor at the first end.

3. The spatial light modulator of claim 1, comprising a second anchor, and wherein the modulation assembly is configured such that the compliant beam is further coupled to the substrate at the second anchor.

4. The spatial light modulator of claim 1, wherein the modulation assembly is configured such that the second end couples to the first anchor, and the shape of the compliant beam forms a loop.

5. The spatial light modulator of claim 4, wherein the loop comprises a first loop portion extending away from the first anchor and a second loop portion returning to the first anchor, wherein the length of the first loop portion is substantially greater than the length of the second loop portion.

6. The spatial light modulator of claim 4, wherein the loop comprises a first loop portion extending away from the first anchor and a second loop portion returning to the first anchor, wherein at least one of the first loop portion and the second loop portion includes a secondary loop.

7. The spatial light modulator of claim 1, wherein the modulation assembly comprises a second compliant beam, and wherein the modulation assembly is configured such that both the compliant beam and the second compliant beam attach to the modulation element.

8. The spatial light modulator of claim 1, wherein the modulation assembly comprises a stationary structure that is not coupled to the compliant beam, and wherein the modulation assembly is configured such that the stationary structure limits the bending of the compliant beam.

9. The spatial light modulator of claim 8, wherein the stationary structure comprises a sliding surface.

10. The spatial light modulator of claim 1, wherein the modulation assembly is configured to limit bending of the compliant beam that would otherwise be caused by inherent stresses within the compliant beam.

11. The spatial light modulator of claim 10, wherein the limitation of bending yields an intended beam rest position.

12. The spatial light modulator of claim 10, comprising a plurality of attachment points coupling the compliant beam to the substrate at positions on the compliant beam, wherein the positions are selected to promote the limiting of the bending of the compliant beam.

13. The spatial light modulator of claim 10, wherein the compliant beam comprises first and second beam materials coupled to one another, and wherein the first beam material has a first stress state, and the second beam material has a second, different stress state.

14. A spatial light modulator comprising:
   a substrate having a surface; and
   a modulation assembly coupled to the substrate including a modulation element, a first compliant beam, and second compliant beam, at least one of the first and second compliant beams forming a portion of an electrostatic actuator of the modulation assembly,
   wherein the modulation assembly is configured such that both the first compliant beam and the second compliant beam attach to the modulation element.

15. The spatial light modulator of claim 14, wherein the modulation assembly is configured such that the beams couple to the modulation element at the first end and an anchor to the substrate at the second end.

16. The spatial light modulator of claim 15, wherein the modulation assembly is configured such that
   the first compliant beam is shaped to extend away from the anchor from its respective first end and curve back towards the anchor towards its second end, and the second compliant beam is shaped to extend away from the anchor from its respective first end and curve back towards the anchor towards its second end.

17. The spatial light modulator of claim 14, wherein the modulation assembly is configured to limit the bending of the compliant beam that would otherwise be caused by inherent stresses within the compliant beam.

18. The spatial light modulator of claim 17, wherein the limitation of bending yields an intended beam rest position.

19. The spatial light modulator of claim 17, wherein the compliant beam comprises first and second beam materials coupled to one another, and wherein the first beam material has a first stress state, and the second beam material has a second, different stress state.

20. A spatial light modulator comprising:
a substrate having a surface;
a light modulation assembly coupled to the substrate including a modulation element and a compliant beam, the compliant beam forming a portion of an actuator of the modulation assembly; and
a stationary structure that is not coupled to the compliant beam, and wherein the stationary structure limits the bending of the compliant beam.

21. The spatial light modulator of claim 20, wherein the modulation assembly is configured such that the compliant beam has first and second ends and is coupled to the substrate at a first anchor.

22. The spatial light modulator of claim 21, wherein the modulation assembly is configured such that the compliant beam is coupled to the first anchor at the first end.

23. The spatial light modulator of claim 21, wherein the modulation assembly is configured such that the compliant beam is shaped to extend away from the first anchor from the first end and curve back towards the first anchor towards the second end.

24. The spatial light modulator of claim 21, wherein the modulation assembly is configured such that the compliant beam is coupled to the first anchor between the first and second ends.

25. The spatial light modulator of claim 21, comprising a second anchor, and wherein the modulation assembly is configured such that the compliant beam is further coupled to the substrate at the second anchor.

26. The spatial light modulator of claim 20, wherein the modulation assembly is configured such that the compliant beam has first and second ends that couple to a common anchor deposited on the substrate, and the shape of the compliant beam forms a loop.

27. The spatial light modulator of claim 26, wherein the loop comprises a first loop portion extending away from the common anchor and a second loop portion returning to the common anchor, wherein the length of the first loop portion is substantially greater than the length of the second loop portion.

28. The spatial light modulator of claim 26, wherein the loop comprises a first loop portion extending away from the common anchor and a second loop portion returning to the common anchor, wherein at least one of the first loop portion and the second loop portion includes a secondary loop.

29. The spatial light modulator of claim 20, wherein the modulation assembly comprises a second compliant beam, and wherein the modulation assembly is configured such that both the compliant beam and the second compliant beam attach to the modulation element.

30. The spatial light modulator of claim 20, wherein the stationary structure comprises a sliding surface.

31. The spatial light modulator of claim 20, wherein the modulation assembly is configured to limit the bending of the compliant beam that would otherwise be caused by inherent stresses within the compliant beam.

32. The spatial light modulator of claim 31, wherein the limitation of bending yields an intended beam rest position.

33. The spatial light modulator of claim 31, comprising a plurality of attachment points coupling the compliant beam to the substrate at positions on the compliant beam, wherein the positions are selected to promote the limiting of the bending of the compliant beam.

34. The spatial light modulator of claim 31, wherein the compliant beam comprises first and second beam materials coupled to one another, and wherein the first beam material has a first stress state, and the second beam material has a second, different stress state.

35. The spatial light modulator of claim 31, wherein the compliant beam is shaped to promote the limiting of the bending of the compliant beam.

36. A spatial light modulator comprising:
a substrate having a surface;
a modulation assembly coupled to the substrate including a modulation element and a compliant beam, the compliant beam being shaped to promote motion substantially parallel to the surface; and
a plurality of attachment points coupling the compliant beam to the substrate at positions on the compliant beam.

37. The spatial light modulator of claim 36, wherein the modulation assembly is configured such that the compliant beam has first and second ends coupled to the substrate at a first anchor and is shaped to extend away from the first anchor from the first end and curve back towards the first anchor towards the second end.

38. The spatial light modulator of claim 36, wherein the modulation assembly is configured such that the compliant beam has a first and second end and is coupled to a first anchor at the first end.

39. The spatial light modulator of claim 36, wherein the modulation assembly is configured such that the compliant beam has first and second ends that couple to a common anchor deposited on the substrate, and the shape of the compliant beam forms a loop.

40. The spatial light modulator of claim 39, wherein the loop comprises a first loop portion extending away from the common anchor and a second loop portion returning to the common anchor, wherein the length of the first loop portion is substantially greater than the length of the second loop portion.

41. The spatial light modulator of claim 39, wherein the loop comprises a first loop portion extending away from the common anchor and a second loop portion returning to the common anchor, wherein at least one of the first loop portion and the second loop portion includes a secondary loop.

42. The spatial light modulator of claim 36, wherein the modulation assembly comprises a second compliant beam, and wherein the modulation assembly is configured such that both the compliant beam and the second compliant beam attach to the modulation element.

43. The spatial light modulator of claim 36, wherein the modulation assembly comprises a stationary structure that is not coupled to the compliant beam, and wherein the modulation assembly is configured such that the stationary structure limits the bending of the compliant beam.

44. The spatial light modulator of claim 43, wherein the stationary structure comprises a sliding surface.

45. The spatial light modulator of claim 36, wherein the modulation assembly is configured to limit the bending of the compliant beam that would otherwise be caused by inherent stresses within the compliant beam.

46. The spatial light modulator of claim 45, wherein the limitation of bending yields an intended beam rest position.

47. The spatial light modulator of claim 45, wherein the compliant beam comprises first and second beam materials coupled to one another, and wherein the first beam material has a first stress state, and the second beam material has a second, different stress state.

48. The spatial light modulator of claim 45, wherein the compliant beam is shaped to promote the limiting of the bending of the compliant beam.

* * * * *